US009921661B2

(12) United States Patent
Eriksson et al.

(10) Patent No.: US 9,921,661 B2
(45) Date of Patent: Mar. 20, 2018

(54) OPTICAL PROXIMITY SENSOR AND ASSOCIATED USER INTERFACE

(71) Applicant: Neonode Inc., San Jose, CA (US)

(72) Inventors: Thomas Eriksson, Stockholm (SE); Alexander Jubner, Stockholm (SE); Rozita Teymourzadeh, Upplands Väsby (SE); Håkan Sven Erik Andersson, Stockholm (SE); Per Rosengren, Solna (SE); Xiatao Wang, Solna (SE); Stefan Holmgren, Sollentuna (SE); Gunnar Martin Fröjdh, Dalarö (SE); Simon Fellin, Sigtuna (SE); Jan Tomas Hartman, Kumla (SE); Oscar Sverud, Sundbyberg (SE); Sangtaek Kim, Walnut Creek, CA (US); Rasmus Dahl-Örn, Göteborg (SE); Richard Berglind, Älvsjö (SE); Karl Erik Patrik Nordström, Huddinge (SE); Lars Sparf, Vällingby (SE); Erik Rosengren, Stockholm (SE); John Karlsson, Märsta (SE); Remo Behdasht, Lane Cove (AU); Robin Kjell Åman, Spånga (SE); Joseph Shain, Rehovot (IL); Oskar Hagberg, Mölndal (SE); Joel Rozada, Göteborg (SE)

(73) Assignee: Neonode Inc., San Jose, CA (US)

( * ) Notice: Subject to any disclaimer, the term of this patent is extended or adjusted under 35 U.S.C. 154(b) by 0 days.

(21) Appl. No.: 15/000,815

(22) Filed: Jan. 19, 2016

(65) Prior Publication Data

US 2016/0154475 A1 Jun. 2, 2016

Related U.S. Application Data

(60) Continuation-in-part of application No. 14/630,737, filed on Feb. 25, 2015, now abandoned, which is a
(Continued)

(51) Int. Cl.
*G06F 17/00* (2006.01)
*G06F 3/01* (2006.01)
(Continued)

(52) U.S. Cl.
CPC .............. *G06F 3/017* (2013.01); *G06F 1/169* (2013.01); *G06F 3/042* (2013.01); *G06F 3/0421* (2013.01);
(Continued)

(58) Field of Classification Search
USPC ..................................... 463/31; 345/156–179
See application file for complete search history.

(56) References Cited

U.S. PATENT DOCUMENTS

| 4,267,443 A | 5/1981 | Carroll et al. |
| 5,070,411 A * | 12/1991 | Suzuki ............... G03B 27/32 250/205 |

(Continued)

FOREIGN PATENT DOCUMENTS

| EP | 1906632 A2 | 4/2008 |
| JP | 10148640 A | 6/1998 |

(Continued)

OTHER PUBLICATIONS

Hodges et al., "ThinSight: Versatile Multitouch Sensing for Thin Form-Factor Displays." UIST'07, Oct. 7-10, 2007. <http://www.hci.iastate.edu/REU09/pub/main/telerobotics_team_papers/thinsight_versatile_multitouch_sensing_for_thin_formfactor_displays.pdf>.
(Continued)

*Primary Examiner* — Ronald Laneau
(74) *Attorney, Agent, or Firm* — Soquel Group LLC

(57) ABSTRACT

A proximity sensor including a housing, light emitters mounted in the housing for projecting light out of the housing along a detection plane, light detectors mounted in the housing for detecting amounts of light entering the housing along the detection plane, whereby for each emitter-detector pair (E, D), when an object is located at a target position p(E, D) in the detection plane, corresponding to the
(Continued)

pair (E, D), then the light emitted by emitter E is scattered by the object and is expected to be maximally detected by detector D, and a processor to synchronously activate emitter-detector pairs, to read the detected amounts of light from the detectors, and to calculate a location of the object in the detection plane from the detected amounts of light, in accordance with a detection-location relationship that relates detections from emitter-detector pairs to object locations between neighboring target positions in the detection plane.

4 Claims, 58 Drawing Sheets

Related U.S. Application Data continuation of application No. 14/140,635, filed on Dec. 26, 2013, now Pat. No. 9,001,087, which is a continuation of application No. 13/732,456, filed on Jan. 2, 2013, now Pat. No. 8,643,628, application No. 15/000,815, which is a continuation-in-part of application No. 14/726,533, filed on May 31, 2015, now Pat. No. 9,678,601, which is a continuation of application No. 14/311,366, filed on Jun. 23, 2014, now Pat. No. 9,063,614, which is a continuation of application No. PCT/US2014/040579, filed on Jun. 3, 2014, application No. 15/000,815, which is a continuation-in-part of application No. 14/880,231, filed on Oct. 11, 2015, which is a division of application No. 14/312,787, filed on Jun. 24, 2014, now Pat. No. 9,164,625, which is a continuation-in-part of application No. 13/775,269, filed on Feb. 25, 2013, now Pat. No. 8,917,239, and a continuation of application No. PCT/US2014/040112, filed on May 30, 2014, application No. 15/000,815, which is a continuation-in-part of application No. 14/555,731, filed on Nov. 28, 2014, now Pat. No. 9,741,184, and a continuation-in-part of application No. 14/791,414, filed on Jul. 4, 2015.

(60) Provisional application No. 62/107,536, filed on Jan. 26, 2015, provisional application No. 62/197,813, filed on Jul. 28, 2015, provisional application No. 62/226,011, filed on Dec. 11, 2015, provisional application No. 61/713,546, filed on Oct. 14, 2012, provisional application No. 61/950,868, filed on Mar. 11, 2014, provisional application No. 61/923,775, filed on Jan. 6, 2014, provisional application No. 61/919,759, filed on Dec. 22, 2013, provisional application No. 61/911,915, filed on Dec. 4, 2013, provisional application No. 61/833,161, filed on Jun. 10, 2013, provisional application No. 61/830,671, filed on Jun. 4, 2013, provisional application No. 61/986,341, filed on Apr. 30, 2014, provisional application No. 61/972,435, filed on Mar. 31, 2014, provisional application No. 61/929,992, filed on Jan. 22, 2014, provisional application No. 61/846,089, filed on Jul. 15, 2013, provisional application No. 61/838,296, filed on Jun. 23, 2013, provisional application No. 61/828,713, filed on May 30, 2013, provisional application No. 62/021,125, filed on Jul. 5, 2014.

(51) Int. Cl.
  *G06F 1/16* (2006.01)
  *G06F 3/042* (2006.01)
  *G06F 3/0488* (2013.01)

(52) U.S. Cl.
  CPC ........ *G06F 3/0428* (2013.01); *G06F 3/04883* (2013.01)

(56) References Cited

U.S. PATENT DOCUMENTS

| | | |
|---|---|---|
| 5,103,085 A | 4/1992 | Zimmerman |
| 5,162,783 A | 11/1992 | Moreno |
| 5,414,413 A | 5/1995 | Tamaru et al. |
| 5,463,725 A | 10/1995 | Henckel et al. |
| 5,880,462 A | 3/1999 | Hsia |
| 5,889,236 A | 3/1999 | Gillespie et al. |
| 5,900,863 A | 5/1999 | Numazaki |
| 5,977,888 A | 11/1999 | Fujita et al. |
| 6,161,005 A | 12/2000 | Pinzon |
| 6,421,042 B1 | 7/2002 | Omura et al. |
| 6,492,978 B1 | 12/2002 | Selig et al. |
| 6,646,633 B1 | 11/2003 | Nicolas |
| 6,690,365 B2 | 2/2004 | Hinckley et al. |
| 6,874,683 B2 | 4/2005 | Keronen et al. |
| 6,875,977 B2 | 4/2005 | Wolter et al. |
| 6,985,137 B2 | 1/2006 | Kaikuranta |
| 7,046,232 B2 | 5/2006 | Inagaki et al. |
| 7,162,124 B1 | 1/2007 | Gunn, III et al. |
| 7,221,462 B2 | 5/2007 | Cavallucci |
| 7,225,408 B2 | 5/2007 | O'Rourke |
| 7,232,986 B2 | 6/2007 | Worthington et al. |
| 7,518,738 B2 | 4/2009 | Cavallucci et al. |
| 7,659,887 B2 | 2/2010 | Larsen et al. |
| 7,924,264 B2 * | 4/2011 | Ohta ............... A63F 13/04 345/157 |
| 8,091,280 B2 | 1/2012 | Hanzel et al. |
| 8,115,745 B2 | 2/2012 | Gray |
| 8,120,625 B2 | 2/2012 | Hinckley |
| 8,169,404 B1 | 5/2012 | Boillot |
| 8,193,498 B2 | 6/2012 | Cavallucci et al. |
| 8,289,299 B2 | 10/2012 | Newton |
| 8,316,324 B2 | 11/2012 | Boillot |
| 8,350,831 B2 | 1/2013 | Drumm |
| 8,471,814 B2 | 6/2013 | LaFave et al. |
| 8,581,884 B2 | 11/2013 | Fahraeus et al. |
| 8,648,677 B2 | 2/2014 | Su et al. |
| 8,922,340 B2 | 12/2014 | Salter et al. |
| 9,050,943 B2 | 6/2015 | Muller |
| 9,223,431 B2 * | 12/2015 | Pemberton-Pigott ... G06F 3/016 |
| 2001/0043189 A1 | 11/2001 | Brisebois et al. |
| 2002/0152010 A1 | 10/2002 | Colmenarez et al. |
| 2003/0034439 A1 | 2/2003 | Reime et al. |
| 2003/0174125 A1 | 9/2003 | Torunoglu et al. |
| 2004/0056199 A1 | 3/2004 | O'Connor et al. |
| 2004/0090428 A1 | 5/2004 | Crandall, Jr. et al. |
| 2004/0198490 A1 | 10/2004 | Bansemer et al. |
| 2005/0024623 A1 | 2/2005 | Xie et al. |
| 2005/0093846 A1 | 5/2005 | Marcus et al. |
| 2005/0133702 A1 | 6/2005 | Meyer |
| 2006/0028455 A1 | 2/2006 | Hinckley et al. |
| 2006/0077186 A1 | 4/2006 | Park et al. |
| 2006/0161870 A1 | 7/2006 | Hotelling et al. |
| 2006/0161871 A1 | 7/2006 | Hotelling et al. |
| 2006/0236262 A1 | 10/2006 | Bathiche et al. |
| 2006/0238517 A1 | 10/2006 | King et al. |
| 2006/0244733 A1 | 11/2006 | Geaghan |
| 2007/0077541 A1 | 4/2007 | Champagne et al. |
| 2007/0103436 A1 | 5/2007 | Kong |
| 2008/0012835 A1 | 1/2008 | Rimon et al. |
| 2008/0016511 A1 | 1/2008 | Hyder et al. |
| 2008/0089587 A1 | 4/2008 | Kim et al. |
| 2008/0096620 A1 | 4/2008 | Lee et al. |
| 2008/0100572 A1 | 5/2008 | Boillot |
| 2008/0100593 A1 | 5/2008 | Skillman et al. |
| 2008/0134102 A1 | 6/2008 | Movold et al. |
| 2008/0158172 A1 | 7/2008 | Klotelling et al. |
| 2008/0211779 A1 | 9/2008 | Pryor |
| 2008/0224836 A1 | 9/2008 | Pickering |
| 2009/0122027 A1 | 5/2009 | Newton |
| 2009/0135162 A1 | 5/2009 | Van De Wijdeven et al. |

(56) References Cited

U.S. PATENT DOCUMENTS

| | | |
|---|---|---|
| 2009/0139778 A1 | 6/2009 | Butler et al. |
| 2009/0166098 A1 | 7/2009 | Sunder |
| 2009/0195402 A1 | 8/2009 | Izadi et al. |
| 2009/0198359 A1 | 8/2009 | Chaudhri |
| 2009/0280905 A1 | 11/2009 | Weisman et al. |
| 2009/0322673 A1 | 12/2009 | Cherradi El Fadili |
| 2010/0013763 A1 | 1/2010 | Futter et al. |
| 2010/0031203 A1 | 2/2010 | Morris et al. |
| 2010/0134424 A1 | 6/2010 | Brisebois et al. |
| 2010/0185341 A1 | 7/2010 | Wilson et al. |
| 2010/0238138 A1 | 9/2010 | Goertz et al. |
| 2010/0238139 A1 | 9/2010 | Goertz et al. |
| 2010/0299642 A1 | 11/2010 | Merrell et al. |
| 2010/0321289 A1 | 12/2010 | Kim et al. |
| 2011/0005367 A1 | 1/2011 | Hwang et al. |
| 2011/0043325 A1 | 2/2011 | Newman et al. |
| 2011/0050639 A1 | 3/2011 | Challener et al. |
| 2011/0074734 A1 | 3/2011 | Wassvik et al. |
| 2011/0087963 A1 | 4/2011 | Brisebois et al. |
| 2011/0122560 A1 | 5/2011 | Andre et al. |
| 2011/0128234 A1 | 6/2011 | Lipman et al. |
| 2011/0128729 A1 | 6/2011 | Ng |
| 2011/0163996 A1 | 7/2011 | Wassvik et al. |
| 2011/0169773 A1 | 7/2011 | Luo |
| 2011/0169781 A1 | 7/2011 | Goertz et al. |
| 2011/0175852 A1 | 7/2011 | Goertz et al. |
| 2011/0179368 A1 | 7/2011 | King et al. |
| 2011/0179381 A1 | 7/2011 | King |
| 2011/0205186 A1 | 8/2011 | Newton et al. |
| 2011/0227874 A1 | 9/2011 | Fahraeus et al. |
| 2011/0242056 A1 | 10/2011 | Lee et al. |
| 2011/0310005 A1 | 12/2011 | Chen et al. |
| 2012/0068973 A1 | 3/2012 | Christiansson et al. |
| 2012/0071994 A1 | 3/2012 | Lengeling |
| 2012/0098753 A1 | 4/2012 | Lu |
| 2012/0116548 A1 | 5/2012 | Goree et al. |
| 2012/0131186 A1 | 5/2012 | Klos et al. |
| 2012/0162078 A1 | 6/2012 | Ferren et al. |
| 2012/0188205 A1 | 7/2012 | Jansson et al. |
| 2012/0212457 A1 | 8/2012 | Drumm |
| 2012/0212458 A1 | 8/2012 | Drumm |
| 2012/0218229 A1 | 8/2012 | Drumm |
| 2012/0262408 A1 | 10/2012 | Pasquero et al. |
| 2013/0127790 A1* | 5/2013 | Wassvik .................. G06F 3/042 345/175 |
| 2013/0234171 A1 | 9/2013 | Heikkinen et al. |
| 2014/0049516 A1 | 2/2014 | Heikkinen et al. |
| 2014/0104160 A1 | 4/2014 | Eriksson et al. |
| 2014/0104240 A1* | 4/2014 | Eriksson .................. G06F 1/169 345/175 |
| 2015/0227213 A1 | 8/2015 | Cho |

FOREIGN PATENT DOCUMENTS

| | | |
|---|---|---|
| JP | 3240941 B2 | 12/2001 |
| JP | 2003029906 A | 1/2003 |
| KR | 20120120097 | 11/2012 |
| KR | 12682090000 | 5/2013 |
| KR | 20130053363 | 5/2013 |
| KR | 20130053364 | 5/2013 |
| KR | 20130053367 | 5/2013 |
| KR | 20130053377 | 5/2013 |
| KR | 20130054135 | 5/2013 |
| KR | 20130054150 | 5/2013 |
| KR | 20130133117 | 12/2013 |
| WO | WO2010011929 A1 | 1/2010 |
| WO | WO2010134865 A1 | 11/2010 |
| WO | WO2012017183 A1 | 2/2012 |
| WO | WO2012089957 A1 | 7/2012 |
| WO | WO2012089958 A1 | 7/2012 |
| WO | WO2014041245 A1 | 3/2014 |
| WO | 2014/194151 A2 | 12/2014 |

OTHER PUBLICATIONS

Moeller et al., ZeroTouch: An Optical Multi-Touch and Free-Air Interaction Architecture, Proc. CHI 2012, Proceedings of the 2012 Annual Conference Extended Abstracts on Human Factors in Computing Systems, May 5, 2012, pp. 2165-2174, ACM, New York, NY, USA.

Moeller et al., ZeroTouch: A Zero-Thickness Optical Multi-Touch Force Field, CHI EA '11, Proceedings of the 2011 Annual Conference Extended Abstracts on Human Factors in Computing Systems, May 2011, pp. 1165-1170, ACM, New York, NY, USA.

Moeller et al., IntangibleCanvas: Free-Air Finger Painting on a Projected Canvas, CHI EA '11, Proceedings of the 2011 Annual Conference Extended Abstracts on Human Factors in Computing Systems, May 2011, pp. 1615-1620, ACM, New York, NY, USA.

Butler et al., "SideSight: Multi-touch Interaction Around Smart Devices", UIST'08, Oct. 2008. http://131.107.65.14/en-us/um/people/shahrami/papers/sidesight.pdf.

U.S. Appl. No. 14/312,787, non-final Office action, dated Jan. 8, 2015, 15 pages.

U.S. Appl. No. 14/312,787, Notice of Allowance, dated Jun. 22, 2015, 9 pages.

PCT Application No. PCT/US2014/040112, International Preliminary Report on Patentability, dated Dec. 1, 2015, 18 pages.

PCT Application No. PCT/US2014/040112, Search Report and Written Opinion, dated Dec. 2, 2014, 21 pages.

PCT Application No. PCT/US2015/057460, Search Report, dated Jan. 21, 2016, 2 pages.

PCT Application No. PCT/US2015/057460, Written Opinion, dated Jan. 21, 2016, 6 pages.

European Patent Application No. 14 804 520.6, European Search Report, dated May 24 2016, 11 pages.

PCT Application No. PCT/US2016/103927, Search Report and Written Opinion, dated May 26, 2016, 13 pages.

\* cited by examiner

OPTICAL PROXIMITY SENSOR AND ASSOCIATED USER INTERFACE

CROSS REFERENCES TO RELATED APPLICATIONS

This application claims priority benefit from:

U.S. Provisional Application No. 62/107,536 entitled OPTICAL PROXIMITY SENSORS and filed on Jan. 26, 2015 by inventors Stefan Holmgren, Oscar Sverud, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Kjell Åman and Joseph Shain;

U.S. Provisional Application No. 62/197,813 entitled OPTICAL PROXIMITY SENSOR and filed on Jul. 28, 2015 by inventors Rozita Teymourzadeh, Håkan Sven Erik Andersson, Per Rosengren, Xiatao Wang, Stefan Holmgren, Gunnar Martin Fröjdh and Simon Fellin; and U.S. Provisional Application No. 62/266,011 entitled OPTICAL PROXIMITY SENSOR and filed on Dec. 11, 2015 by inventors Thomas Eriksson, Alexander Jubner, Rozita Teymourzadeh, Håkan Sven Erik Andersson, Per Rosengren, Xiatao Wang, Stefan Holmgren, Gunnar Martin Fröjdh, Simon Fellin and Jan Tomas Hartman.

This application is a continuation-in-part of U.S. patent application Ser. No. 14/630,737, entitled LIGHT-BASED PROXIMITY DETECTION SYSTEM AND USER INTERFACE and filed on Feb. 25, 2015 by inventors Thomas Eriksson and Stefan Holmgren.

U.S. patent application Ser. No. 14/630,737 is a continuation of U.S. patent application Ser. No. 14/140,635, now U.S. Pat. No. 9,001,087, entitled LIGHT-BASED PROXIMITY DETECTION SYSTEM AND USER INTERFACE and filed on Dec. 26, 2013 by inventors Thomas Eriksson and Stefan Holmgren.

U.S. patent application Ser. No. 14/140,635 is a continuation of U.S. patent application Ser. No. 13/732,456, now U.S. Pat. No. 8,643,628, entitled LIGHT-BASED PROXIMITY DETECTION SYSTEM AND USER INTERFACE and filed on Jan. 2, 2013 by inventors Thomas Eriksson and Stefan Holmgren.

U.S. patent application Ser. No. 13/732,456 claims priority benefit of U.S. Provisional Patent Application Ser. No. 61/713,546, entitled LIGHT-BASED PROXIMITY DETECTION SYSTEM AND USER INTERFACE and filed on Oct. 14, 2012 by inventor Stefan Holmgren.

This application is a continuation-in-part of U.S. patent application Ser. No. 14/726,533, now U.S. Pat. No. 9,678,601, entitled OPTICAL TOUCH SCREENS and filed on May 31, 2015 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht.

U.S. patent application Ser. No. 14/726,533 is a continuation of U.S. patent application Ser. No. 14/311,366, now U.S. Pat. No. 9,063,614, entitled OPTICAL TOUCH SCREENS and filed on Jun. 23, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht.

U.S. patent application Ser. No. 14/311,366 is a continuation of PCT Patent Application No. PCT/US14/40579, entitled OPTICAL TOUCH SCREENS and filed on Jun. 3, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht.

PCT Application No. PCT/US14/40579 claims priority benefit from:

U.S. Provisional Patent Application No. 61/950,868, entitled OPTICAL TOUCH SCREENS and filed on Mar. 11, 2014 by inventors Karl Erik Patrik Nordström, Per Rosengren, Stefan Holmgren, Erik Rosengren, Robert Pettersson, Lars Sparf and Thomas Eriksson;

U.S. Provisional Patent Application No. 61/923,775, entitled MULTI-TOUCH OPTICAL TOUCH SCREENS WITHOUT GHOST POINTS and filed on Jan. 6, 2014 by inventors Per Rosengren, Stefan Holmgren, Erik Rosengren, Robert Pettersson, Lars Sparf and Thomas Eriksson;

U.S. Provisional Patent Application No. 61/919,759, entitled OPTICAL TOUCH SCREENS WITH TOUCH-SENSITIVE BORDERS and filed on Dec. 22, 2013 by inventors Remo Behdasht, Erik Rosengren, Robert Pettersson, Lars Sparf and Thomas Eriksson;

U.S. Provisional Patent Application No. 61/911,915, entitled CIRCULAR MULTI-TOUCH OPTICAL TOUCH SCREENS and filed on Dec. 4, 2013 by inventors Richard Berglind, Erik Rosengren, Robert Pettersson, Lars Sparf, Thomas Eriksson, Gunnar Martin Fröjdh and Xiatao Wang;

U.S. Provisional Patent Application No. 61/833,161, entitled CIRCULAR MULTI-TOUCH OPTICAL TOUCH SCREENS and filed on Jun. 10, 2013 by inventors Richard Berglind, Erik Rosengren, Robert Pettersson, Lars Sparf, Thomas Eriksson, Gunnar Martin Fröjdh and Xiatao Wang; and U.S. Provisional Patent Application No. 61/830,671, entitled MULTI-TOUCH OPTICAL TOUCH SCREENS WITHOUT GHOST POINTS and filed on Jun. 4, 2013 by inventors Erik Rosengren, Robert Pettersson, Lars Sparf and Thomas Eriksson.

This application is a continuation-in-part of U.S. patent application Ser. No. 14/880,231, entitled GAMING DEVICE and filed on Oct. 11, 2015 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

U.S. patent application Ser. No. 14/880,231 is a divisional of U.S. patent application Ser. No. 14/312,787, now U.S. Pat. No. 9,164,625, entitled OPTICAL PROXIMITY SENSORS and filed on Jun. 24, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

This application is a continuation-in-part of U.S. patent application Ser. No. 14/555,731, now U.S. Pat. No. 9,741,184, entitled DOOR HANDLE WITH OPTICAL PROXIMITY SENSORS and filed on Nov. 28, 2014 by inventors Sairam Iyer, Stefan Holmgren and Per Rosengren.

This application is a continuation-in-part of U.S. patent application Ser. No. 14/791,414, entitled OPTICAL PROXIMITY SENSOR FOR TOUCH SCREEN AND ASSOCIATED CALIBRATION TOOL and filed on Jul. 4, 2015 by inventors Per Rosengren, Xiatao Wang and Stefan Holmgren.

U.S. patent application Ser. No. 14/791,414 claims priority benefit of U.S. Provisional Patent Application Ser. No. 62/021,125, entitled OPTICAL TOUCH SCREEN SYSTEMS and filed on Jul. 5, 2014 by inventor Per Rosengren.

U.S. patent application Ser. No. 14/312,787 is a continuation-in-part of U.S. patent application Ser. No. 13/775,269, now U.S. Pat. No. 8,917,239, entitled REMOVABLE PROTECTIVE COVER WITH EMBEDDED PROXIMITY SENSORS and filed on Feb. 25, 2013 by inventors Thomas Eriksson, Stefan Holmgren, John Karlsson, Remo Behdasht, Erik Rosengren and Lars Sparf.

U.S. patent application Ser. No. 14/312,787 is also a continuation of PCT Application No. PCT/US14/40112, entitled OPTICAL PROXIMITY SENSORS and filed on May 30, 2014 by inventors Stefan Holmgren, Sairam Iyer, Richard Berglind, Karl Erik Patrik Nordstrom, Lars Sparf, Per Rosengren, Erik Rosengren, John Karlsson, Thomas Eriksson, Alexander Jubner, Remo Behdasht, Simon Fellin, Robin Åman and Joseph Shain.

PCT Application No. PCT/US14/40112 claims priority benefit from:

U.S. Provisional Patent Application No. 61/986,341, entitled OPTICAL TOUCH SCREEN SYSTEMS and filed on Apr. 30, 2014 by inventors Sairam Iyer, Karl Erik Patrik Nordström, Lars Sparf, Per Rosengren, Erik Rosengren, Thomas Eriksson, Alexander Jubner and Joseph Shain;

U.S. Provisional Patent Application No. 61/972,435, entitled OPTICAL TOUCH SCREEN SYSTEMS and filed on Mar. 31, 2014 by inventors Sairam Iyer, Karl Erik Patrik Nordstrom, Lars Sparf, Per Rosengren, Erik Rosengren, Thomas Eriksson, Alexander Jubner and Joseph Shain;

U.S. Provisional Patent Application No. 61/929,992, entitled CLOUD GAMING USER INTERFACE and filed on Jan. 22, 2014 by inventors Thomas Eriksson, Stefan Holmgren, John Karlsson, Remo Behdasht, Erik Rosengren, Lars Sparf and Alexander Jubner;

U.S. Provisional Patent Application No. 61/846,089, entitled PROXIMITY SENSOR FOR LAPTOP COMPUTER AND ASSOCIATED USER INTERFACE and filed on Jul. 15, 2013 by inventors Richard Berglind, Thomas Eriksson, Simon Fellin, Per Rosengren, Lars Sparf, Erik Rosengren, Joseph Shain, Stefan Holmgren, John Karlsson and Remo Behdasht;

U.S. Provisional Patent Application No. 61/838,296, entitled OPTICAL GAME ACCESSORIES USING REFLECTED LIGHT and filed on Jun. 23, 2013 by inventors Per Rosengren, Lars Sparf, Erik Rosengren, Thomas Eriksson, Joseph Shain, Stefan Holmgren, John Karlsson and Remo Behdasht; and U.S. Provisional Patent Application No. 61/828,713, entitled OPTICAL TOUCH SCREEN SYSTEMS USING REFLECTED LIGHT and filed on May 30, 2013 by inventors Per Rosengren, Lars Sparf, Erik Rosengren and Thomas Eriksson.

The contents of these applications are hereby incorporated by reference in their entireties.

FIELD OF THE INVENTION

The field of the present invention is light-based touch screens and proximity sensors and applications therefor, including door lock systems that utilize gestures to lock and unlock the door, a proximity sensor bar that is magnetically attached to a laptop display for enabling touch input on a display that does not detect touch gestures, user interfaces for in-vehicle infotainment systems, and user interfaces for PCs.

BACKGROUND OF THE INVENTION

In the prior art, a one-dimensional array of proximity sensors is not accurate enough to determine a two-dimensional location of a pointer within a two dimensional plane extending from the array.

In prior art door lock systems, a portable wireless transmitter held by a person sends a coded signal to a wireless receiver connected to a door lock mechanism to lock or unlock the door. Some prior art transmitter units include switches for activating the lock and unlock functions, whereas other transmitter units are in the form of an electronic transponder card, whereby a transmitter unit connected to the lock interrogates the transponder when a wake up signal is detected.

In order to provide an added level of security, some systems require the user to enter a predefined authentication gesture to confirm that an authorized person is trying to unlock the door of a vehicle. Thus, for example, when the user presses a switch on a key fob transmitter, that user must enter a predefined authentication gesture on a touch sensor in order to unlock the door. In another example, a detected predefined authentication gesture activates a transmitter unit to interrogate a hands-free card transponder.

Laptop computers are typically available in touchscreen and non-touchscreen versions. It would be advantageous to enable consumers of non-touchscreen laptops to enable touchscreen functionality when desired. For example, it would be advantageous to enable swipe, pinch and rotate gestures when browsing images, checking a newsfeed or rotating images. Another example is to enable touchscreen functionality during travel in an airplane where it is more comfortable to use one's fingers on the screen than using the laptop's built-in trackpad.

Many in-vehicle infotainment systems employ touch screen user interfaces designed for handheld devices, such as mobile phones. It would be advantageous to provide a user interface that is designed for the use case of a display that is not held in the user's hand. It would be additionally advantageous to provide user interfaces for electronic devices, including handheld devices, desktop devices and in-vehicle devices that provide different schemes concurrently for accessing functions.

SUMMARY

Robot measurements indicate that there is a pattern in the relative signal strengths that repeat within triangles spanned by three adjacent signals. The robot measurement is used to learn that pattern, so that a mapping is made from the relative signal strengths of three signals in a triangle, to the reflection location and strength of an obstacle within that triangle. Adjacent triangles give individual detection candidates, which are consolidated into one.

There is thus provided in accordance with an embodiment of the present invention a proximity sensor for identifying a proximal object, including a housing, a plurality of light emitters mounted in the housing for projecting light out of the housing, a plurality of light detectors mounted in the housing, operable when activated to detect amounts of light arriving at the detectors, a plurality of lenses mounted in the housing, each lens, denoted L, being positioned in relation to two respective ones of the detectors, denoted D1 and D2, such that light entering lens L is maximally detected at detector a1 when the light enters lens L at an acute angle of incidence θ1, and light entering lens L is maximally detected at detector D2 when the light enters lens L at an obtuse angle of incidence θ2, and a processor connected to the emitters and to the detectors, operable to synchronously activate emitter-detector pairs, and configured to calculate a partial contour of an object outside the housing that reflects light, projected by the activated emitters, back towards said lenses, based on amounts of light detected by the activated detectors.

There is additionally provided in accordance with an embodiment of the present invention a method for sensing a proximal object, including providing a strip comprising a plurality of emitters E and detectors D wherein each emitter is situated between different detectors, synchronously co-activating emitter-detector pairs (E, D), wherein the emitters and detectors are arranged such that for each emitter-detector pair (E, D), when an object is located at a target position p(E, D) corresponding to the pair (E, D), then the light emitted by emitter E is scattered by the object and is maximally detected by detector D, determining a reflection value R(E, D) for each emitter-detector pair (E, D), based on an amount of reflected light detected by detector D when the pair (E, D) is activated by the synchronously co-activating, and associating the reflection value R(E, D) with the target position p(E, D) in the common plane corresponding to the pair (E, D), generating a two-dimensional pixel image of reflection values $R_p$ at pixel positions p, corresponding to the derived reflection values R(E, D) and the target positions p(E, D), and estimating a partial circumference of the object based on the pixel image.

There is further provided in accordance with an embodiment of the present invention a monitor, including a housing, a display mounted in the housing, a plurality of light emitters mounted in the housing for projecting light out of the housing along two orthogonal detection planes, a plurality of light detectors mounted in the housing for detecting reflections of the light projected by the emitters, by a reflective object in one of the detection planes, a plurality of lenses mounted and oriented in the housing relative to the emitters and the detectors in such a manner that for each emitter-detector pair, when the object is located at a target position corresponding to that emitter-detector pair, light emitted by the emitter of that pair passes through one of the lenses and is reflected by the object back through one of the lenses to the detector of that pair, and a processor connected to the display, to the emitters and to the detectors, for displaying a graphical user interface (GUI) on the display, for interpreting different directional movements of the object performed across the two orthogonal detection planes as different input commands to the GUI, for synchronously co-activating emitter-detector pairs, and for calculating a directional movement of the object in the two orthogonal detection planes by determining a series of emitter-detector pairs among the co-activated emitter-detector pairs, for which the detector detects a maximum amount of light over a time interval, and identifying the target positions corresponding thereto, and calculating a direction of movement based on the thus-identified target positions.

There is yet further provided in accordance with an embodiment of the present invention a monitor, including a housing, a display, a plurality of light emitters mounted in the housing for projecting light out of the housing along a detection plane parallel to the display, a plurality of light detectors mounted in the housing for detecting reflections of the light projected by the emitters, by a reflective object in the detection plane, a plurality of lenses mounted and oriented in the housing relative to the emitters and the detectors in such a manner that for each emitter-detector pair, when the object is located at a target position corresponding to that emitter-detector pair, then light emitted by the emitter of that pair passes through one of the lenses and is reflected by the object back through one of the lenses to the detector of that pair, and a processor connected to the display, to the emitters and to the detectors, for displaying a graphical user interface on the display for adjusting parameters for the display, for synchronously co-activating emitter-detector pairs, and for calculating a position of the object in the detection plane by determining an emitter-detector pair among the co-activated emitter-detector pairs, for which the detector detects a maximum amount of light over a time interval, and identifying the target position corresponding thereto, determining additional target positions corresponding to co-activated emitter-detector pairs, which neighbor the thus-identified target position, and calculating a weighted average of the target position and the additional target positions, wherein each target position's weight in the average corresponds to a degree of detection of the reflected light beam for the emitter-detector pair to which that target position corresponds.

There is moreover provided in accordance with an embodiment of the present invention a calibration tool for calibrating parameters of a proximity sensor strip including a plurality of emitters E and detectors D, wherein the emitters and detectors are arranged such that the emitters project light out of the strip along a detection plane and the detectors detect light entering the strip along the detection plane, and for each emitter-detector pair (E, D), when an object is located at a target position p(E, D) in the detection plane, corresponding to the pair (E, D), then the light emitted by emitter E is scattered by the object and is expected to be maximally detected by detector D, the calibration tool including a reflective object placed parallel to the proximity sensor strip in the detection plane, the reflective object spanning the length of the proximity sensor, a mechanism for incrementally moving the reflective object towards or away from the proximity sensor along the detection plane, and a processor coupled with the proximity sensor strip and with the mechanism operable to (i) activate a plurality of the emitter-detector pairs (E, D) at each incremental move of the reflective object, (ii) measure detections detected by detector D of each activated pair, and (iii) calibrate the target positions p(E, D) in the detection plane according to the distances between the sensor strip and the reflective object at which maximum detections are measured.

There is additionally provided in accordance with an embodiment of the present invention a method for calibrating parameters of a proximity sensor strip including a plurality of emitters E and detectors D, wherein the emitters and detectors are arranged such that the emitters project light out of the strip along a detection plane and the detectors detect light entering the strip along the detection plane, and for each emitter-detector pair (E, D), when the object is located at a target position p(E, D) in the detection plane, corresponding to the pair (E, D), then the light emitted by emitter E is scattered by the object and is expected to be maximally detected by detector D, the method including providing a reflective object spanning the length of the proximity sensor parallel to the proximity sensor strip in the detection plane, incrementally moving the reflective object towards or away from the proximity sensor along the detection plane, at each incremental move of the object, activating a plurality of the emitter-detector pairs (E, D) to measure detections at detectors D, and calibrating the target positions p(E, D) in the detection plane according to the distances between the sensor strip and the reflective object at which maximum detections are measured.

There is further provided in accordance with an embodiment of the present invention a proximity sensor for identifying a location of a proximal object, including a housing, a plurality of light emitters, denoted E, mounted in the housing for projecting light out of the housing along a detection plane, a plurality of light detectors, denoted D, mounted in the housing, operable when activated to detect amounts of light entering the housing along the detection plane, whereby for each emitter-detector pair (E, D), when an object is located at a target position p(E, D) in the detection plane, corresponding to the pair (E, D), then the light emitted by emitter E is scattered by the object and is expected to be maximally detected by detector D, and a processor connected to the emitters and to the detectors, operable to synchronously activate emitter-detector pairs, to read the detected amounts of light from the detectors, and to calculate a location of the object in the detection plane from the detected amounts of light, in accordance with a detection-location relationship, denoted D→L, that relates detections from emitter-detector pairs to object locations between neighboring target positions in the detection plane.

There is yet further provided in accordance with an embodiment of the present invention a door lock system that enters an activatable state, whereby the lock is activated in response to detecting a first non-predefined gesture, and the lock is subsequently activated to unlock in response to that same gesture being detected again.

There is moreover provided in accordance with an embodiment of the present invention a proximity sensor array in an elongated housing that is attached by a user to an edge of a laptop computer screen to provide touchscreen detection to the laptop. In some embodiments a Universal Serial Bus (USB) connector extends from the elongated housing and is inserted into a USB socket in the laptop, enabling the proximity sensor to communicate with the laptop using USB communications protocols and also enabling the proximity sensor to receive electric current from the laptop. In some embodiments, the proximity sensor communicates with the laptop wirelessly; e.g., using a short range wireless connectivity standard. In some embodiments the elongated housing includes one or more magnetic fasteners for attaching the proximity sensor array along an edge, e.g., the bottom edge, of the laptop screen.

There is additionally provided in accordance with an embodiment of the present invention a single straight bar including a linear array of interlaced light emitters and photodiode detectors mounted on a printed circuit board, wherein the bar is configured to be repeatedly attached to and detached from an exterior housing of a laptop computer including a processor, wherein the bar, when thus attached and coupled communicatively with the laptop processor, provides the processor with detection signals that enable the processor to recognize a plurality of different gestures performed by an object in an airspace of a projection plane coming out of one side of the bar, the detection signals being generated by light emitted by the light emitters that is reflected by the object back to the bar and detected by the photodiodes.

There is further provided in accordance with an embodiment of the present invention a single straight bar including a linear array of interlaced light emitters and photodiode detectors mounted on a printed circuit board, wherein the bar is configured to be repeatedly attached to and detached from an exterior housing of a laptop computer including a processor, wherein the bar, when coupled communicatively with the laptop processor and positioned over one side of a flat rectangular surface of the laptop housing, provides the processor with detection signals that enable the processor to recognize a plurality of different gestures performed by an object in an airspace in front of the surface, the detection signals being generated by light emitted by the light emitters that is reflected by the object back to the bar and detected by the photodiodes.

Embodiments of the present invention provide two-dimensional (2D) touch detection using a one-dimensional array of alternating light emitters and detectors. The present invention also provides a three-dimensional (3D) touch or hover detector based on the same principles as the 2D detectors.

There is additionally provided in accordance with an embodiment of the present invention a GUI for an in-vehicle infotainment system, providing both context-driven navigation of the GUI and hierarchical menu-driven navigation thereof, within a single display simultaneously.

BRIEF DESCRIPTION OF THE DRAWINGS

The present invention will be more fully understood and appreciated from the following detailed description, taken in conjunction with the drawings in which.

The following table catalogs the numbered elements and lists the figures in which each numbered element appears. Similarly numbered elements represent elements of the same type, but they need not be identical elements.

| Numbered Elements | | |
|---|---|---|
| Element | Description | FIGS. |
| 101-116 | emitter | 10-18, 20, 21, 23, 25, 40-45 |
| 201-211 | photo-detector | 10-18, 20, 21, 23, 25, 41, 42, 45 |
| 301-304 | lens | 10-15, 17, 18, 20, 21 |
| 310-316 | lens | 31, 36, 40 |
| 321-327 | lens | 41-45 |
| 401, 404 | emitted light beam | 10-18, 20, 21, 25 |
| 402, 403, 405, 406 | reflected light beam | 10-12, 14-18, 20, 21, 25 |
| 410 | proximity sensor light beams | 25 |

-continued

Numbered Elements

| Element | Description | FIGS. |
|---|---|---|
| 411-414 | proximity sensor light beams | 41-45 |
| 501 | proximity sensor bar | 10-18, 20, 21, 23, 28 |
| 502 | motion sensor | 26 |
| 503 | portable transponder | 26 |
| 504 | transmitter unit | 26 |
| 510 | proximity sensor bar | 30-38 |
| 511 | housing | 31 |
| 512 | PCB | 40 |
| 519, 520 | proximity sensor | 46, 48, 49 |
| 601, 602 | arrow | 14, 15 |
| 701 | processor | 10-18, 20, 21, 23 |
| 801, 802 | object | 10-13, 18, 20, 21, 23 |
| 803 | motor | 14, 15 |
| 804, 805 | shaft | 14, 15 |
| 806, 807 | reflective object | 14-17 |
| 810 | car | 28 |
| 811 | car door | 28, 29 |
| 812 | driver-side window | 28, 29 |
| 813 | glove compartment | 29 |
| 815, 816 | seat | 29 |
| 820 | keyless entry system door lock | 29 |
| 830 | laptop | 30, 32 |
| 831 | display screen | 30-38, 46, 48, 49 |
| 832 | keyboard | 30-38 |
| 833 | USB connector | 30-34, 36 |
| 900-902 | card menu item | 52, 55 |
| 903 | menu bar | 55, 56, 58 |
| 904-908 | menu bar item | 55, 56, 58 |
| 910-916, 916", 919, 919', 926, 926", 929, 929', 936, 936", 939, 939', 940-942, 944, 945, 961-969 | hotspot location | 2-5, 10-13, 16-18, 20-23 |
| 971, 972 | detection plane | 46, 48, 49 |
| 973 | touch sensitive portion of screen | 49 |
| 974 | non-touch sensitive portion of screen | 49 |
| 975-977 | icon | 48 |
| 978-980 | list item | 56, 58 |
| 981, 982 | touch sensitive controls | 49 |
| 983 | touch location | 49 |
| 984 | scroll knob | 49 |
| 985 | notification card | 51, 58 |
| 986-988 | application card | 51, 55, 56, 58 |
| 989 | partial object circumference | 22 |
| 990 | detection image | 19, 22 |
| 991-995 | ring of six hotspot locations in a hyperboloid | 25 |
| 996 | sub-menu bar | 56, 58 |
| 997-999 | sub-menu bar item | 56, 58 |
| 1001-1011 | flowchart step | 27, 40 |
| 1020-1087 | user interface action | 50, 53, 54, 57 |

DETAILED DESCRIPTION

Throughout this description, the terms "source" and "emitter" are used to indicate the same light emitting elements, inter alia LEDs, VCSELs and lasers, and the terms "sensor" and "detector" are used to indicate the same light detecting elements, inter alia photo diodes.

Figure 1:
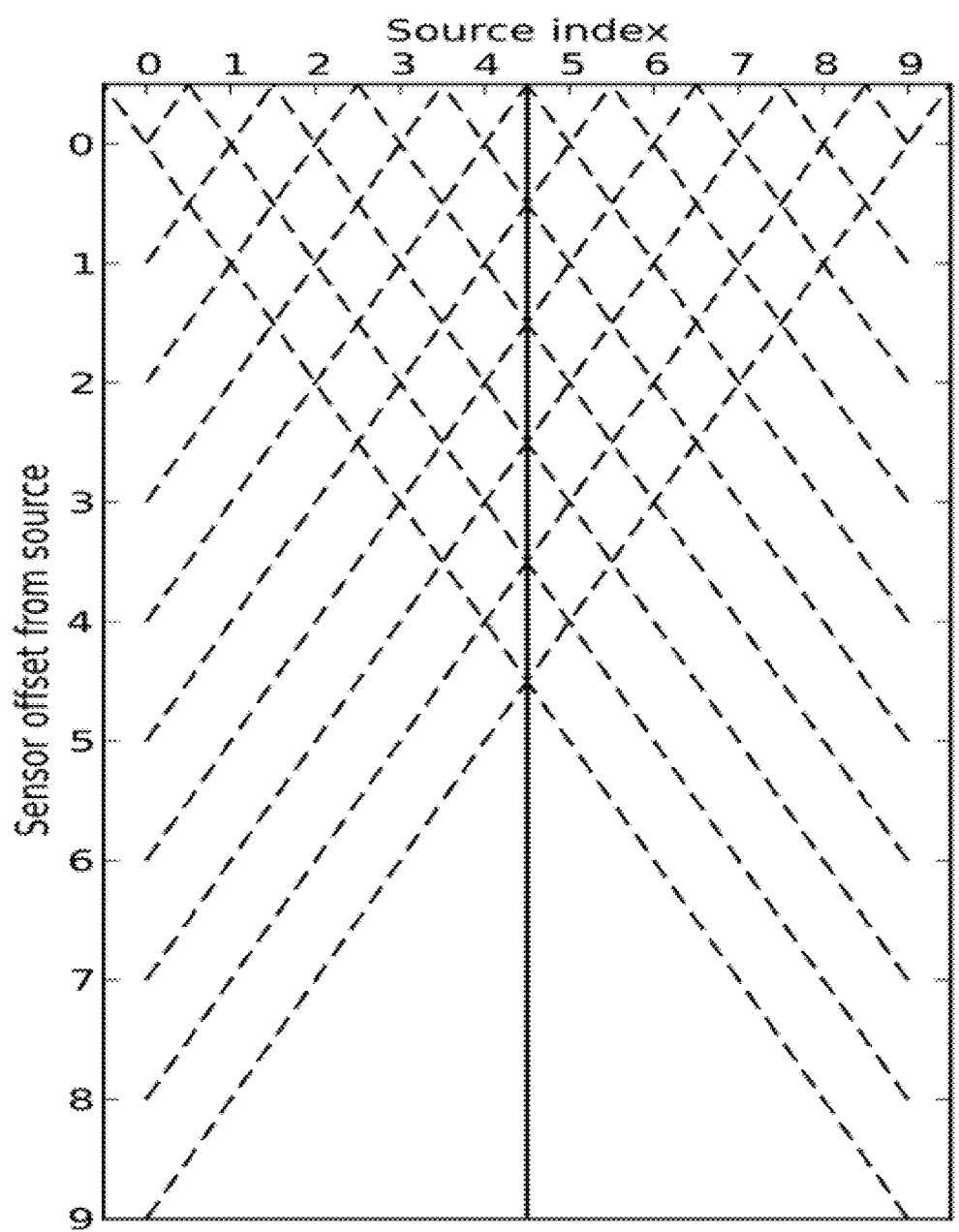
FIG. 1 is a simplified illustration of light emitted from light sources along the solid lines, and reflected along the dashed lines to light sensors, in accordance with an embodiment of the present invention.

Reference is made to FIG. 1, which is a simplified illustration of light emitted from light sources along the solid lines, and reflected along the dashed lines to light sensors, in accordance with an embodiment of the present invention. FIG. 1 shows how light is emitted straight out from sources in collimated beams. Light that hits an obstacle is reflected diffusely. Sensors detect incoming light from reflections in two narrow corridors that reach out from the sensor in two fixed directions-both at the same angle away from opposite sides of the light beams, but on opposite sides of each beam, e.g., 30° and −30° from the emitter beam.

The amount of light that travels from one source to a sensor depends on how centered the obstacle is on the source's beam, and how centered it is on one of the sensor's corridors. Such a source/sensor pair is referred to as a "hotspot". The obstacle location that gives the highest amount of light for a hotspot is referred to as the "hotspot location" or the "target position" for that source/sensor pair. A proximity sensor according to the present invention measures the transmitted amount of light for each hotspot, and each such measurement is referred to as a "hotspot signal value". The measurement normalizes all hotspot signal values so as to have the same range.

Since light that hits an obstacle is reflected diffusely and reflections are maximally detected in two narrow corridors at opposite sides of the light beams, the present specification refers to a forward direction detection based on all of the narrow detection corridors in a first direction, and a backward direction detection based on all of the narrow detection corridors in the second direction. Stated differently, the forward direction includes all detections of emitter-detector pairs in which the detector of the pair has a higher location index than the emitter of the pair, and the backward direction includes all detections of emitter-detector pairs in which the detector of the pair has a lower location index than the emitter of the pair. The forward direction may be left or right, depending on device orientation. A hotspot where the sensor looks in the backward direction is referred to as a "backward hotspot", and vice versa for those looking forward.

Figure 2:
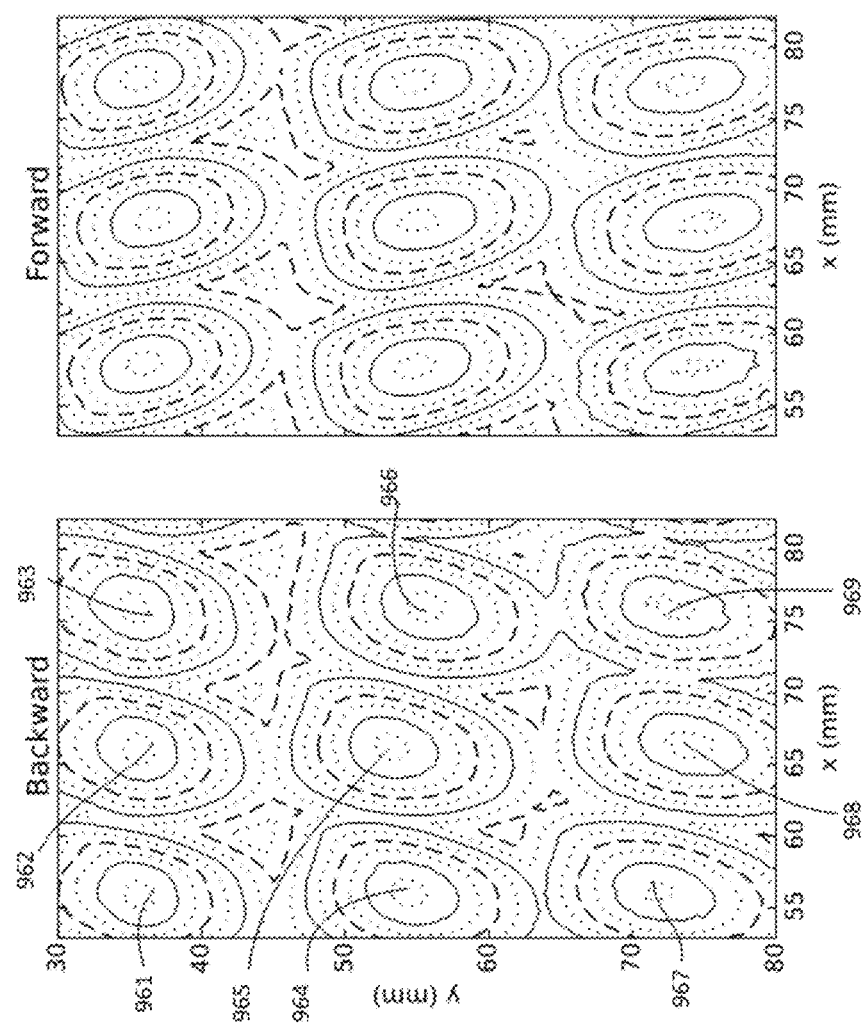
FIG. 2 is an illustration of backward and forward hotspot signal values, in accordance with an embodiment of the present invention.

Reference is made to FIG. 2, which is an illustration of backward and forward hotspot signal values, i.e., signal values for emitter-detector pairs, in accordance with an embodiment of the present invention. Hotspot signal values are sampled with an obstacle placed at locations in a dense grid spanning all hotspot locations; i.e., all locations at which an object can be placed such that the emitter-detector pairs will detect a reflection value. FIG. 2 shows the maximum of all hotspot signal values at obstacle locations within a region that spans 3×3 hotspot locations, or target positions, separately for backward and forward hotspots. In FIGS. 2-5 hotspot locations are indicated as numbered elements 961-969 only in the illustrations of backward hotspot signal values. In FIGS. 2-5 the hotspot locations in the illustrations of forward hotspot signal values are not indicated as numbered elements in order to avoid cluttering the figure.

Figure 3:
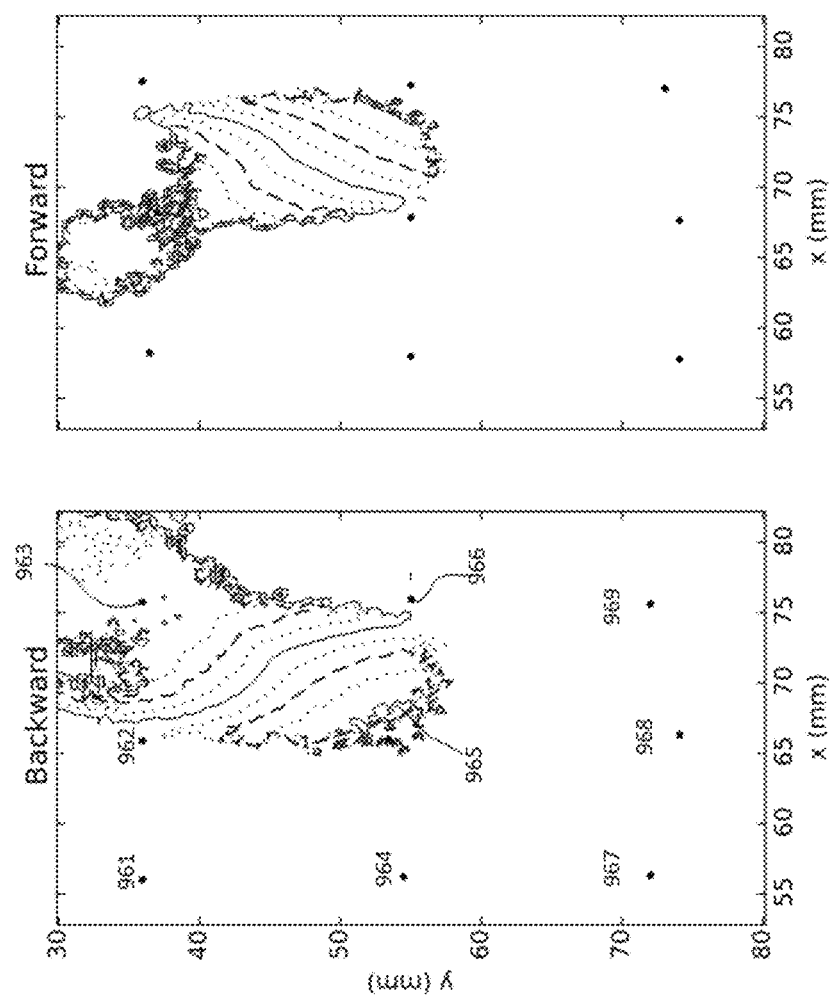
FIG. 3 is an illustration of the signal value relationship between top-middle and center hotspots, in accordance with an embodiment of the present invention.
Figure 4:
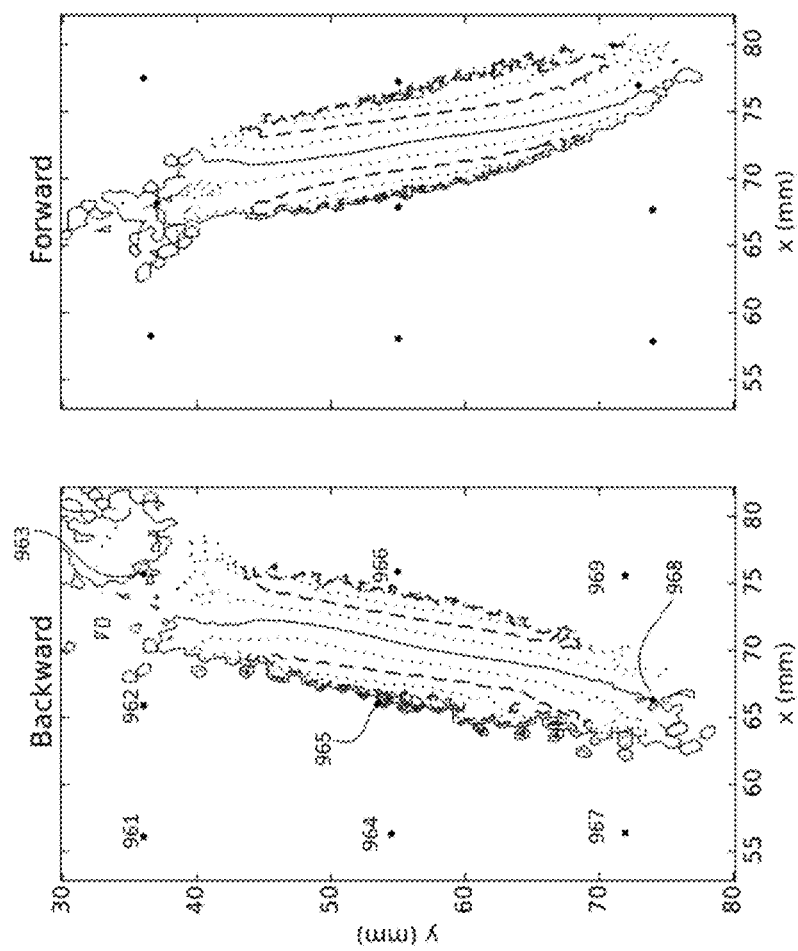
FIG. 4 is an illustration of the signal value relationship between right-middle and center hotspots, in accordance with an embodiment of the present invention.
Figure 5:
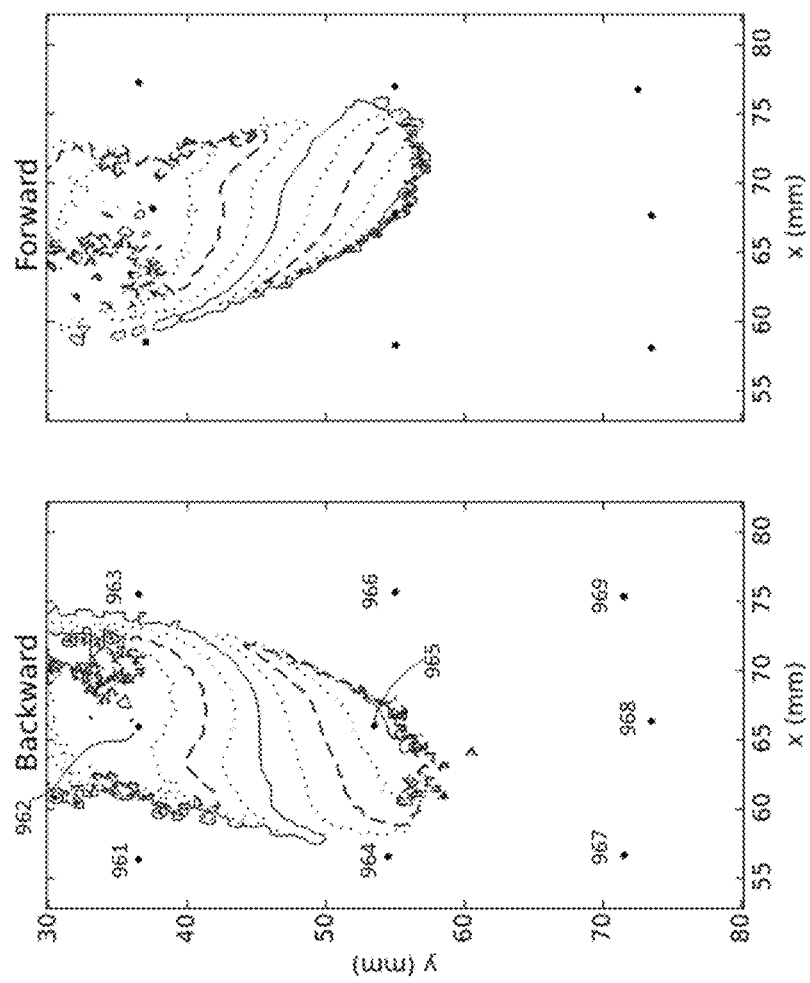
FIG. 5 is an illustration of the signal value relationship between top-right and center backward hotspots, and top-middle and right-middle forward hotspots, in accordance with an embodiment of the present invention.
Figure 6:
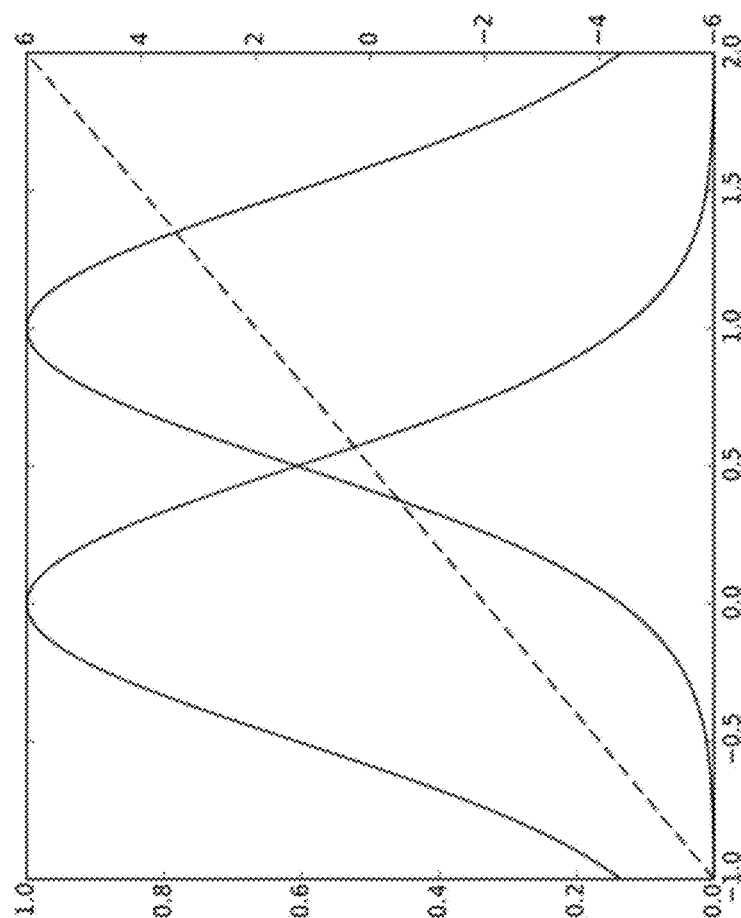
FIG. 6 is an illustration showing that the relationship between two signal values v0 and v1 (solid lines) is expressed as r=log(v1)−log(v0) (dashed line), in accordance with an embodiment of the present invention.

Reference is made to FIG. 3, which is an illustration of the signal value relationship between top-middle and center hotspots within a 3×3 grid of forward hotspots, i.e., hotspots at locations (2,1) and (2,2) in the 3×3 grid, in accordance with an embodiment of the present invention. Reference is also made to FIG. 4, which is an illustration of the signal value relationship between right-middle and center hotspots within a 3×3 grid of forward hotspots, i.e., hotspots at locations (3,2) and (2,2) in the 3×3 grid, in accordance with an embodiment of the present invention. Reference is also made to FIG. 5, which is an illustration of the signal value relationship between top-right and center backward hotspots, and top-middle and right-middle forward hotspots, each within a 3×3 grid of hotspots, in accordance with an embodiment of the present invention. FIGS. 3-5 show relationships between two adjacent hotspot signal values. Each curve follows a fixed relationship value, similar to a topological map. Reference is also made to FIG. 6, which is an illustration showing that the relationship between two signal values v0 and v1 (solid lines) is expressed as a difference of logarithms of the values (dashed line), in accordance with an embodiment of the present invention. FIG. 6 shows the relationship expressed as $r=\log(v1)-\log(v0)$. This relationship is drowned in noise when either of the signal values has a low signal-to-noise (SNR) ratio.

The signal value relationship between two vertically adjacent hotspots corresponds to a curve in FIG. 3. If the signal values are assumed to be normally distributed with a certain standard deviation, then that assumption may be used to find an interpolated location between the hotspot locations according to FIG. 6, referred to as a "crossing". It does the same for two vertically adjacent hotspots next to and at either side of the first, to create a second crossing. The rationale is that the obstacle location is somewhere between the two crossings. If the curves in FIG. 3 are all straight and parallel, this would be accurate. However, curvature causes inaccuracy.

To account for such curvature, the location between the crossing is found using the same method, but from the relationships of horizontally adjacent hotspots. The curves are now those in FIG. 4. Instead of finding horizontal crossings and selecting the location between both pairs of crossings, a shortcut is used. The vertical crossings are thought of as virtual hotspots, and each signal value is estimated based on the real hotspot signal values and the relative distance to each. The signal value relationship of the crossing's virtual hotspots gives the obstacle location directly.

Since the hotspot signal values for all obstacle locations have been recorded by a robot, finding a new obstacle location is achieved by finding the sample whose signals match those caused by the obstacle. This may not be efficient, though, due to high memory and high time complexity. Comparing the relationship between the highest signal values and those of adjacent hotspots should be sufficient.

Figure 7:
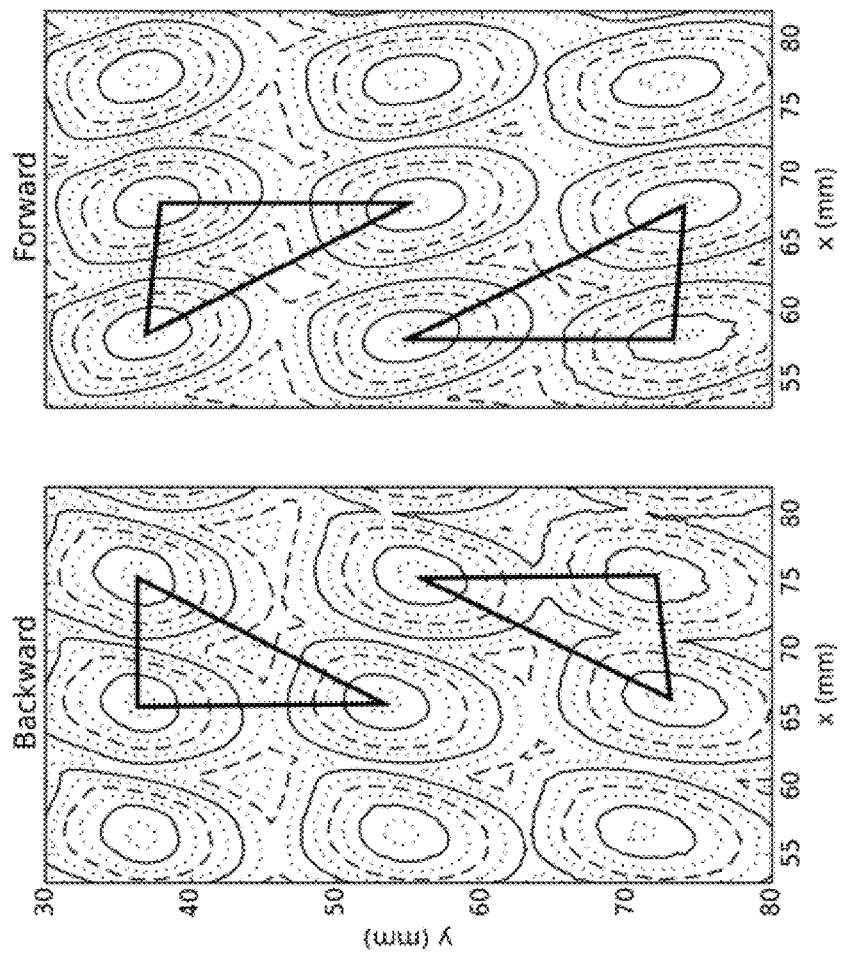
FIG. 7 is an illustration using triangles to mark areas in which all spanning hotspot signal values are relatively strong, in accordance with an embodiment of the present invention.

Reference is made to FIG. 7, which is an illustration using triangles to mark areas in which all spanning hotspot signal values are relatively strong, in accordance with an embodiment of the present invention. The mapping from two-dimensional signal relationships to three-dimensional location and reflectivity is similar in all triangles; especially so in triangles of the same orientation in the same horizontal band. This means that the mapping needs to be learned and stored for only a few triangle groups. It may be observed in FIG. 2 that there are triangular areas spanned by three hotspots, in which those three hotspot signal values are all relatively high. Some of these are drawn in FIG. 7. This means that the three pairwise relationships between those signals will be above noise within the area. Out of those three relationships one is redundant, since it is derivable from the other two. Within such a triangle, two signal relationships map to a location within that triangle. It also maps to the reflectivity of the obstacle relative to the observed hotspot signal values. These triangular areas cover the whole screen, so the location and reflectivity of an obstacle is found by finding the triangle that is spanned by the hotspots with the highest signal values, and mapping the signal relationships to location and reflectivity.

The mapping transform takes the vertical (FIG. 3) and diagonal (FIG. 5) signal relationships as input. The input 2D space, from minimum to maximum observed in each dimension, is covered by a 9×9 grid of nodes. Each node contains a location expressed in a frame of reference spanned by the triangle's edges. The location may be slightly outside of the triangle. It also contains a compensation factor that, when multiplied with the highest signal value, gives the reflectivity of the obstacle. The four nodes closest to the input are interpolated with bi-linear interpolation.

All hotspots that have a signal value above a certain threshold, and that are stronger than all its eight neighbors, are evaluated for possible detections. All six triangles that use the maximum hotspot are screened as possible contributors to the detection. Each triangle is given a weight that is calculated as the product of all its hotspot signal values. The highest three are kept, and their weights are reduced by that of the fourth highest. The kept triangles are evaluated, and their results are consolidated to a weighted average, using the weights used for screening.

Finding strong signals around which to evaluate triangles, and tracking, may be performed as described in U.S. Pat. No. 9,164,625, entitled OPTICAL PROXIMITY SENSORS and filed on Jun. 24, 2014.

Using a robot to place a stylus at known locations opposite the sensor and recording the resulting detection signals, enables quantifying accuracy of the algorithm. The recorded sample signal values are sent as input to the algorithm in random order, and the calculated detection locations based on these inputs are compared to the actual sample locations.

Figure 8:
FIG. 8 is an illustration showing detection errors across a 100×64 mm touch screen, in accordance with an embodiment of the present invention.

Reference is made to FIG. 8, which is an illustration showing detection error across a 100×64 mm touch screen, in accordance with an embodiment of the present invention. The 2D error vector is color coded according to the legend at the right in FIG. 8. The legend circle radius is 5 mm. FIG. 8 shows how large, and in what direction, the error is for samples across the screen.

Figure 9:
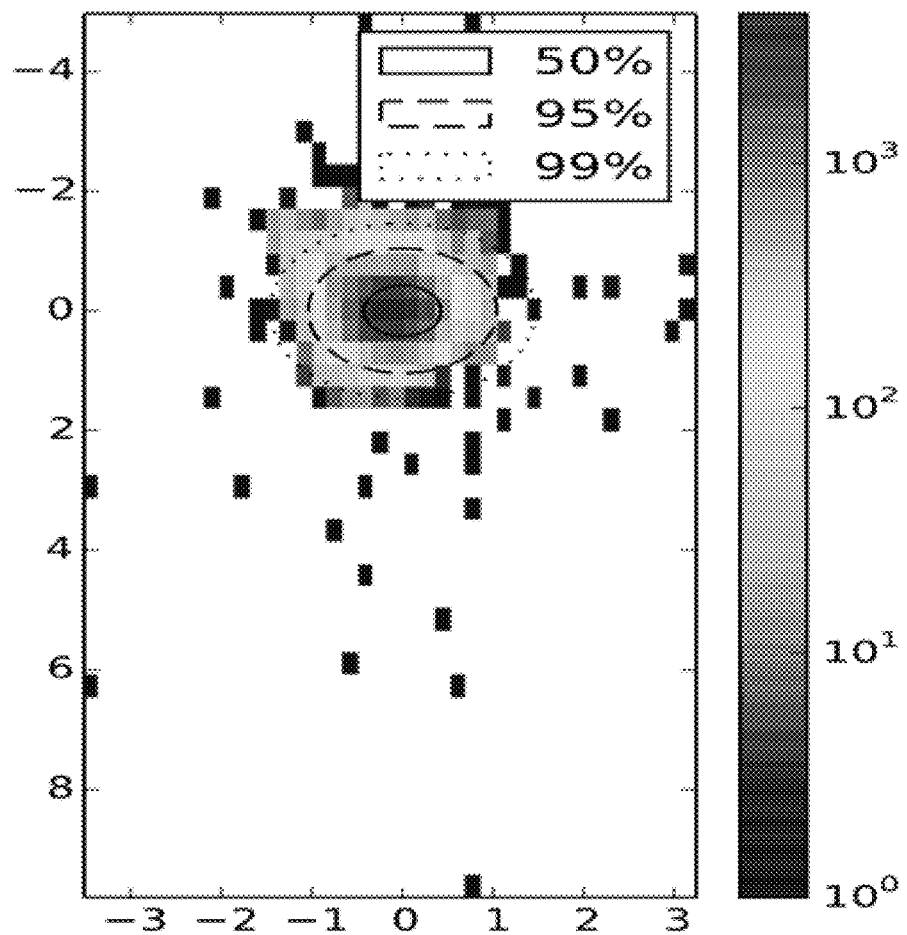
FIG. 9 is an illustration showing a 2D histogram of sample error vectors, in accordance with an embodiment of the present invention.

Reference is made to FIG. 9, which is an illustration showing a 2D histogram of sample error vectors, in accordance with an embodiment of the present invention. The units of the axes are mm. FIG. 9 shows the distribution of the errors. TABLE I below provides the quantified accuracy values.

| Measurement | Value |
| --- | --- |
| Error distances 50:th percentile | 0.43 mm |
| Error distances 95:th percentile | 1.04 mm |
| Error distances 99:th percentile | 1.47 mm |
| True positives | 100.0% |
| False positives | 0.0% |

Reference is made to FIGS. 10-13, which are simplified illustrations of a proximity sensor, in accordance with an embodiment of the present invention. FIGS. 10-13 show a proximity sensor 501, according to the teachings of the present invention. Proximity sensor 501 includes light sources 101-110 and light sensors 201-211, each light source being situated between two of the sensors. Proximity sensor 501 also includes a plurality of lenses, such as lenses 301-304, each lens being positioned in relation to two respective neighboring ones of the sensors such that light entering that lens is maximally detected at a first of the two sensors when the light enters that lens at an acute angle of incidence θ1, and light entering that lens is maximally detected at the other of the two sensors when the light enters that lens at an obtuse angle of incidence θ2. The lens is positioned in relation to the light source situated between these two sensors such that the light from the light source is collimated as it exits proximity sensor 501. This arrangement provides the two narrow corridors that extend from each sensor in two fixed directions away from opposite sides of the projected light beams discussed above with respect to FIG. 1.

Figure 10:
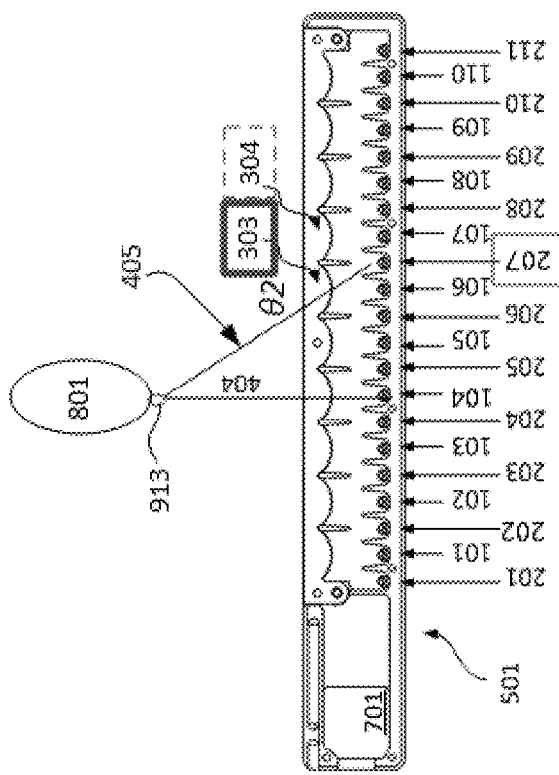
FIGS. 10-13 are simplified illustrations of a proximity sensor, in accordance with an embodiment of the present invention.
Figure 11:
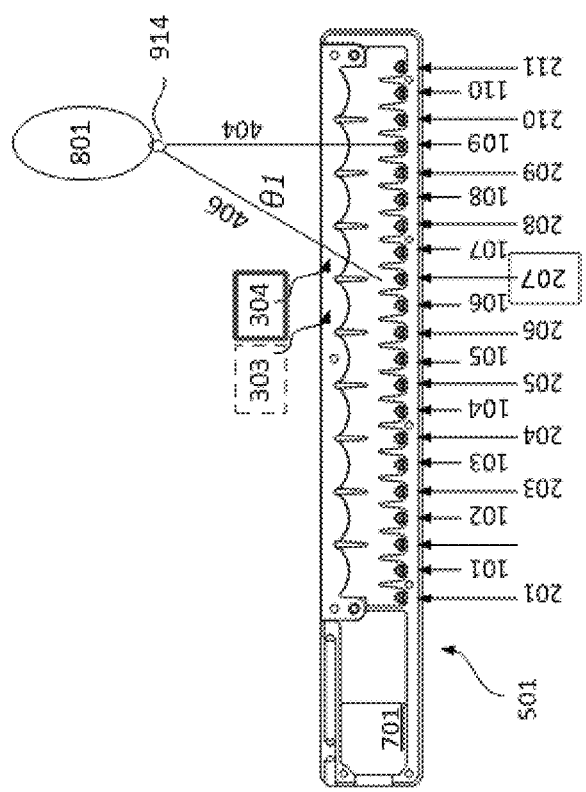

FIG. 10 shows a forward reflection path of maximum detection for hotspot 913 generated by source/sensor pair 104/207, whereby light from source 104 reflected off object 801 is maximally detected by sensor 207, and FIG. 11 shows a backward reflection path of maximum detection for hotspot 914 generated by source/sensor pair 109/207, whereby light from source 109 reflected off object 801 is maximally detected by sensor 207. FIGS. 10 and 11 show how sensor 207 is situated with respect to neighboring lenses 303 and 304 such that sensor 207 receives maximum forward reflection values via lens 303, and maximum backward reflection values via lens 304.

Figure 12:
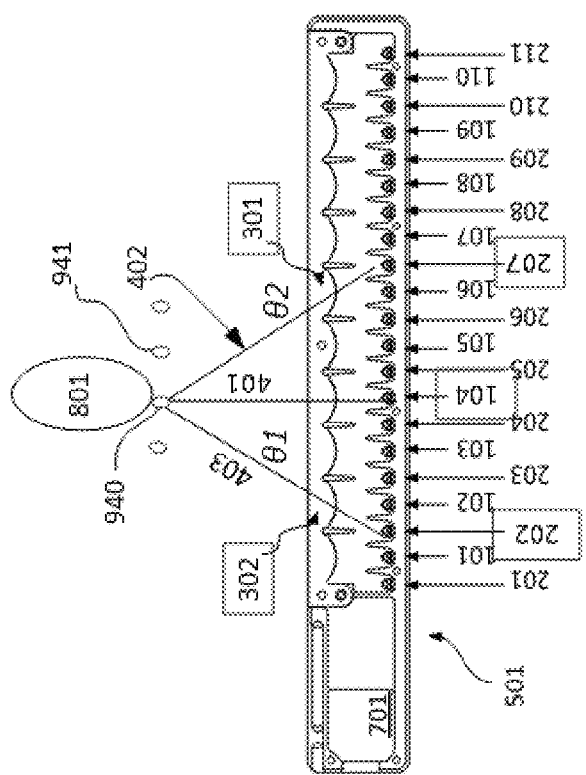
Figure 13:
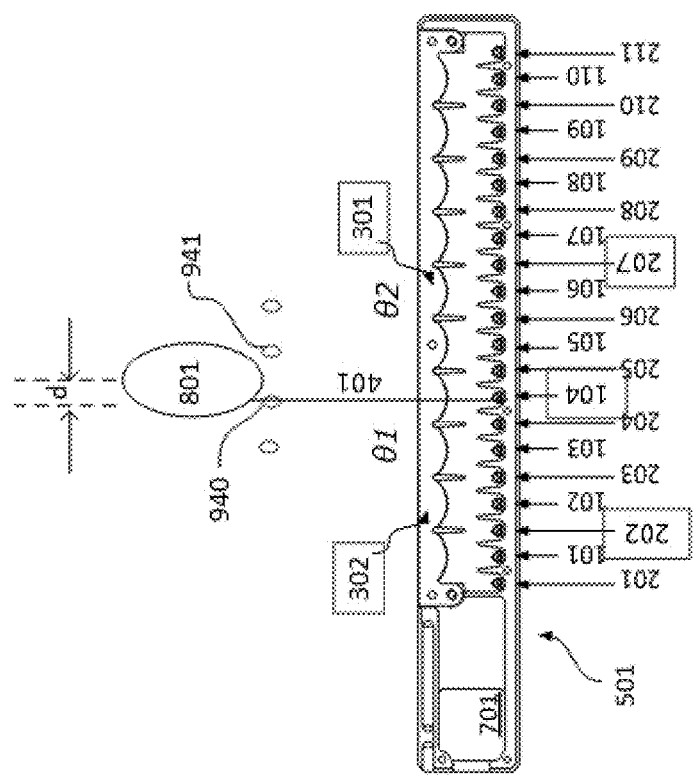

As explained above with respect to FIG. 1, the intersections outside proximity sensor 501 between the projected light beams and the corridors of maximum detection provide a map of hotspots. Four hotspots are illustrated in FIGS. 12 and 13, two of which are numbed 940 and 941. An object 801 is shown nearest hotspot 940 in FIG. 12. Thus, the maximum detection of object 801 is generated by source/sensor pairs 104/202 and 104/207. Source/sensor pair 104/202 provides backward detection, and source/sensor pair 104/207 provides forward detection, as discussed above. Additional detections are generated by other source/sensor pairs, e.g., forward detection source/sensor pair 105/208, because light beams from source 105 are scattered, and a portion thereof arrives at sensor 208, but the amount of light detected at sensor 208 is significantly less than that generated by source/sensor pair 104/207, because the scattered light arriving at sensor 208 does not travel on the corridor of maximum detection.

FIG. 13 shows proximity sensor 501 of FIG. 12, but object 801 is moved a distance d to the right. In this case similar amounts of detection will be generated by forward source/sensor pairs 104/207 and 105/208. Each of these detections will be less than the detection generated by source/sensor pair 104/207 in FIG. 12 and greater than the detection generated by source/sensor pair 105/208 in FIG. 12, as explained above with reference to FIGS. 3-7. The location of object 801 between hot spots 940 and 941 is calculated by interpolating the amounts of light detected by source/sensor pairs 104/207 and 105/208. As discussed above with reference to FIG. 7, a location of object 801 is calculated by performing at least two interpolations between amounts of light detected by source/sensor pairs that correspond to three neighboring hotspots, the neighboring hotspots being the vertices of a triangle in the detection space.

In order to determine how to interpolate the detected amounts of light, detection sensitivities are calculated in the vicinities of the hotspots using a calibration tool that places a calibrating object having known reflective properties at known locations in the detection zone outside proximity sensor 501. At each known location, a plurality of source/sensor pairs is synchronously activated and amounts of light detected by neighboring activated sensors are measured. Repetitive patterns in relative amounts of light detected by the neighboring activated sensors as the object moves among the known location are identified. These patterns are used to formulate detection sensitivities of proximity sensor 501 in the vicinities of the hotspots which are used to determine how to interpolate the amounts of light detected in order to calculate the location of a proximal object.

Figure 14:
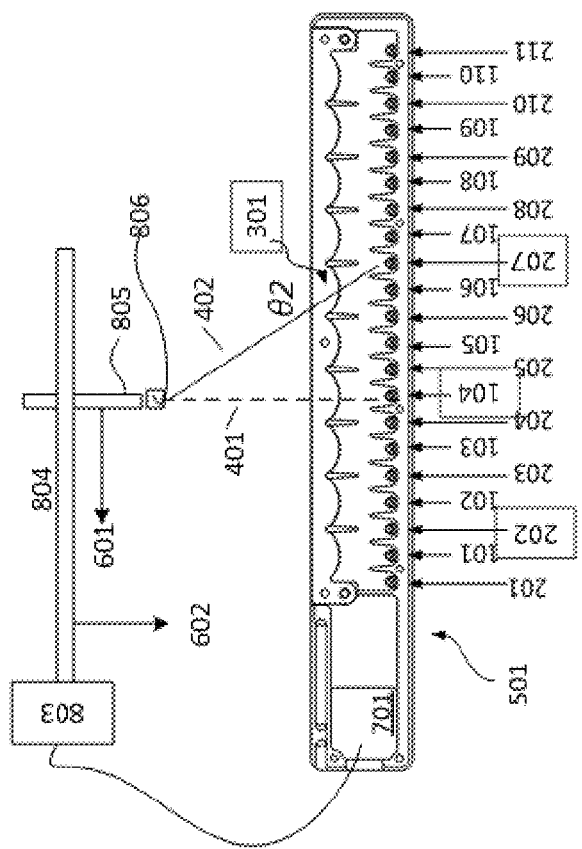
FIGS. 14 and 15 are simplified illustrations of calibration tools for the proximity sensor of FIGS. 10-13, in accordance with an embodiment of the present invention.
Figure 15:
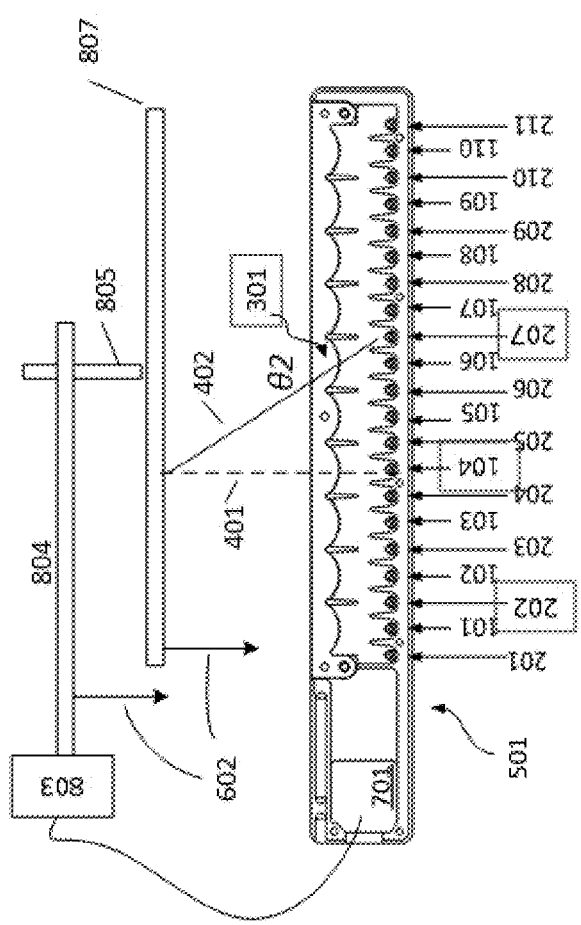

Reference is made to FIGS. 14 and 15, which are simplified illustrations of calibration tools for the proximity sensor of FIGS. 10-13, in accordance with an embodiment of the present invention. FIG. 14 shows a first calibration tool that includes motor 803, and shafts 804 and 805 that move reflective calibration object 806 horizontally and vertically in relation to proximity sensor bar 501, as indicated by arrows 601 and 602. At each location at which object 806 is placed, a plurality of source/sensor pairs that correspond to hotspots in the vicinity of that location are activated and the amounts of light detected are used to determine the sensitivity in the vicinity of those hotspots. Multiple such source/sensor pairs that share a common light source are activated simultaneously.

In some embodiments, the calibration tool, either that illustrated in FIG. 14 or that illustrated in FIG. 15, is used on certain representative units of proximity sensor 501, and the interpolation methods derived therefrom are applied to other similar units. In other embodiments however, either calibration tool is used on each unit of proximity sensor 501, in order to provide interpolations tailored to each individual proximity sensor.

FIG. 15 shows a second calibration tool that differs from that of FIG. 14 in the size and shape of the reflective calibration object. In FIG. 14 calibration object 806 is modeled as a finger or stylus typically used with proximity sensor bar 501, whereas in FIG. 15 calibration object 807 is a rod that spans the length of proximity sensor bar 501. The rod is covered in a material having reflective properties similar to those of skin or of a stylus typically used with proximity sensor bar 501. In the calibration tool of FIG. 15, shaft 805 remains at a fixed location on shaft 804, such that object 807 only moves toward and away from proximity sensor bar 501, as indicated by arrows 602. In this case, at each location of object 807 the light sources are activated one after the other and, during each light source activation, any of the light sensors 201-211 that may reasonably be expected to detect a significant reflection therefrom are activated. In some embodiments, all of the light sensors 201-211 are simultaneously activated with each light source activation.

In addition to determining interpolation methods, the calibration tools are used to map the locations of the hotspots that correspond to the source/sensor pairs. Often the locations of the hotspots are shifted from their expected locations due to mechanical issues such as imprecise placement or alignment of a light source or light detector within proximity sensor 501. When used to this end, numerous proximity sensor units need to be calibrated and the calibration tool of FIG. 15 is more efficient than that of FIG. 14.

Figure 16:
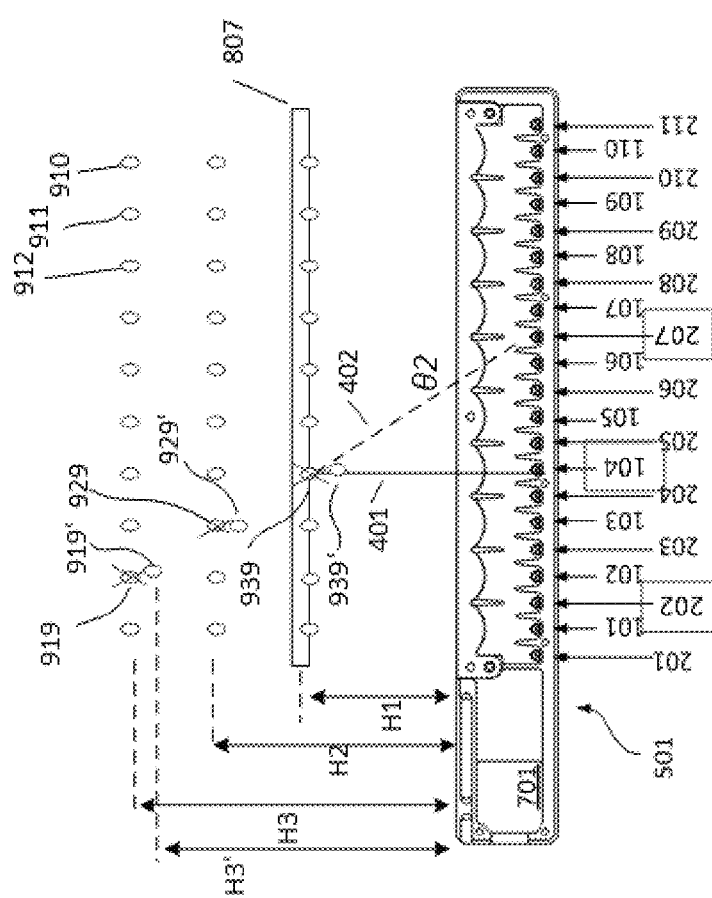
FIGS. 16 and 17 are simplified illustrations showing how the calibration tool of FIG. 15 identifies how the emitters and detectors of the proximity sensor have been mounted therein, in accordance with an embodiment of the present invention.
Figure 17:
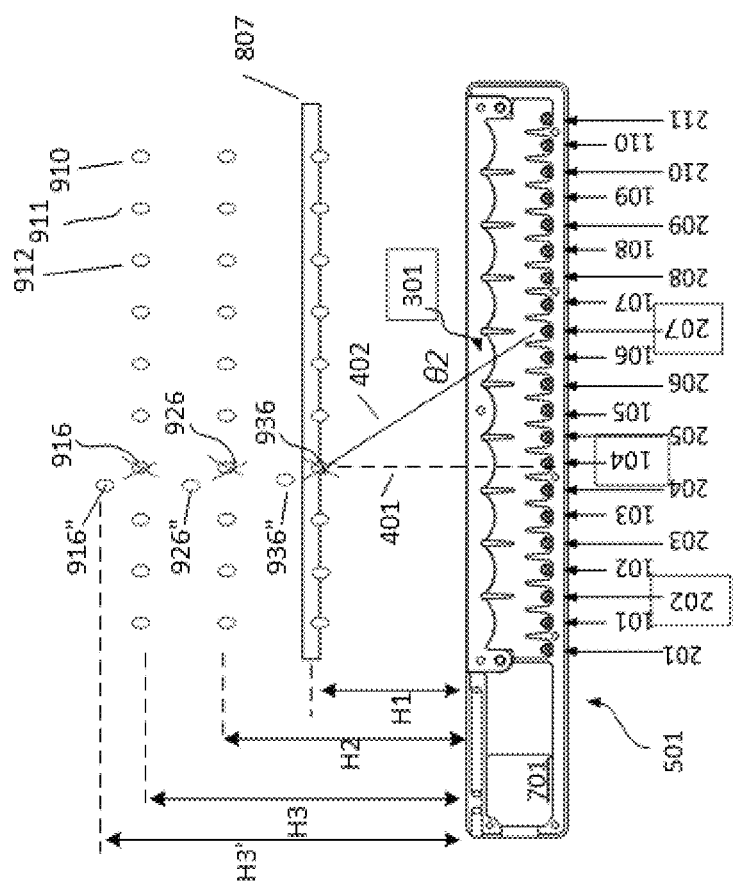

Reference is made to FIGS. 16 and 17, which are simplified illustrations showing how the calibration tool of FIG. 15 identifies how the emitters and detectors of the proximity sensor have been mounted therein, in accordance with an embodiment of the present invention. FIGS. 16 and 17 show how imprecise placement of a light sensor (FIG. 16) or a light source (FIG. 17) is identified by the calibration tool of FIG. 15. FIG. 16 shows three rows of hot spots including hotspots 910-912, 919, 929, and 939. These are expected hot spot locations, i.e., proximity sensor 501 is designed to provide maximum detections of reflected light for respective activated source/sensor pairs when an object is placed at these locations. This is verified as calibration rod 807 moves closer to proximity sensor 501. Each row of hot spots is situated at a fixed distance from proximity sensor 501. Three distances are shown: H1, H2 and H3.

FIG. 16 shows how, when light sensor 207 is placed slightly to the left of its correct position within proximity sensor 501, maximum detection measured at this light sensor corresponds to hotspot locations 919', 929' and 939'. Calibration rod 807 enters these positions at different distances than those expected. FIG. 16 shows how calibration rod 807 arrives at hotspot location 919' when it is a distance H3' from proximity sensor 501. By analyzing a series of local maximum detections that share a common light sensor and occur at different distances than those expected, the calibration system detects the offset of a light sensor from its expected position. In some embodiments processor 701 controls, or receives input from, motor 803 and processor 701 updates its map of hotspots according to the actual local maximum detections.

FIG. 17 shows how, when light source 104 is placed slightly to the left of its correct position within proximity sensor 501, maximum detection measured for source/sensor pairs that include light source 104 are shifted from expected hotspot locations 916, 926 and 936, to positions 916', 926' and 936'. FIG. 17 shows how calibration rod 807 arrives at hot spot position 916' when it is a distance H3' from proximity sensor 501. By analyzing a series of local maximum detections that share a common light source and occur at different distances than those expected, the calibration system detects the offset of the light source from its expected position.

Figure 18:
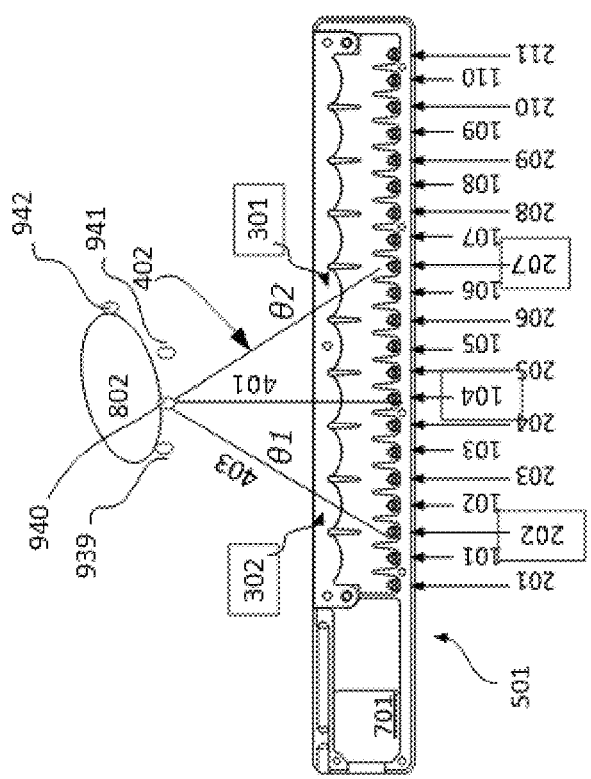
FIG. 18 is a simplified illustration of a proximity sensor detecting a proximal object, in accordance with an embodiment of the present invention.

A proximity sensor according to the present invention is used to estimate a partial circumference of a proximal object. Reference is made to FIG. 18, which is a simplified illustration of a proximity sensor detecting a proximal object, in accordance with an embodiment of the present invention. FIG. 18 shows proximity sensor strip 501 and proximal object 802. Four hotspot locations 939-942 along the edge of object 802 facing the sensor are shown. The reflection values associated with these hotspot locations are used to estimate the contour of this edge.

As described above, each hotspot location is associated with one or two source/sensor pairs. In FIG. 18, hotspot location 940 is associated with source/sensor pairs 104/202 and 104/207.

The reflection values are used to generate a two-dimensional pixel image of reflection values indicating where reflective surfaces are positioned. For example, when all hotspot locations for all source/sensor pairs in proximity sensor 501 are assigned their respective, normalized reflection values, the result is a two-dimensional image. The reflection values in different embodiments are normalized within a range determined by the number of bits provided for each pixel in the two-dimensional image, e.g., 0-255 for 8-bit pixel values, and 0-1023 for 10-bit pixel values.

Figure 19:
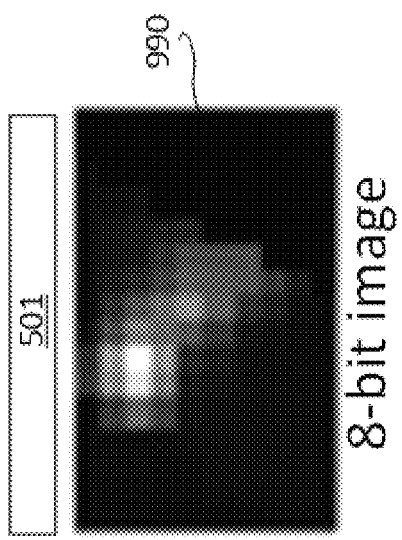
FIG. 19 is a simplified illustration of a two dimensional image of detection values, in accordance with an embodiment of the present invention.

Reference is made to FIG. 19, which is a simplified illustration of a two dimensional image of detection values, in accordance with an embodiment of the present invention. FIG. 19 shows proximity sensor 501 whose detection plane is directed downward and the resulting two-dimensional image 990 of reflection values generated by an object situated within that detection plane. The pixel values in image 990 are 8-bit values.

Because more than one source/sensor pair corresponds to each hotspot location, the reflection value for that location in the two-dimensional image can be derived in different ways. Namely, the forward-direction source/sensor pair can be used, or the backward-direction source/sensor pair can be used. In some embodiments, the average of these two values is used, and in other embodiments the maximum of these two values is used, such that some pixels derive their values from forward-direction source/sensor pairs, and other pixels derive their values from backward-direction source/sensor pairs.

Figure 20:
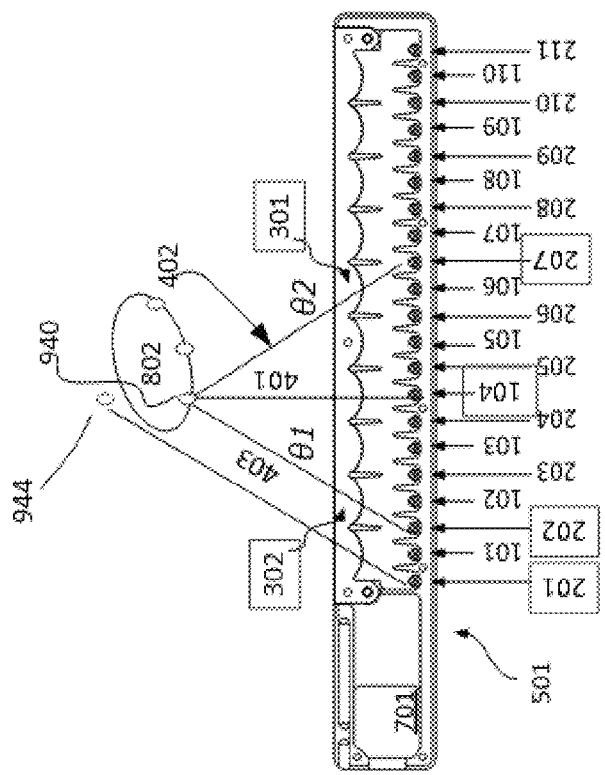
FIGS. 20 and 21 are simplified illustrations of a detected reflection value for an emitter-receiver pair that is not associated with that pair's hotspot location, in accordance with an embodiment of the present invention.
Figure 21:
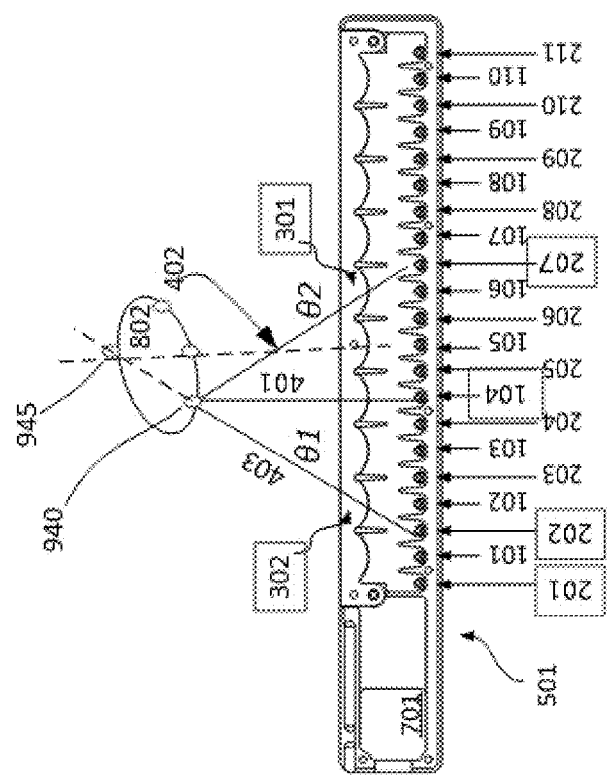

Certain reflection values for source/sensor pairs are not caused by a reflective object at the corresponding hotspot, but rather by stray reflections at entirely different locations. FIGS. 20 and 21 show how these cases are identified. Once identified, the corresponding pixel values in the two-dimensional image are reset to zero.

Reference is made to FIGS. 20 and 21, which are simplified illustrations of a detected reflection value for an emitter-receiver pair that is not associated with that pair's hotspot location, in accordance with an embodiment of the present invention. FIG. 20 shows hotspot locations 940 and 944 aligned along a common emitter beam path 401. Hotspot location 940 corresponds to source/sensor pairs 104/202 and 104/207, and hotspot location 944 corresponds to source/sensor pairs 104/201 and 104/208. It is clear from FIG. 20 that any light from emitter 104 is blocked by object 802 well before it arrives at hotspot location 944, and therefore any light detected at sensors 201 and 208 during activation of source 104 is not generated by a reflective object at hotspot location 944, but is rather stray reflections off the object at other locations. Therefore, the reflection value appropriate for hotspot location 944 is zero.

This state is determined by the fact that source/sensor pair 104/202 has a significant detected reflection value, indicating that a reflective object is at corresponding location 940, and therefore, light beam 401 does not arrive at location 944. Moreover, because the lenses and the sensors are configured such that the maximum detection arrives at the sensor when it is reflected at angle θ1 it is clear that the source/sensor pair detecting the maximum reflection from among all source/sensor pairs that share a common source is the pair detecting reflections from an object at, or near, the corresponding hotspot location. Indeed, in the example shown in FIG. 20 the detection value for source/sensor pair 104/202 is much greater than the detection value for source/sensor pair 104/201. For the same reason, the detection value for source/sensor pair 104/207 is much greater than the detection value for source/sensor pair 104/208. A similar situation is illustrated in FIG. 21, except that in this case the two hotspot locations are situated along a common detection path.

FIG. 21 shows hotspot locations 940 and 945 aligned along a common maximum detected reflection path 403. Hotspot location 940 corresponds to source/sensor pair 104/202, and hotspot location 945 corresponds to source/sensor pair 105/202. It is clear from FIG. 21 that light from only one location can be reflected along path 403 onto receiver 202. And because the detected reflection value for source/sensor pair 104/202 is greater than the detection value for source/sensor pair 105/202, it is safe to assume that the reflecting object is at, or near, hotspot location 940, and the detection value for source/sensor pair 105/202 is not caused by a reflective object at hotspot location 945. Therefore, the reflection value appropriate for hotspot location 945 is zero.

In general, an emitted light path LP, such as path 401 in FIG. 17, has a plurality of hotspot locations thereon, denoted $P_1, P_2, \ldots, P_N$, at different distances from the proximity sensor 501, such as hotspot locations 916, 926 and 936, in FIG. 17. When an object is located at one of these locations, denoted $P_i$ other hotspot locations $P_{i+j}$ and $P_{i-k}$ also have corresponding detection values. In such cases, the hotspot location $P_{max}$ for which a maximum detection value is detected from among hotspot locations along LP, is considered to correspond to the object, and all detection values for hotpot locations further from proximity sensor 501 are reset to zero. Detection values for hotpot locations between $P_{max}$ and proximity sensor 501 are retained. Often, two hotspot locations $P_{max}$ and $P_{max+1}$ are used to calculate the location of the object, as explained hereinabove, and in such cases $P_{max+1}$ is not reset to zero.

Similarly, a reflected light path RP, such as path 402 in FIG. 16, has a plurality of hotspot locations thereon, denoted $P_1, P_2, \ldots, P_N$, at different distances from the proximity sensor 501, such as hotspot locations 919, 929 and 939, in FIG. 16. When an object is located at one of these locations, denoted $P_i$ other hotspot locations $P_{i+j}$ and $P_{i-k}$ also have corresponding detection values. In such cases, the hotspot location $P_{max}$ for which a maximum detection value is detected from among hotspot locations along RP, is considered to correspond to the object, and all detection values for hotpot locations further from proximity sensor 501 are reset to zero. Detection values for hotpot locations between $P_{max}$ and proximity sensor 501 are retained. Often, two hotspot location $P_{max}$ and $P_{max+1}$ are used to calculate the location of the object, as explained hereinabove, and in such cases $P_{max+1}$ is not reset to zero.

Figure 22:
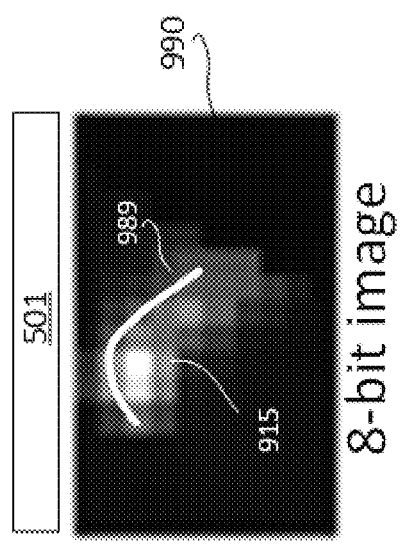
FIG. 22 is a simplified illustration of a detected partial circumference of an object in a two dimensional image of detection values, in accordance with an embodiment of the present invention.

In this manner, the two-dimensional pixel image is refined and begins to represent the contour of the object facing the sensor. Reference is made to FIG. 22, which is a simplified illustration of a detected partial circumference of an object in a two dimensional image of detection values, in accordance with an embodiment of the present invention. FIG. 22 shows the detected partial circumference 989 in the detection image 990 of FIG. 19 and an example pixel 915 having a non-zero detection value, but whose appropriate reflection value is zero, as explained hereinabove.

The next step is to filter the pixels in this image to obtain sub-pixel precision for the location of the object's contour between hotspot locations. After calculating sub-pixel values, various edge detection filters are applied to the two-dimensional pixel image to identify the edges of the object facing the sensor and discard stray reflections. Known edge detection filters include Sobel, Canny, Prewitt, Laplace, gradient. This edge information is used to determine a length of this portion of the object, i.e., a partial circumference of the object, and its location.

The length of the detected portion of the object is calculated using different methods, in accordance with different embodiments of the invention. Some embodiments determine the number of pixels, or sub-pixels, along the detected portion of the object. Other embodiments calculate the sum of the distances between each pair of neighboring pixels, or sub-pixels, along the detected portion of the object. Still other embodiments determine an equation for a curve that passes through each of the pixels, or sub-pixels, along the detected portion of the object, and calculates the length of the partial circumference of the object according to this equation.

In some embodiments, in order to relax processor complexity, an estimate of the partial circumference is calculated based on three points: the point on the object for which there is a maximum detection value and the two outermost points along the partial circumference.

Figure 23:
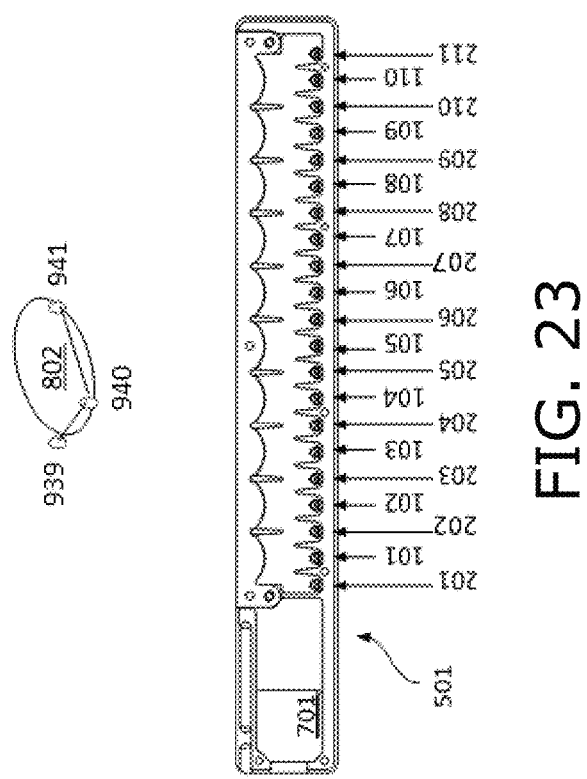
FIG. 23 is a simplified illustration of a method of estimating a partial circumference of an object, in accordance with an embodiment of the present invention.

Reference is made to FIG. 23, which is a simplified illustration of a method of estimating a partial circumference of an object, in accordance with an embodiment of the present invention. FIG. 23 shows point 940 for which there is a maximum detection value and two outermost points 939 and 941 along the partial circumference of object 802. An estimate of the partial circumference is the sum of the distances from point 939 to point 940 and from point 941 to point 940. In order to further refine this calculation, without adding much complexity to the calculations, the system calculates the sub-pixel coordinates of these three positions using the immediate neighbors of the respective hotspot locations 939-941, but does not calculate sub-pixel locations for any other pixels in the two-dimensional pixel image. Point 940, or a respective sub-pixel location, for which there is a maximum detection value is used as the object's coordinates.

In other embodiments of the invention, the shape of the proximity sensor is not a straight line, but circular, or wave-shaped to provide a 3-D detection volume, instead of a 2-D detection plane. In such alternative embodiments, the emitters and receivers are still alternated as they are in proximity sensor 501, and each emitter is paired with each of the receivers as a source/sensor pair having a corresponding hotspot within a 3D volume above the proximity sensor.

Figure 24:
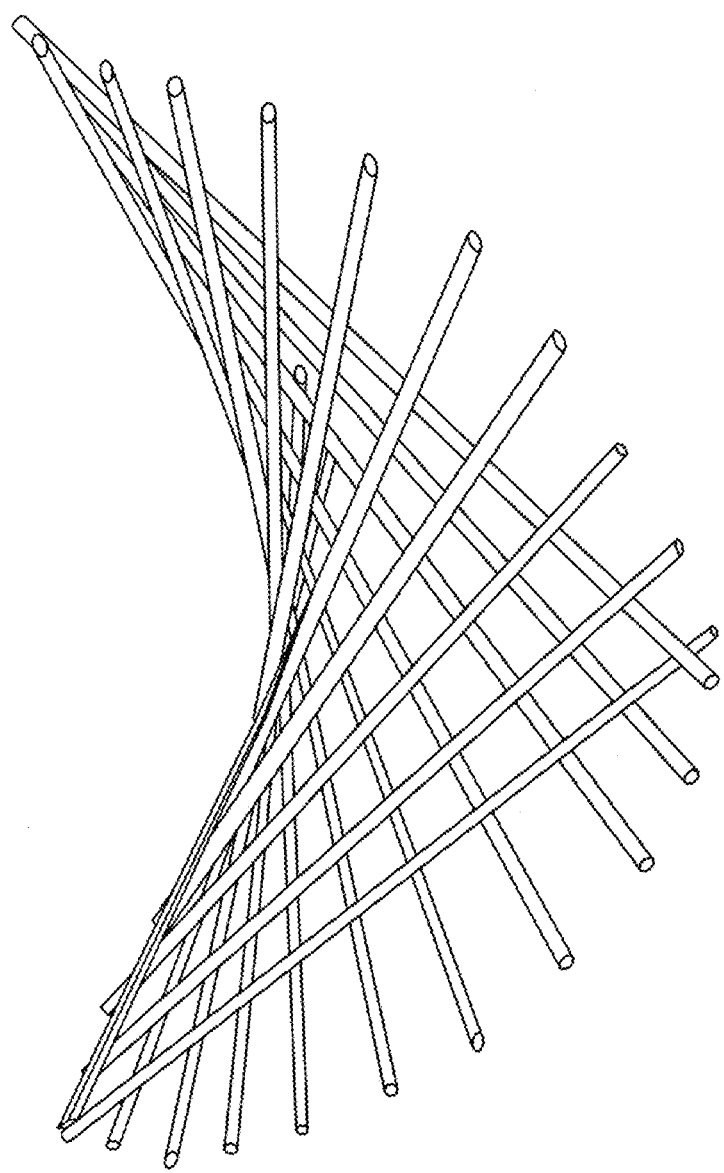
FIG. 24 is an illustration of a saddle roof or hyperbolic paraboloid corresponding to the emitter light paths and reflected light paths of a 3-D proximity sensor, in accordance with an embodiment of the present invention.

Reference is made to FIG. 24, which is an illustration of a saddle roof or hyperbolic paraboloid corresponding to the emitter light paths and reflected light paths of a 3-D proximity sensor, in accordance with an embodiment of the present invention.

Figure 25:
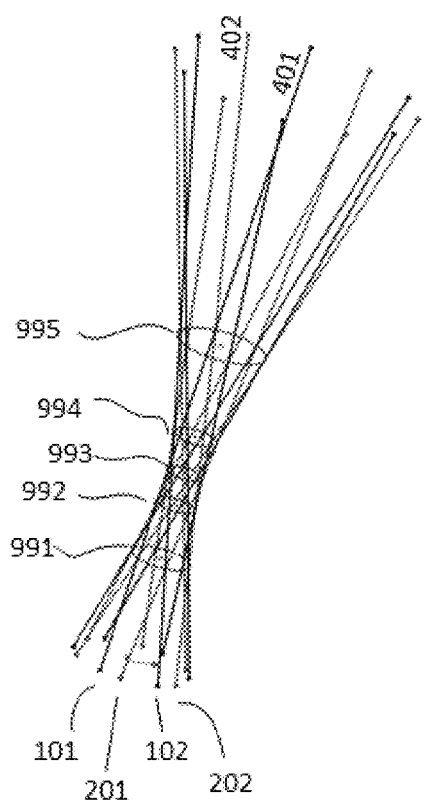
FIG. 25 is a simplified illustration of a circular arrangement of six emitters and six receivers arranged alternatingly along a circular base that provide 30 hotpot locations along a 3-D hyperboloid, in accordance with an embodiment of the present invention.

Reference is made to FIG. 25, which is a simplified illustration of a circular arrangement of six emitters and six receivers arranged alternatingly along a circular base that provides 30 hotpot locations along a 3-D hyperboloid, in accordance with an embodiment of the present invention. FIG. 25 shows emitters 101 and 102, and receivers 201 and 202, which provide 30 hotpot locations along a 3-D hyperboloid, in accordance with an embodiment of the present invention. FIG. 25 shows five rings, 991-995, of hotspot locations along the height of the hyperboloid.

Figure 26:
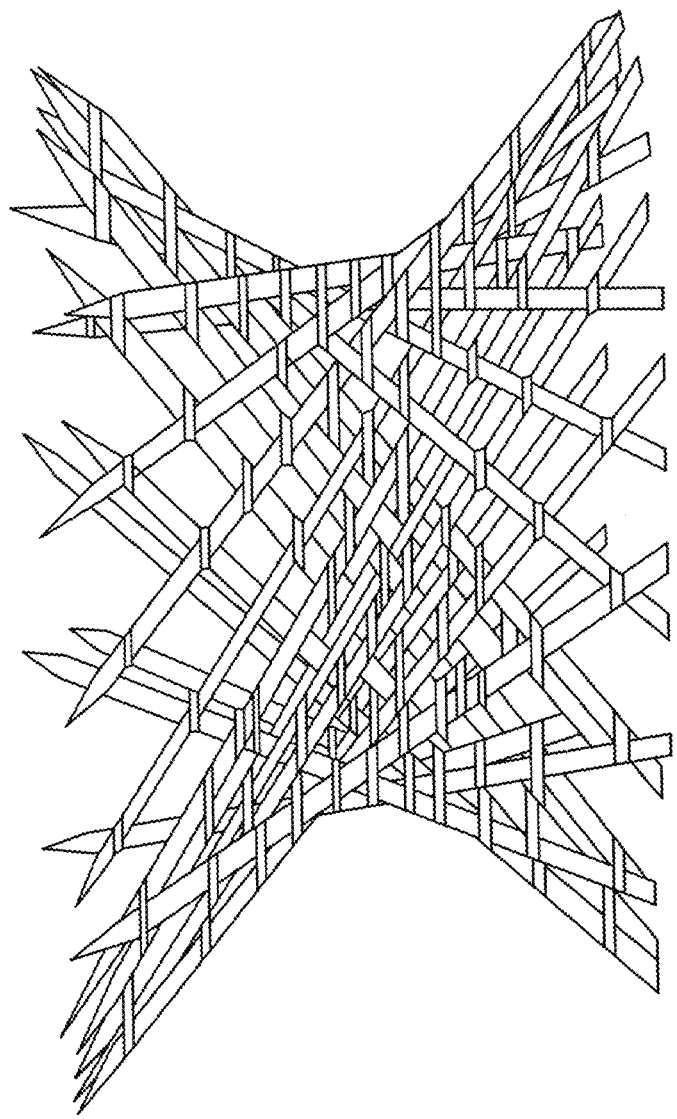
FIG. 26 is a simplified illustration of a grid representing emitted and reflected light beams from a circular arrangement of 16 emitters and 16 receivers arranged alternatingly along the circle, which provide 176 hotpot locations along a 3-D hyperboloid, in accordance with an embodiment of the present invention.

Reference is made to FIG. 26, which is a simplified illustration of a grid representing emitted and reflected light beams from a circular arrangement of 16 emitters and 16 receivers arranged alternatingly along a circular base, which provide 176 hotpot locations along a 3-D hyperboloid, in accordance with an embodiment of the present invention. Alternative configurations include 4 emitters and 4 receivers for a stripped down hyperboloid, 3 emitters and 3 receivers for a regular octahedron and 2 emitters and 2 receivers for a regular tetrahedron. These 3-D proximity sensors are used inter alia for detecting in-air hand wave gestures.

Proximity sensors according to the present invention have numerous applications for touch screens, control panels and new user interface surfaces. The proximity sensor can be mounted anywhere—on a wall, a window, placed on a notebook, and it will provide touch and gesture detection upon that item. These detected gestures are then used as input to electronic systems. For example, a gesture along a wall can dim the lighting in the room by mounting the sensor along an edge of the wall and communicating the detected gestures to the lighting system. Significantly, the proximity sensor is only mounted along one edge of the detection area, reducing component cost and providing more flexibility for industrial design of touch screens and touch sensitive control panels.

A door lock system according to the present invention has two modes of operating. In the first mode, the door is locked and unlocked using prior art methods, such as by a transponder signal, by pressing a key fob switch, or by a physical key inserted into a keyhole and rotated. In the second mode, the user locks the door by entering a gesture on a gesture sensor. The user subsequently unlocks the door by entering that same gesture on the gesture sensor. However, unlike prior art gesture-based lock systems, this unlock gesture is not defined as an unlock gesture until the user enters it to lock the door.

Figure 27:
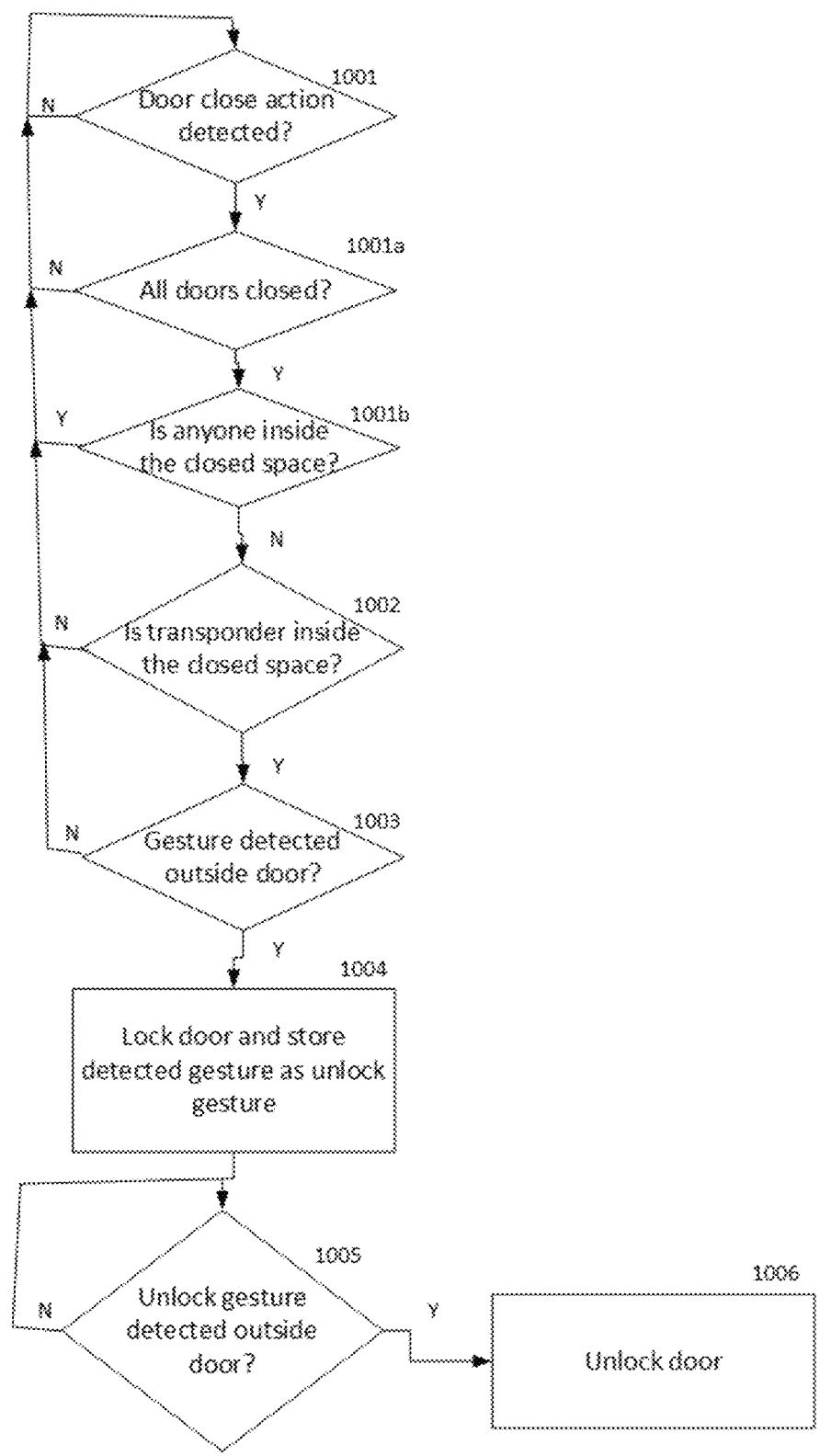
FIG. 27 is a simplified flowchart of a method of locking and unlocking a door, in accordance with an embodiment of the present invention.

Reference is made to FIG. 27, which is a simplified flowchart of a method of locking and unlocking a door, such as a car door, in accordance with an embodiment of the present invention. The method begins at step 1001 when the door is closed. At step 1002 the closing of the door is detected by the door lock system and this triggers the system to activate a transmitter unit connected to the lock system to locate a portable transponder, and specifically, to identify whether that transponder is behind the closed door, inside the closed interior, e.g., inside the car. If that transponder is inside the closed interior, the system activates a gesture detection apparatus directed at detecting gestures on, or near, the exterior of the door. At step 1003 if the gesture detection apparatus detects a gesture, then at step 1004 the door lock is activated and the detected gesture is stored to memory. At step 1005 the stored gesture is detected again by the gesture detection apparatus, and at step 1006 the door is unlocked.

In certain embodiments where multiple doors provide access to a common interior space, e.g., a car, the lock system only proceeds from step 1001 if at step 1001a all other doors to the common interior are closed when the closing of the door is detected.

In some embodiments, the gesture detection apparatus is activated when the door is closed only if at step 1001b it is further determined that no one remains inside the closed space. This is determined using movement sensors, cameras or other means known to these skilled in the art.

In some embodiments, the gesture detection apparatus is activated when the door is closed, without identifying whether a transponder is inside the closed interior. This enables using the gesture lock-unlock method according to the present invention in systems that do not include transponders, and also enables using the gesture lock-unlock method when the user removes the transponder from the closed space before closing the door.

In some embodiments the gesture detection apparatus is the proximity sensor strip described hereinabove mounted along an edge of the driver-side window to detect gestures made on the exterior of the window. In other embodiments, other types of gesture detection apparatus are provided, inter alia, cameras, optical touch screens based on blocked light, optical touch screens based on frustrated total internal reflection (FTIR), optical proximity sensors, capacitive touch screens and resistive touch screens. In other embodiments, the gesture detection apparatus detects gestures on a wall next to the door, on the door handle or doorknob, or in the open space in front of the door.

Different systems enable detecting different types of gestures. Example gestures include: touching one or more locations on a surface; one or more two-dimensional lines or squiggles traced by a finger on a surface; one or more two-dimensional lines or squiggles traced by multiple fingers on a surface, e.g., multi-finger pinch, spread or rotation gestures; hand wave gestures; holding up a number of fingers; sign language gestures; and full body movements.

Figure 28:
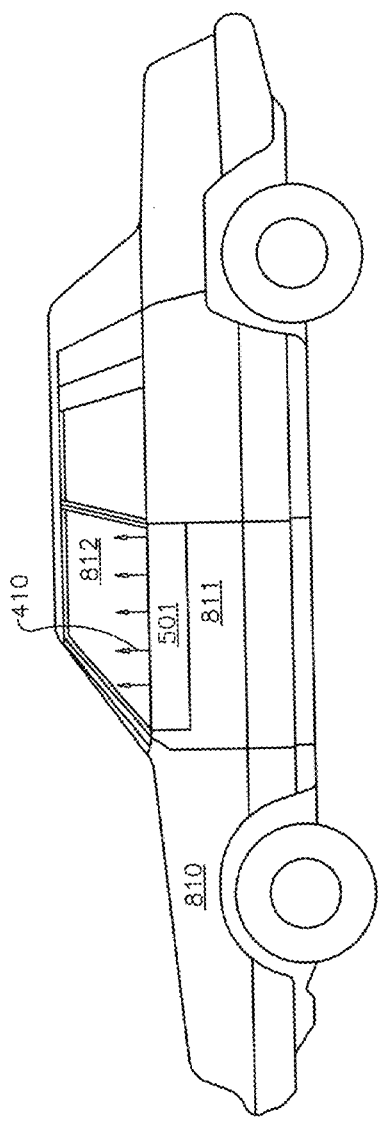
FIG. 28 is a simplified illustration of a car that practices the lock-and-unlock method of FIG. 27, in accordance with an embodiment of the present invention.

Reference is made to FIG. 28, which is a simplified illustration of a car that practices the lock-and-unlock method of FIG. 27, in accordance with an embodiment of the present invention. FIG. 28 shows a car 810 having a door 811 and a side window 812. A proximity sensor strip 501 is mounted beneath window 812 and projects light beams 410 along the outer surface of window 812 to detect gestures on the window, e.g., a shape traced by a finger gliding upon the window.

In some embodiments, the stored gesture includes the shape traced by the finger, but not the location on window 812 at which the shape was originally traced. In other embodiments, the location on window 812 at which the shape was originally traced is also stored, and the user must recreate the gesture at the same location in order to unlock the door.

Figure 29:
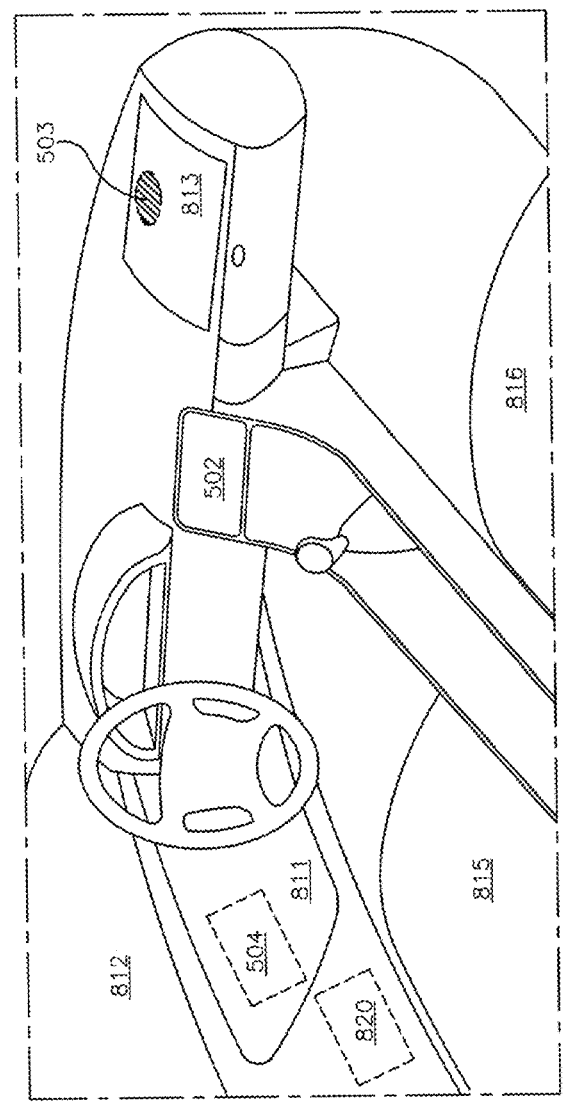
FIG. 29 is a simplified illustration of the interior of the car of FIG. 28, in accordance with an embodiment of the present invention.

Reference is made to FIG. 29, which is a simplified illustration of the interior of car 810, in accordance with an embodiment of the present invention. FIG. 29 shows driver seat 815, passenger seat 816, glove compartment 813, driver-side door 811 and driver-side window 812. A portable electronic transponder 503 is shown inside glove compartment 813. A transmitter unit 504 is shown mounted in door 811 to interrogate transponder 503 when the door is closed and determine whether the transponder is inside the car or outside. If the transponder is inside the car, transmitter unit 504 communicates this to keyless entry system 820 which then activates the gesture detection apparatus (not shown in FIG. 29).

FIG. 29 also shows motion sensor 502 mounted in the car dashboard for detecting if any people remain in the car after door 811 is closed. Sensor 502 is also in communication with keyless entry system 820. Keyless entry system 820 will only enable the gesture detection apparatus to activate the lock if no one is inside the car.

In accordance with an embodiment of the present invention, a laptop accessory is provided that enables converting a non-touchscreen laptop into a touchscreen laptop. The accessory is a proximity sensor bar featuring an elongated proximity sensor array. Although this proximity sensor bar is described as an accessory for laptop computers, it is useful for other computer displays, inter alia, all-in-one computers, desktop computers, tablets and televisions. It is also useful for converting any surface, including non-display surfaces, such as a table, wall, or window, into a touch sensitive surface on which gestures are performed to control an electronic device. The proximity sensor bar includes any of the proximity sensors discussed hereinabove, inter alia, with reference to FIGS. 10-26, incorporated into a touch sensor accessory that communicates user interface commands to a separate electronic device.

Figure 30:
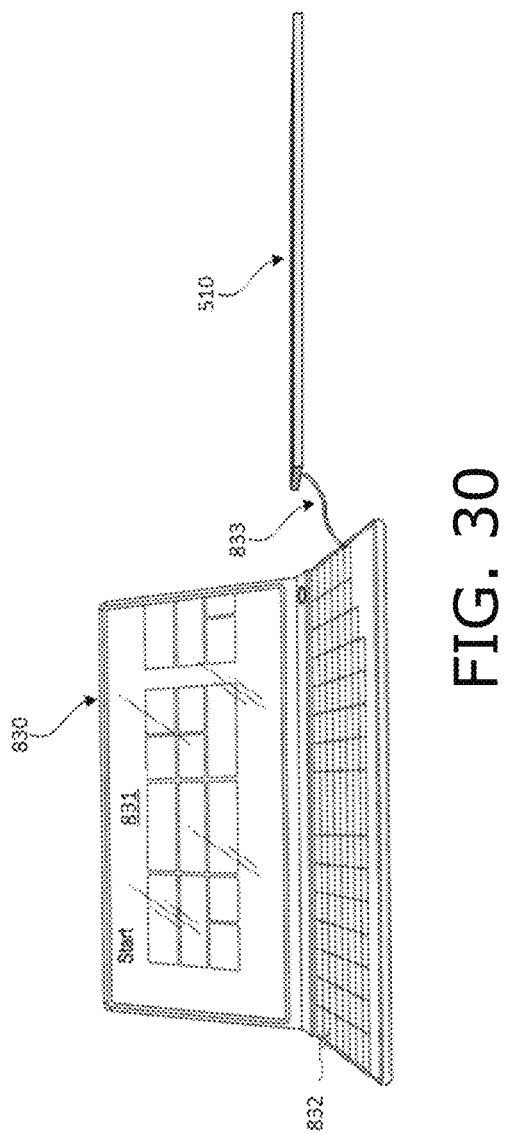
FIGS. 30 and 31 are simplified illustrations of a proximity sensor bar configured as a laptop accessory, in accordance with an embodiment of the present invention.
Figure 31:
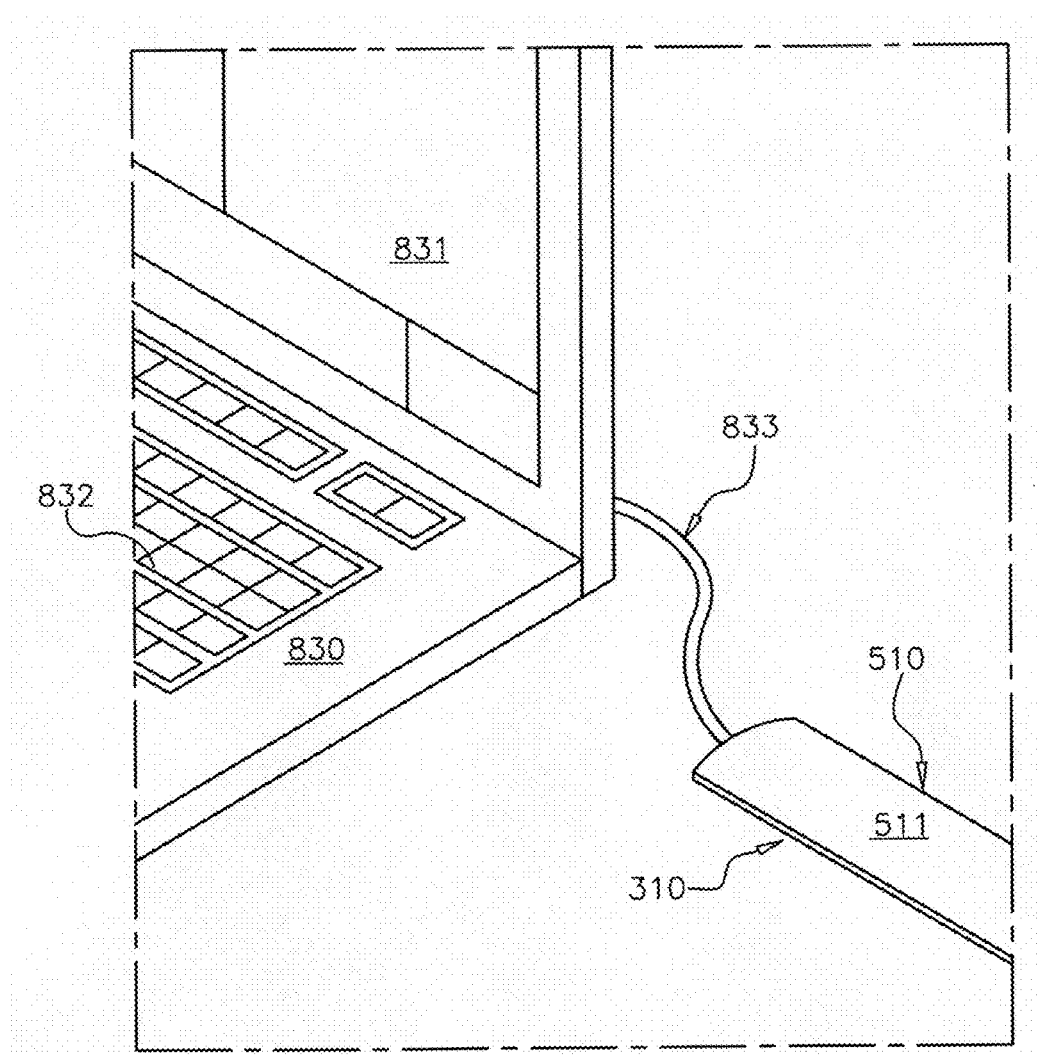
Figure 32:
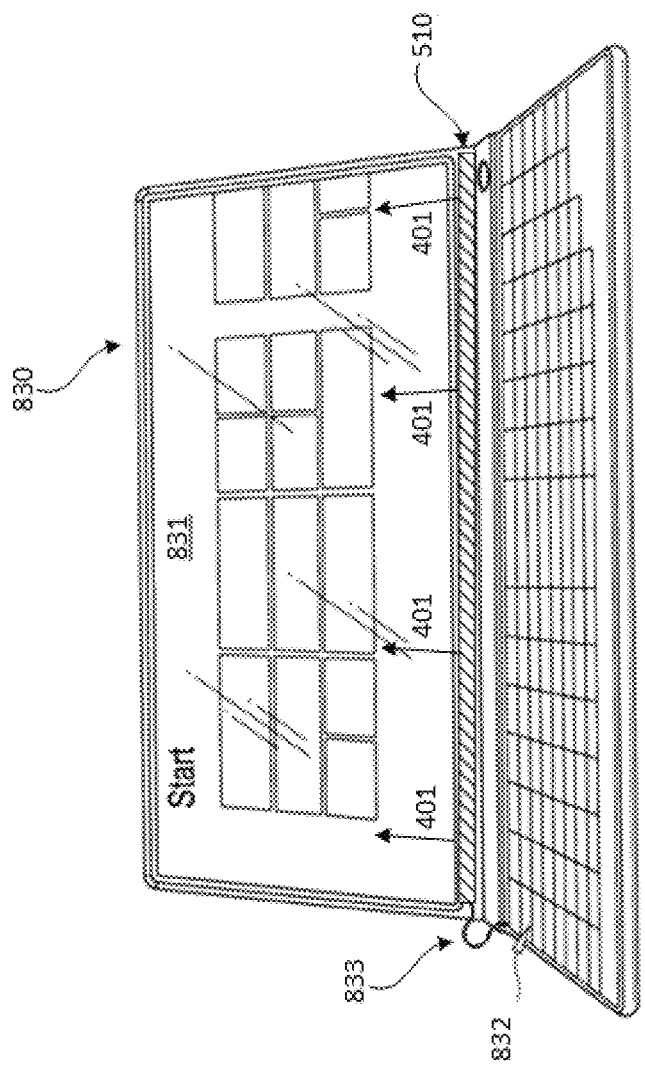
FIGS. 32-36 are simplified illustrations of the laptop accessory of FIGS. 30 and 31 placed along an edge of a laptop display, in accordance with an embodiment of the present invention.
Figure 33:
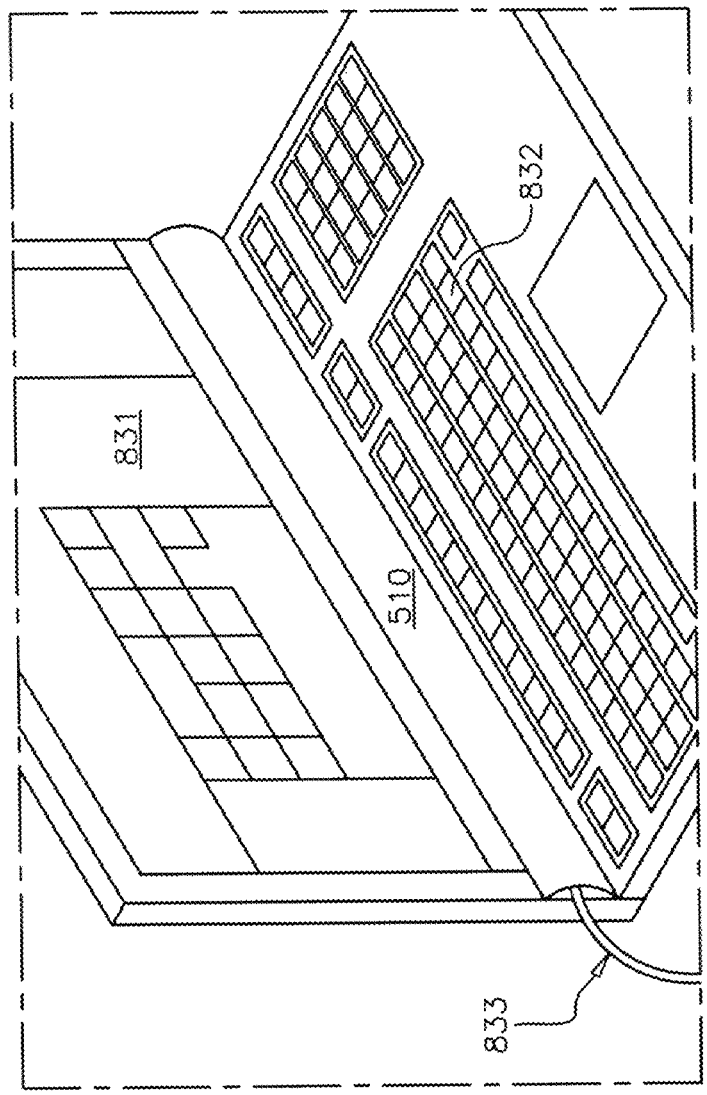
Figure 34:
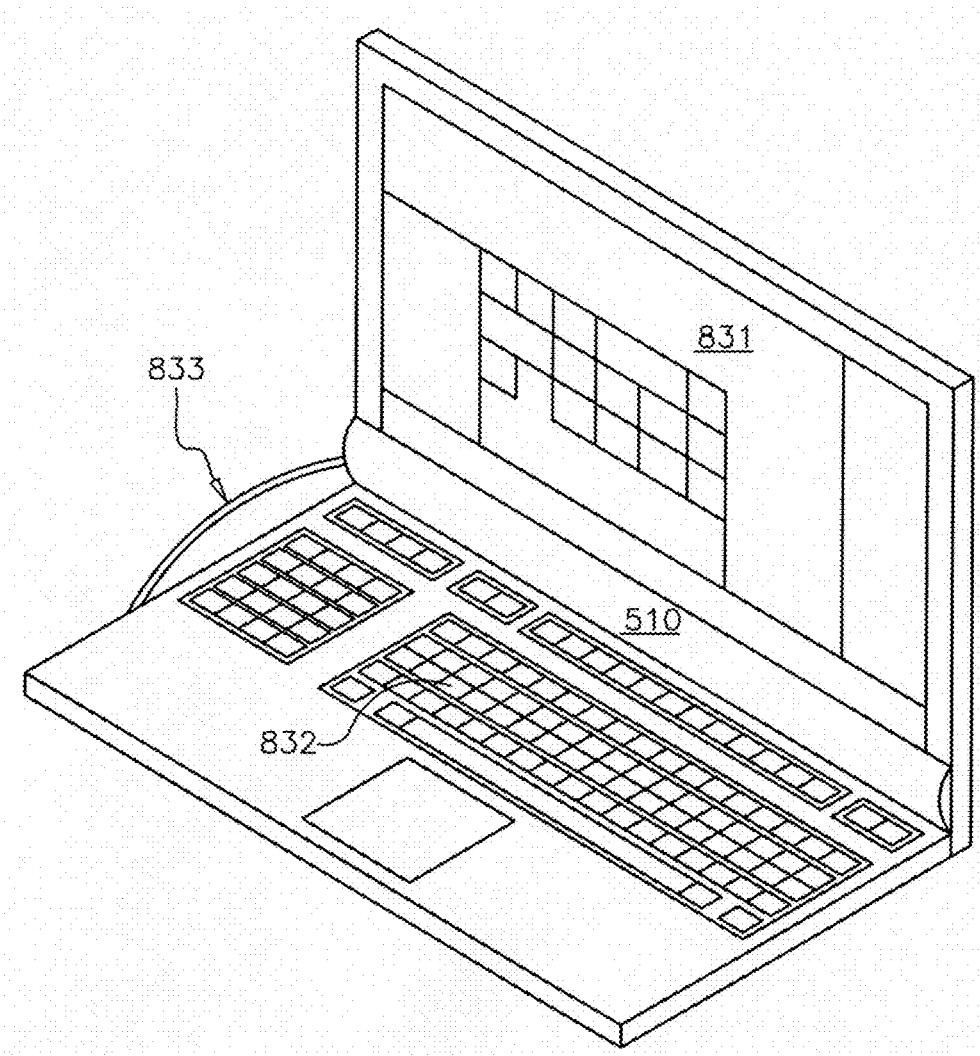
Figure 35:
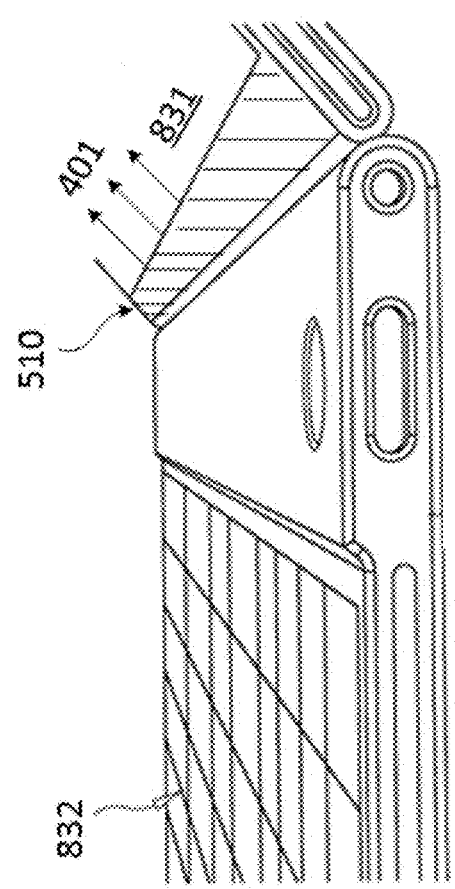
Figure 36:
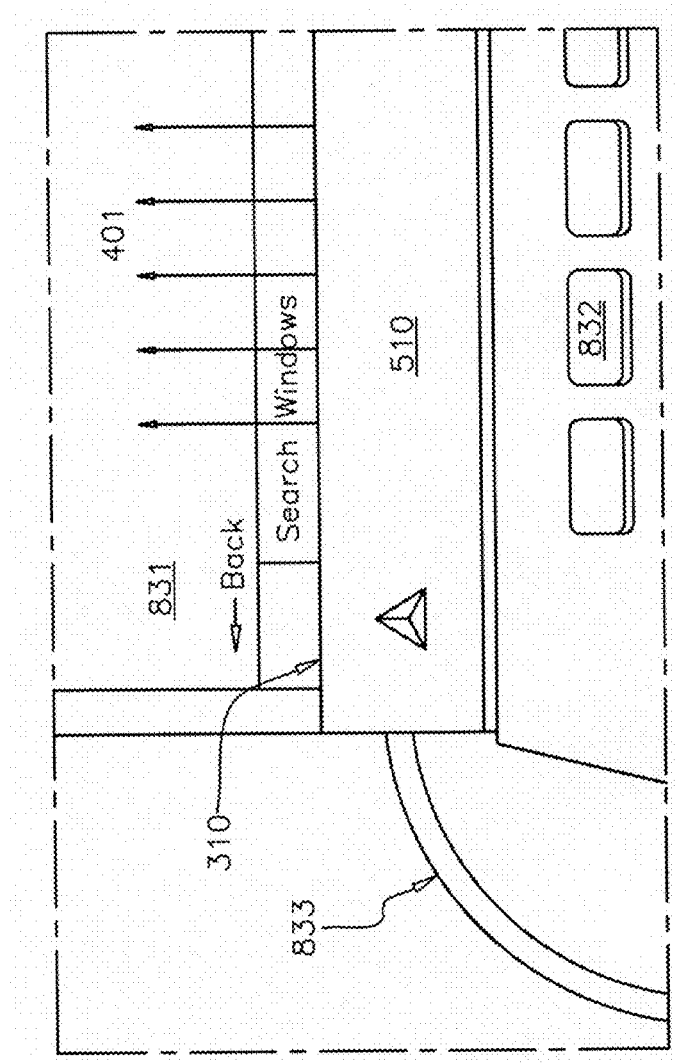

Reference is made to FIGS. 30 and 31, which are simplified illustrations of a proximity sensor bar configured as a laptop accessory, in accordance with an embodiment of the present invention. FIGS. 30 and 31 show proximity sensor bar 510 connected to laptop computer 830 via wire 833. Typically a USB connector situated at the end of wire 833 is inserted into a USB socket in laptop 830. Laptop computer 830 includes display 831 and keyboard 832. The operating system running on laptop 830 supports touchscreen user interface commands enabling communication between proximity sensor bar 510 connected to laptop computer 830 using a USB-HID digitizer. This enables the proximity sensor bar to map multiple touch coordinates to the screen, and send those coordinates to the laptop which interprets those coordinates into one or more gestures. In some embodiments, proximity sensor bar 510 is configured to provide mouse or trackpad functionality by reporting detected object coordinates as a single finger trackpad. In certain embodiments, proximity sensor bar 510 is configured to interpret gestures into commands, such as rotate, scroll, zoom, copy, cut, paste, and send those commands to the operating system, instead of reporting touch coordinates or gestures.

Proximity sensor bar 510 includes housing 511 and lenses 310, through which light beams 401, shown in FIGS. 32 and 35-38, are projected into the detection plane as explained hereinabove. Light beams reflected by an object inserted into the detection plane re-enter proximity sensor bar 510 through lenses 310.

Reference is made to FIGS. 32-36, which are simplified illustrations of the laptop accessory of FIGS. 30 and 31 situated along an edge of a laptop display to convert a non-touchscreen display into a touchscreen display, in accordance with an embodiment of the present invention. FIGS. 32-36 show proximity sensor bar 510 attached to the bottom edge of laptop display screen 831. The detection plane detected by proximity sensor bar 510 is parallel to the surface of laptop display screen 831, as illustrated by light beams 401 projected out of proximity sensor bar 510. Proximity sensor bar 510 is as long as the bottom edge of screen 831 in order to provide touch sensitivity to the entire display. Different models of proximity sensor bar 510 are manufactured in different sizes to support different screen sizes. In some embodiments, housing 511 is magnetically attached to laptop 830 below the bottom edge of screen 831. The detection plane is mapped to the screen surface according to the expected location of proximity sensor bar 510 relative to screen 831. E.g., proximity sensor bar 510 may be placed along any of the four screen edges, each placement transposing the detection plane in relation to the screen. In some embodiments, a socket is provided in the laptop housing for receiving proximity sensor bar 510. In some cases, a connector provided in the socket, and corresponding connection pads provided on proximity sensor bar 510, are used to connect proximity sensor bar 510 to laptop 830, instead of wire 833 and the USB socket and plug discussed hereinabove.

Figure 37:
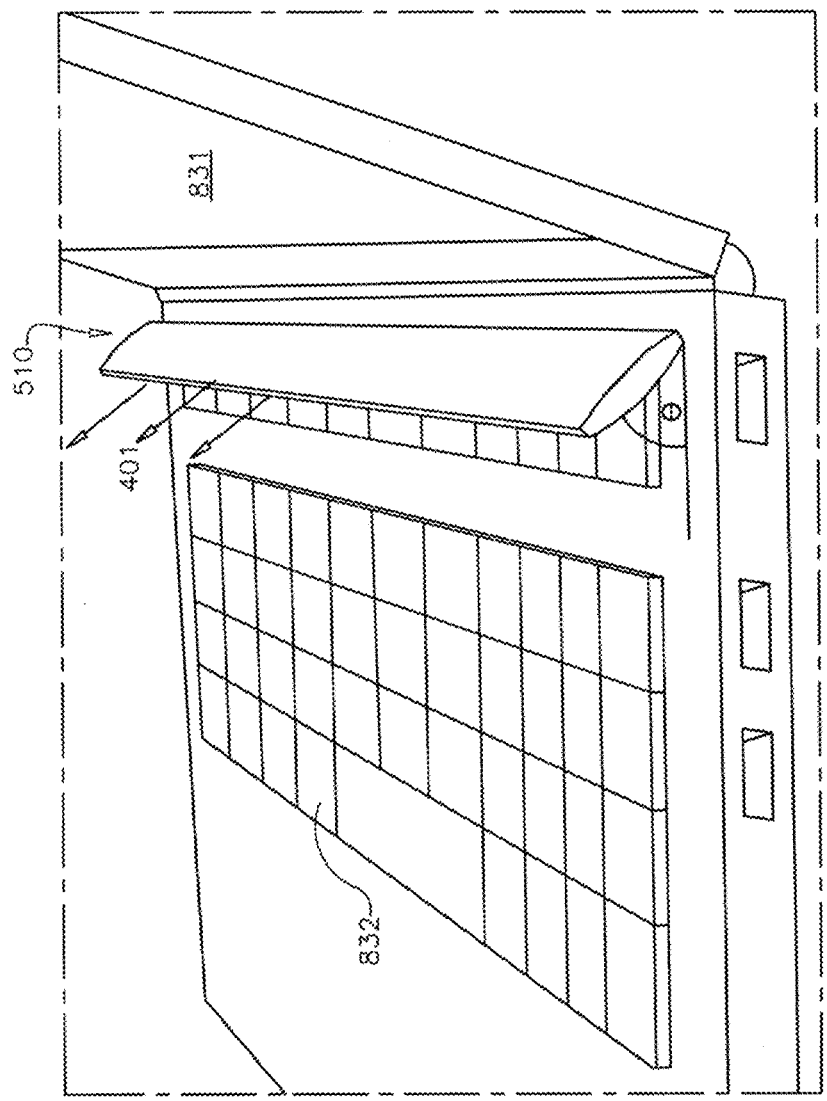
FIG. 37 is a simplified illustration of the laptop accessory of FIGS. 30 and 31 situated along an edge of a laptop display and rotated away from the display to provide a detection plane in the airspace between the display and the keyboard, in accordance with an embodiment of the present invention.

Reference is made to FIG. 37, which is a simplified illustration of the laptop accessory of FIGS. 30 and 31 situated along an edge of a laptop display and rotated away from the display to provide a detection plane in the airspace between the display and the keyboard, in accordance with an embodiment of the present invention. FIG. 37 shows proximity sensor bar 510 rotated away from display screen 831 such that the projected light beams 401, and the corresponding detection plane, are directed into the airspace between display 831 and keyboard 832. This configuration is useful for browsing photos and presentations: the user advances forward and backward through the presentation by swiping his hand or finger through the air across the detection plane, without touching the screen. Angle $\theta$ shown in FIG. 37 is 45°, but can be any angle. In some embodiments, proximity sensor bar 510 reports the same coordinates, gestures or commands, to laptop 830 regardless of whether the detection plane is parallel to the screen surface or directed into the airspace away from the display. In other embodiments, proximity sensor bar 510 reports different coordinates, gestures or commands, when the detection plane is parallel to the screen surface and when it is directed into the airspace away from the display. In other embodiments, when the detection plane is directed into the airspace away from the display, proximity sensor bar 510 employs a subset of the coordinates, gestures or commands it employs when the detection plane is parallel screen surface. E.g., relative movement gestures, such as sweep gestures and pinch gestures, are supported, but the location of a detected object is not mapped to a specific screen location when the detection plane is directed into the airspace away from the display.

Figure 38:
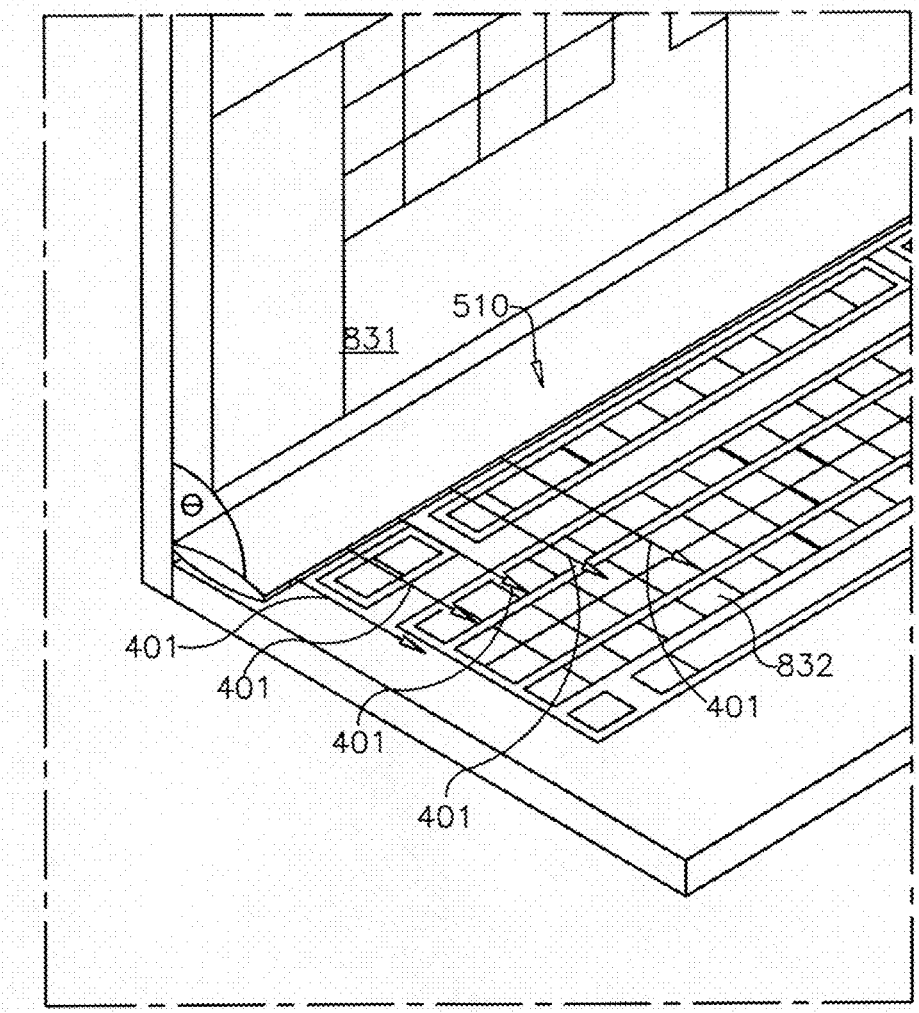
FIG. 38 is a simplified illustration of the laptop accessory of FIGS. 30 and 31 situated along an edge of a laptop display and rotated away from the display to provide a detection plane along the surface of the laptop keyboard, in accordance with an embodiment of the present invention.

Reference is made to FIG. 38, which is a simplified illustration of the laptop accessory of FIGS. 30 and 31 situated along an edge of a laptop display and rotated away from the display to provide a detection plane along the surface of the laptop keyboard, in accordance with an embodiment of the present invention. FIG. 38 shows proximity sensor bar 510 rotated away from display screen 831 such that the projected light beams 401, and the corresponding detection plane, are parallel to the surface of keyboard 832. This configuration provides touch functionality to the upper surface of keyboard 832. In this configuration, when proximity sensor bar 510 is configured to provide mouse or trackpad functionality by reporting detected object coordinates as a single finger trackpad, laptop 830 can eliminate the trackpad typically provided below the keyboard on laptops today. Rather, the user can use the upper surface of the keypad as a trackpad. In some embodiments, in order to enable both keyboard input and trackpad input, trackpad functionality is suspended when a key is depressed, and trackpad functionality is activated when a finger moves across the keys without depressing any key at the end of the movement. Angle $\theta$ shown in FIG. 38 is greater than 90°.

Some laptops, known as 2-in-1 laptops, may be configured in both laptop mode, having a keyboard in front of the display, and in tablet mode, having nothing in front of the display. When in tablet mode, proximity sensor bar 510 can be placed along the bottom edge of the display screen facing away from the display; e.g., such that the detection plane is parallel to the tabletop on which the display is standing. The user can then control the presentation or video on the display using gestures performed on the table surface. E.g., swipe along the table surface parallel to proximity sensor bar 510 to advance or go backward; pinch on the table surface to zoom, perform a multi-finger rotation gesture on the table surface to rotate an image on the display.

In some embodiments, the light emitters in proximity sensor bar 510 are semiconductor laser diodes such as vertical-cavity surface-emitting lasers (VCSELs). Other light emitters can alternatively be used. In some embodiments, proximity sensor bar 510 is manufactured by placing uncovered semiconductor laser diodes, i.e., the bare semiconductor without any lens, and uncovered photodiodes, also without any lens, onto a PCB. The only lenses provided for the laser diodes and photodiodes is a light guide unit, such as the elongated light guide illustrated in FIG. 10, that includes lenses 303 and 304. The light guide unit is positioned with very high precision relative to the VCSEL diodes by an automated production line for high production volumes.

In the prior art optical components are aligned in an automated production line by matching a hole pattern on the component carrier (PCB) with guides (pins) on the component to be placed. Alternatively, fiducial markers on the PCB are used to place the component according the PCB patterns.

In contrast, the present invention uses the diodes themselves as fiducial markers to place the light guide exactly where it needs to be in relation to the diodes.

In some embodiments, prior to mounting the diode components, an adhesive is attached to the PCB, which can be activated quickly; e.g. by exposure to UV light, to fix the component before the automated picking unit releases it. Thus, the component is secured and fixed at its location on the PCB before the light guide is mounted on the PCB. The light guide is then picked up by the automated production line and positioned on the PCB by vision technology using the secured diodes as fiducial markers, thereby placing the light guide on the PCB in precise relation to the diodes. This precise positioning methodology increases the opportunity for advanced high resolution applications at a competitive cost.

The elongated light guide illustrated in FIG. 10 includes lenses 303 and 304, and more generally, includes multiple lenses that correspond to respective emitters and light detectors. In some embodiments, each lens is assembled on the PCB separately, in relation to its corresponding emitter, using that emitter as a fiducial marker.

Figure 39:
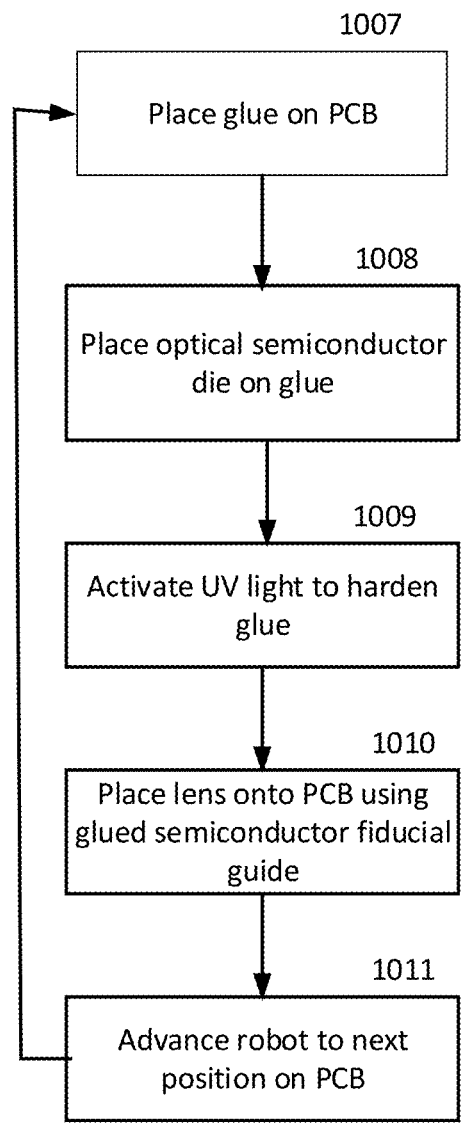
FIG. 39 is a simplified flow chart of a process for assembling a proximity sensor, in accordance with an embodiment of the present invention.

Reference is made to FIG. 39, which is a simplified flow chart of a process for assembling a proximity sensor, in accordance with an embodiment of the present invention. The process uses a robot that fetches optical components and places them on a PCB using machine vision. At step 1007, the robot applies glue to the PCB at a location at which an optical component such as a VCSEL semiconductor diode or a semiconductor photodiode is to be placed. At step 1008, the robot places the optical component on the glue, and at step 1009, the glue is hardened by exposure to UV light without the robot releasing the optical component. At step 1010, the robot fetches a lens for the glued optical component. Because the optical component is affixed to the PCB without any package, the small size of the components facilitates its use as a fiducial marker for placement of the lens. Thus, the robot aligns the lens on the PCB with that lens's optical component using the optical component as a fiducial marker for placement of the lens. At step 1011 the robot advances to repeat steps 1007-1010 for the next optical component and its corresponding lens.

Figure 40:
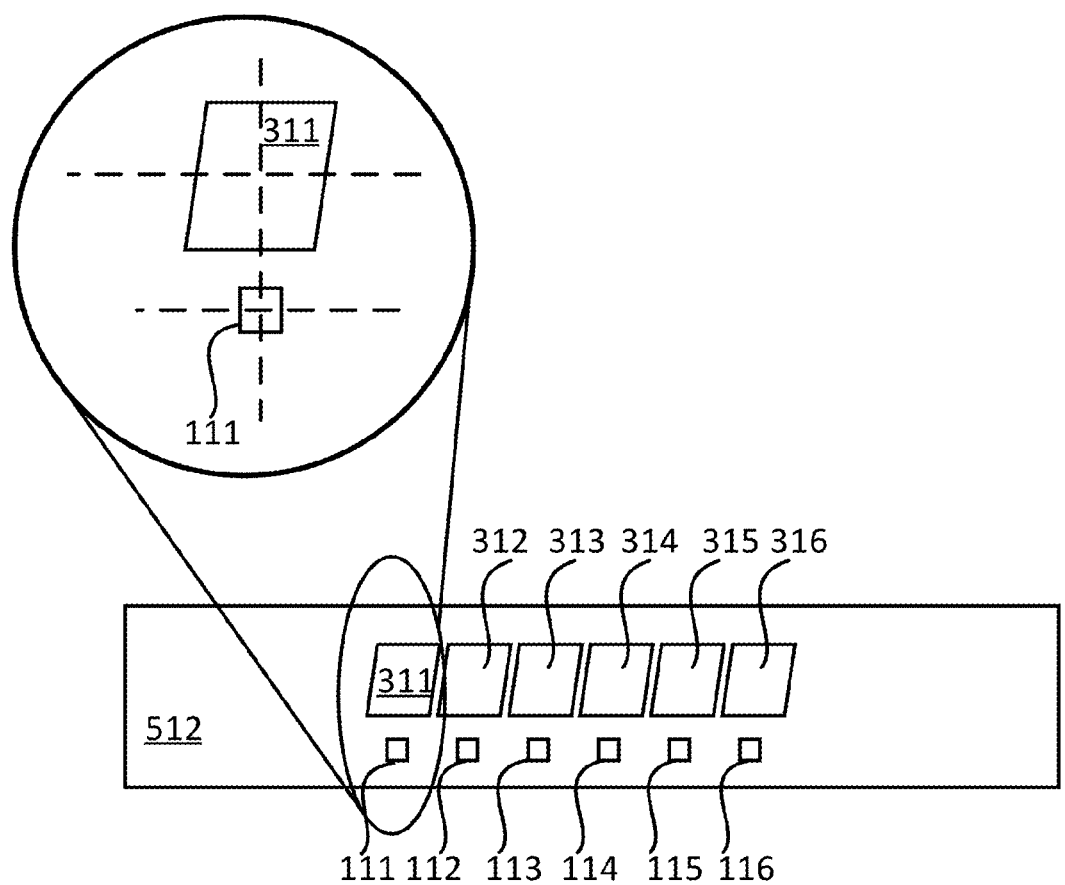
FIG. 40 is a simplified illustration of a proximity sensor being assembled according to the process of FIG. 39.

Reference is made to FIG. 40, which is a simplified illustration of a proximity sensor being assembled according to the process of FIG. 39. At each step, one emitter and one lens are assembled on the PCB. FIG. 40 shows proximity sensor PCB 512 after six emitter-lens pairs have been mounted thereon. Each emitter 111-116 is placed on PCB 512 by an automated picking unit and attached thereto, e.g., by exposure to UV light as discussed hereinabove. Next, the automated picking unit fetches a respective lens 311-316 and mounts it on PCB 512 using the corresponding emitter as a fiducial marker. This precise placement is illustrated by the enlarged inset showing alignment of emitter 111 with lens 311. This processed is then repeated for the remaining emitters and their respective lenses, assembling an entire proximity sensor bar.

Figure 41:
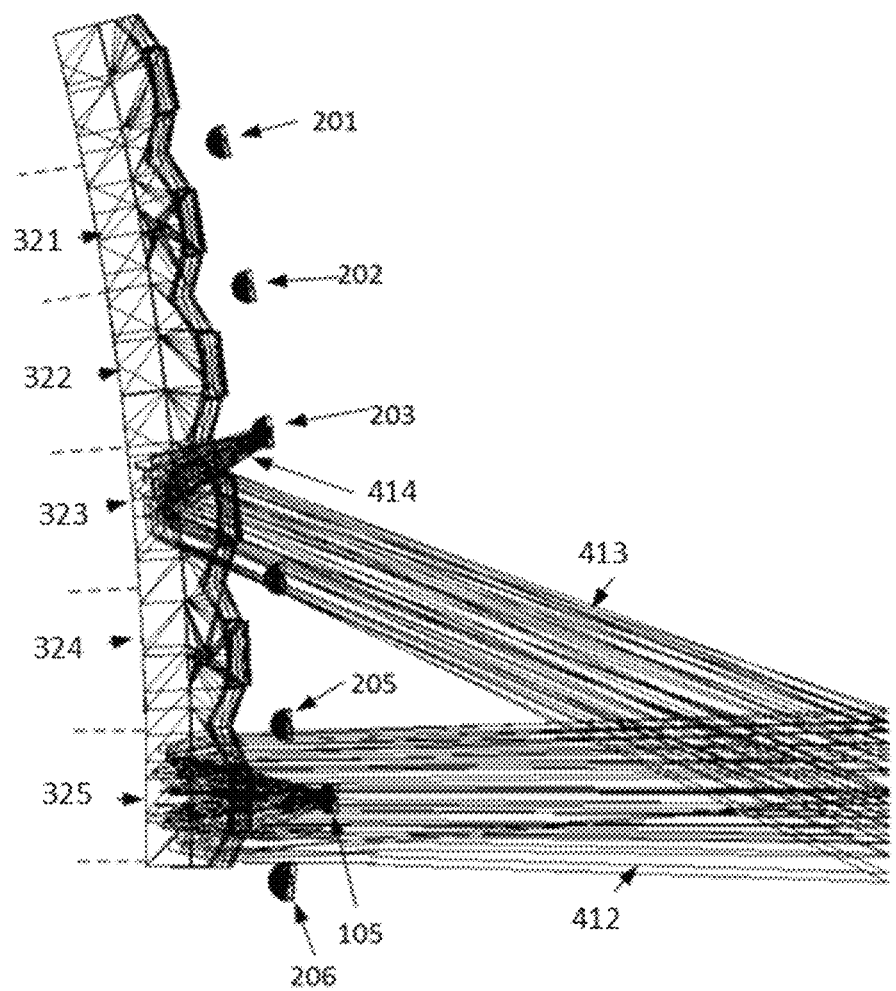
FIGS. 41 and 42 are simplified illustrations of light beams of a proximity sensor detecting an object, in accordance with an embodiment of the present invention.
Figure 42:
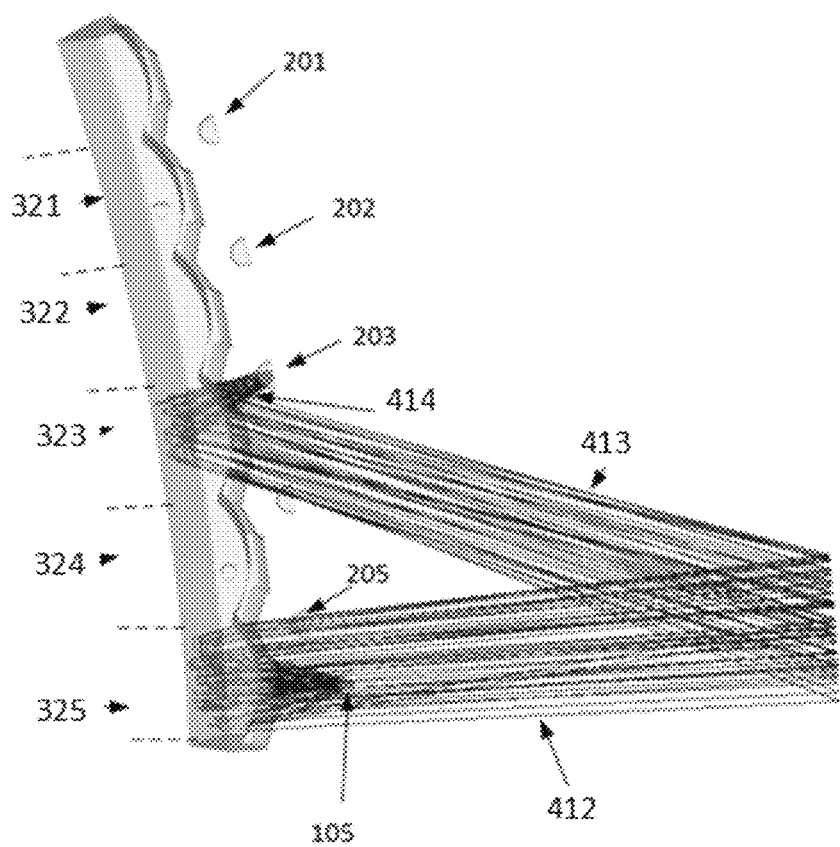

Reference is made to FIGS. 41 and 42, which are simplified illustrations of light beams of a proximity sensor detecting an object, in accordance with an embodiment of the present invention. FIGS. 41 and 42 show a light path used to detect an object, and individual lens structures 321-325. Each lens structure serves a respective opposite emitter and two detectors, one to the left of the emitter and one to the right of the emitter. Thus, for example, lens structure 325 serves emitter 105 and detectors 205 and 206. In addition each detector is served by two lens structures; e.g., detector 205 receives reflected light from lens structures 324 and 325. In the example shown in FIGS. 41 and 42, light from emitter 105 is reflected by an object (not shown) into lens structure 323 and onto detector 203. Three segments of the detected light are indicated in FIGS. 41 and 42; namely, light beam 412 projected outward from lens structure 325 and radially outward of the proximity sensor, light beam 413 reflected by the object into lens structure 323, and light beam 414 directed by lens structure 323 onto detector 203.

Figure 43:
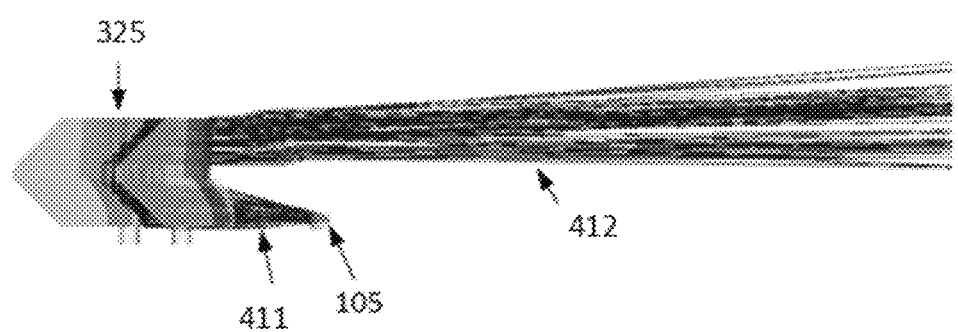
FIG. 43 is a simplified illustration of a side view of a proximity sensor and light beams projected therefrom, in accordance with an embodiment of the present invention.

Reference is made to FIG. 43, which is a simplified illustration of a side view of a proximity sensor and light beams projected therefrom, in accordance with an embodiment of the present invention. FIG. 43 shows light beams projected radially outward from a proximity sensor, and a cutaway side view of the light path illustrated in FIGS. 41 and 42. Light beam 411 from emitter 105 enters lens structure 325, where it is redirected outward as light beam 412.

Figure 44:
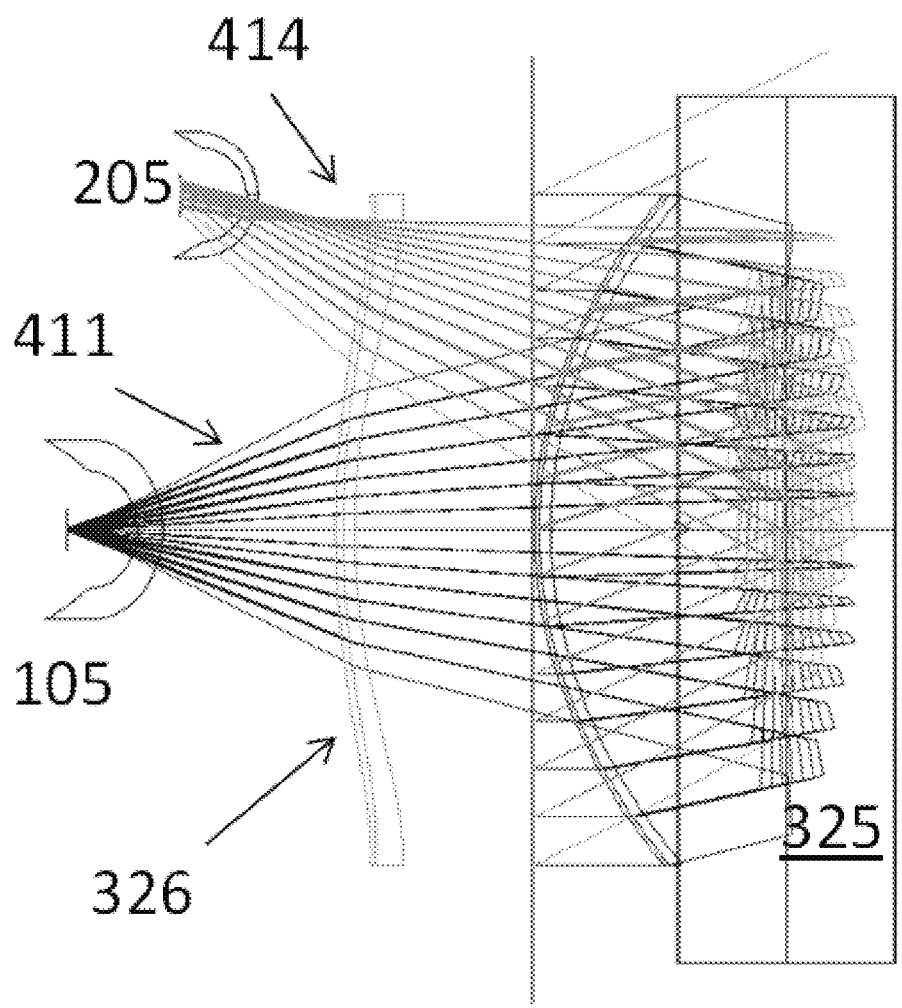
FIG. 44 is a simplified illustration of a proximity sensor lens and associated optical components viewed from above and light beams projected through that lens, in accordance with an embodiment of the present invention.

Reference is made to FIG. 44, which is a simplified illustration of a proximity sensor lens and associated optical components viewed from above and light beams projected through that lens, in accordance with an embodiment of the present invention. FIG. 44 shows a top view of lens 325 configured both for collimating light rays 411 from emitter 105 and for collecting light rays 414 onto PD 205. Different portions of entry/exit surface 326 are optimized for collimating light rays 411 from emitter 105 entering through surface 326 and for collecting rays 414 exiting through surface 326 onto PD 205. Indeed, that portion of surface 326 opposite emitter 105 is convex, whereas the portion of surface 326 optimized for collecting light onto PD 205 is concave. Thus, surface 326 is alternately concave and convex. However, the remaining surfaces in light guide 325 serve both the incoming and outgoing light beams 411 and 414; only at surface 326 are the two sets of light beams refracted by different surfaces.

Figure 45:
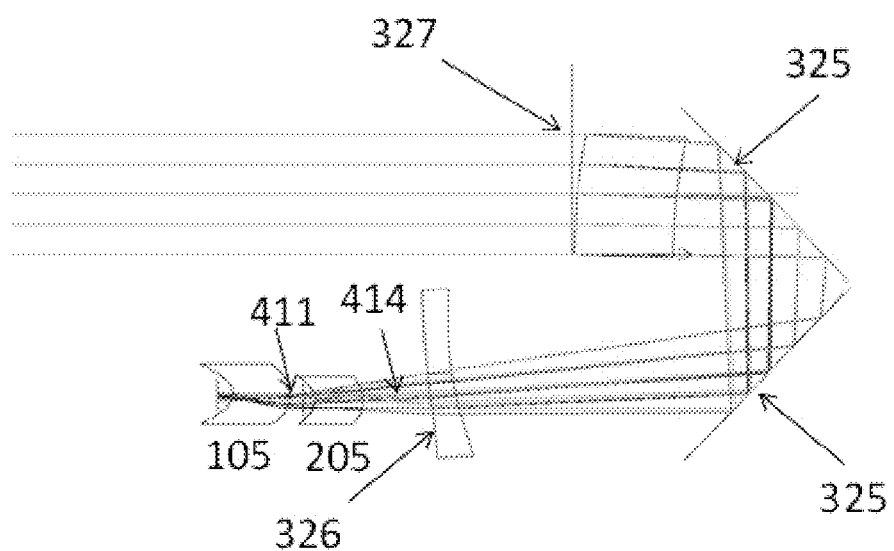
FIG. 45 is a simplified illustration of a side view of the lens and components of FIG. 44 and light beams projected through that lens, in accordance with an embodiment of the present invention.

Reference is made to FIG. 45, which is a simplified illustration of a side view of lens 325 and components of FIG. 44 and light beams projected through that lens, in accordance with an embodiment of the present invention. FIG. 45 shows lens 325 collimating emitter beams 411 and concentrating incoming beams 414 onto PD 205. Lens 325 has a folded lens structure providing two, internal collimating reflective surfaces. The folded lens structure is discussed in U.S. Pat. No. 9,063,614 entitled OPTICAL TOUCH SCREENS and incorporated herein in its entirety by reference. The lenses described hereinabove with reference to FIGS. 41-45 are usable for various proximity sensors, inter alia, for the proximity sensors described hereinabove with reference to FIGS. 1-39, for a touch-sensitive steering wheel as discussed in U.S. Pat. No. 8,775,023 entitled LIGHT-BASED TOUCH CONTROLS ON A STEERING WHEEL AND DASHBOARD and incorporated herein in its entirety by reference, and for proximity sensors for car doors as discussed in U.S. Publication No. 2015/0248796 A1 entitled DOOR HANDLE WITH OPTICAL PROXIMITY SENSORS and incorporated herein in its entirety by reference.

Figure 46:
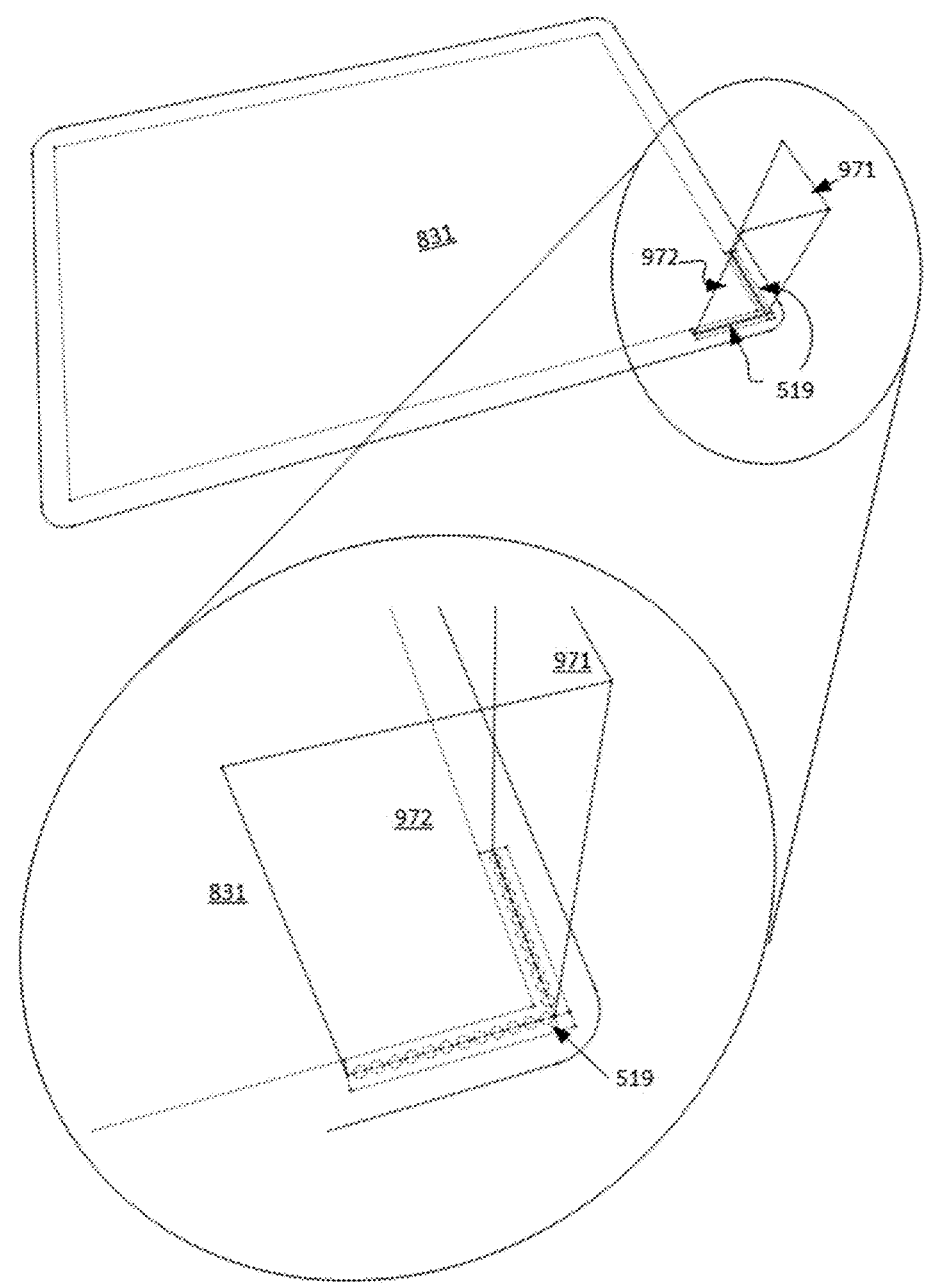
FIG. 46 is a simplified illustration of an L-shaped optical proximity sensor situated at a corner of a screen, in accordance with an embodiment of the present invention.

Reference is made to FIG. 46, which is a simplified illustrations of an L-shaped optical proximity sensor situated at a corner of a screen, in accordance with an embodiment of the present invention. The proximity sensor employed in this embodiment is any of the proximity sensors discussed hereinabove. The embodiment shown in FIG. 46 provides mouse tracking or trackpad functionality on a display device, inter alia, a computer monitor, a television, a tablet computer or a laptop computer, in case there is no space to fit a normal trackpad, or in case the user does not want to touch a surface for various reasons, or as a very cheap alternative for providing touch sensitivity to a portion of a screen. FIG. 46 illustrates a corner of a display monitor, and an enlarged view of the touch sensitive portion. Optical proximity sensor 519 is formed into an "L"-shape and is situated along a short segment of adjacent edges of screen 831. Optical proximity sensor 519 projects light beams perpendicular to the screen surface, i.e., towards the user facing the screen, as illustrated by detection planes 971 and 972, and thereby tracks movements in the X and Y directions in the airspace above the two-dimensional portion of screen 831 bordered by optical proximity sensor 519. This airspace operates as a virtual trackpad whereby movements in the X and Y directions in this airspace control movement of a cursor on the screen, or manipulate a displayed image, e.g., scroll and zoom. In some embodiments, optical proximity sensor 519 projects light beams at a non-perpendicular angle to the screen surface.

In some embodiments of the present invention movement of a hand in the airspace above sensor 519 is tracked by the sensor based on the non-uniform surface of the hand being tracked, e.g., the palm or fingers. For example, when tracking the palm, different parts of the palm surface reflect the projected light differently, which enables the sensor to identify a direction of movement of the different parts of the palm and combine those movements into a single directional gesture.

Figure 47:
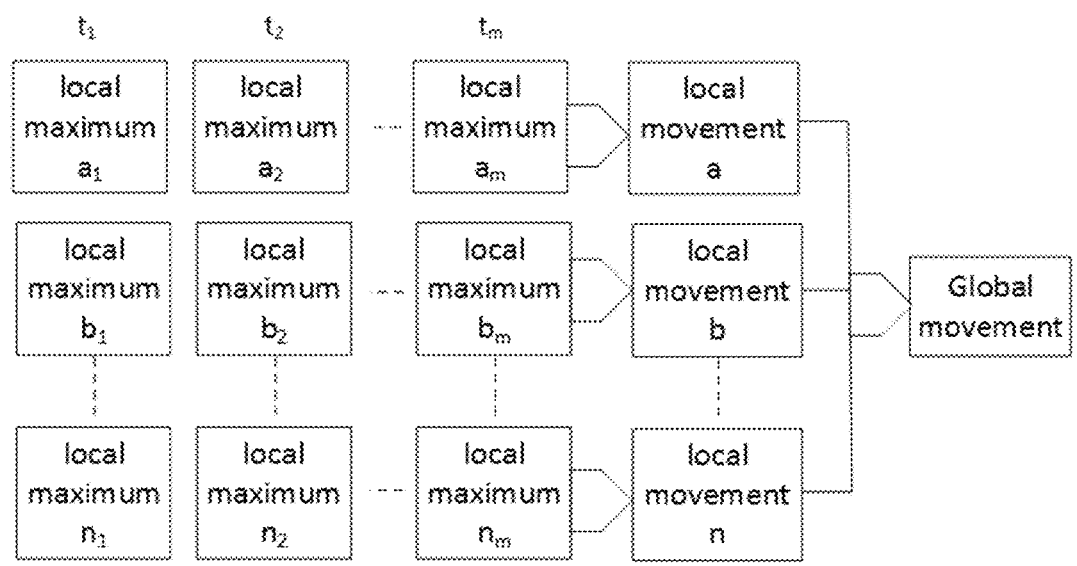
FIG. 47 is a simplified flow diagram of a method of identifying a gesture, in accordance with an embodiment of the present invention.

Reference is made to FIG. 47, which is a simplified flow diagram of a method of identifying a gesture, in accordance with an embodiment of the present invention. The method of FIG. 47 calculates a directional movement of an object in accordance with an embodiment of the invention. At each sampling time t, proximity sensor 519 identifies a plurality of local maxima among the co-activated emitter-detector pairs. FIG. 47 shows a plurality of local maxima, a, b through n, each maximum being tracked at times, $t_1$, $t_2$ through $t_m$. Proximity sensor 519 determines simultaneous movements of each local maximum, a, b through n respectively, over a time interval. At the end of the time interval, proximity sensor 519 combines these simultaneous tracked movements into a single global directional movement and interprets that global directional movement as a user input gesture. Although reference is made to proximity sensor 519 performing these operations, various operations of the process may be performed by a separate processor while still falling within the scope of the present invention. Also, reflection values other than maxima may be tracked, e.g., a group of neighboring reflection values forming a pattern may be tracked instead of an individual maximum value. A plurality of these tracked patterns can be combined to identify a global movement. Alternatively, a tracked pattern of neighboring reflection values is used as the identified global movement of the object.

In addition to using two-dimensional sweep gestures above the screen to manipulate a cursor or image in two dimensions, the user also moves the cursor or image along the x-axis by sliding his finger along the X-axis portion of L-shaped proximity sensor 519. Similarly, the user moves the cursor or image along the y-axis by sliding his finger along the Y-axis portion of L-shaped proximity sensor 519. To select an item on the screen at the cursor location, the user taps proximity sensor 519 at any location on proximity sensor 519; the tap need not be performed at the previously touched location.

Figure 48:
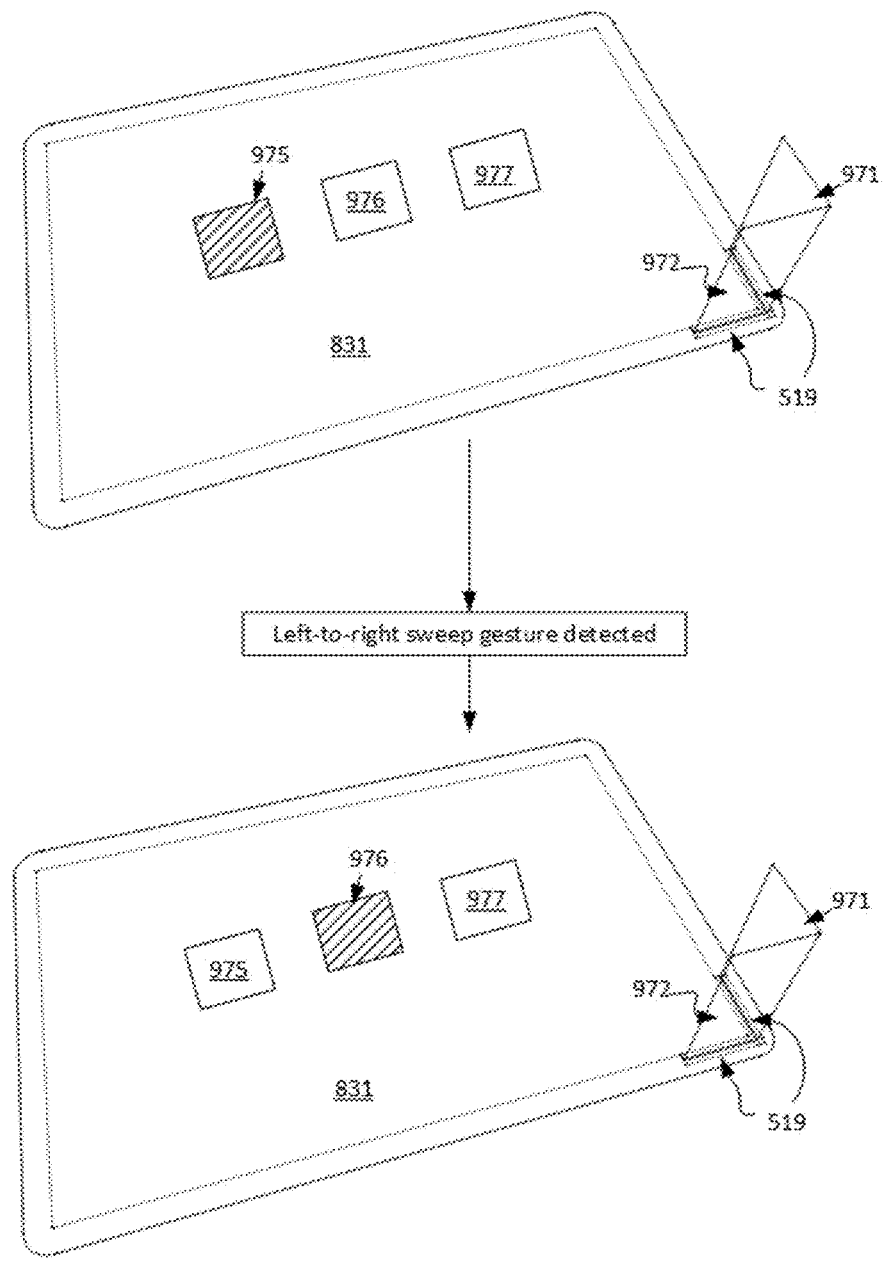
FIG. 48 is a simplified illustration of a user interface, in accordance with an embodiment of the present invention.

Reference is made to FIG. 48, which is a simplified illustration of a user interface, in accordance with an embodiment of the present invention. FIG. 48 shows a user interface that displays a plurality of icons or buttons 975-977 wherein one icon or button is selected, as illustrated by hatching. The user's input changes which icon is selected, e.g., moving the hatching from icon 975 to icon 976, but no cursor image is provided. In this case, gestures described above for moving the cursor move the selection from one icon or button to another. Thus in FIG. 48 a left-to-right sweep gesture is detected by proximity sensor 519 and in response thereto selection moves from icon 975 to icon 976. As discussed hereinabove, sensor 519 also detects two-dimensional gestures such as diagonal sweep gestures and further detects approach gestures based on whether the object such as the user's hand is moving toward the screen or moving away from the screen. Thus, gestures in three dimensions are detected.

Figure 49:
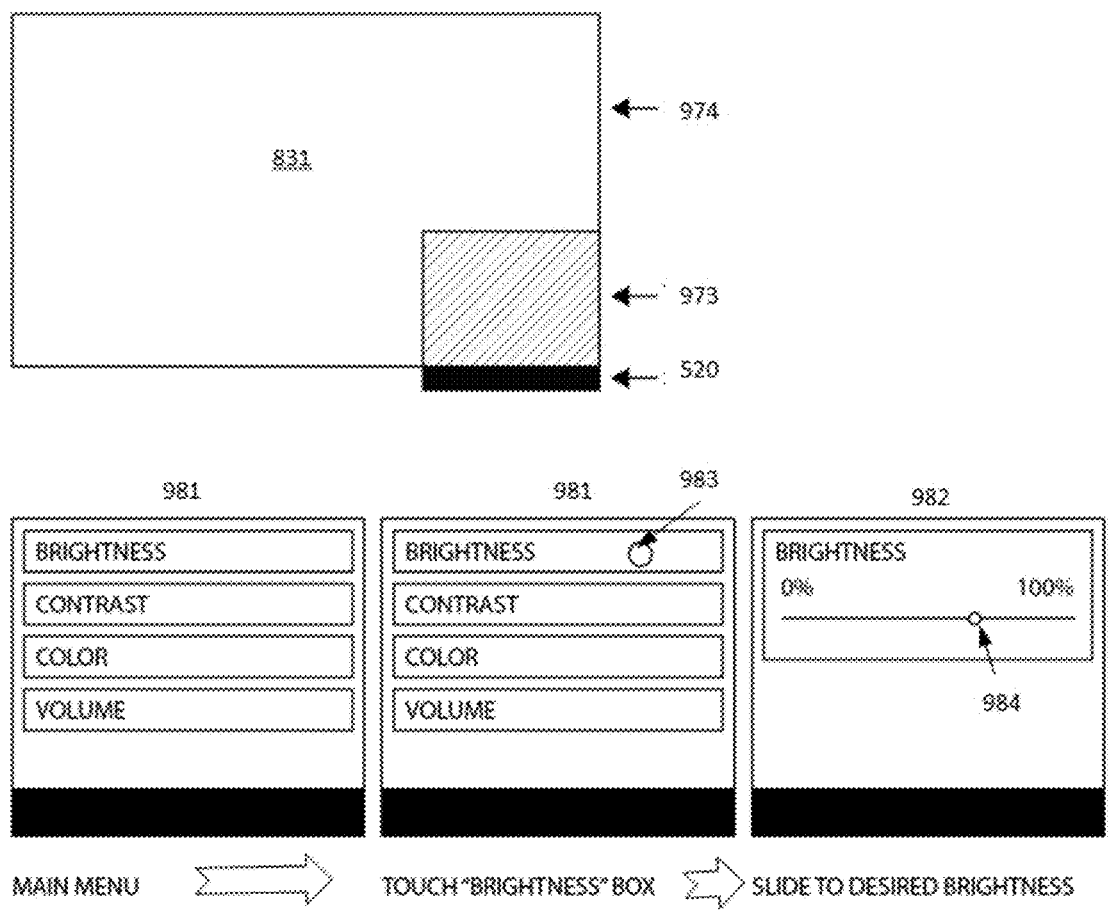
FIG. 49 is a simplified illustration of an optical proximity sensor situated along a short segment of a display edge for adjusting display parameters, in accordance with an embodiment of the present invention.
Figure 50:
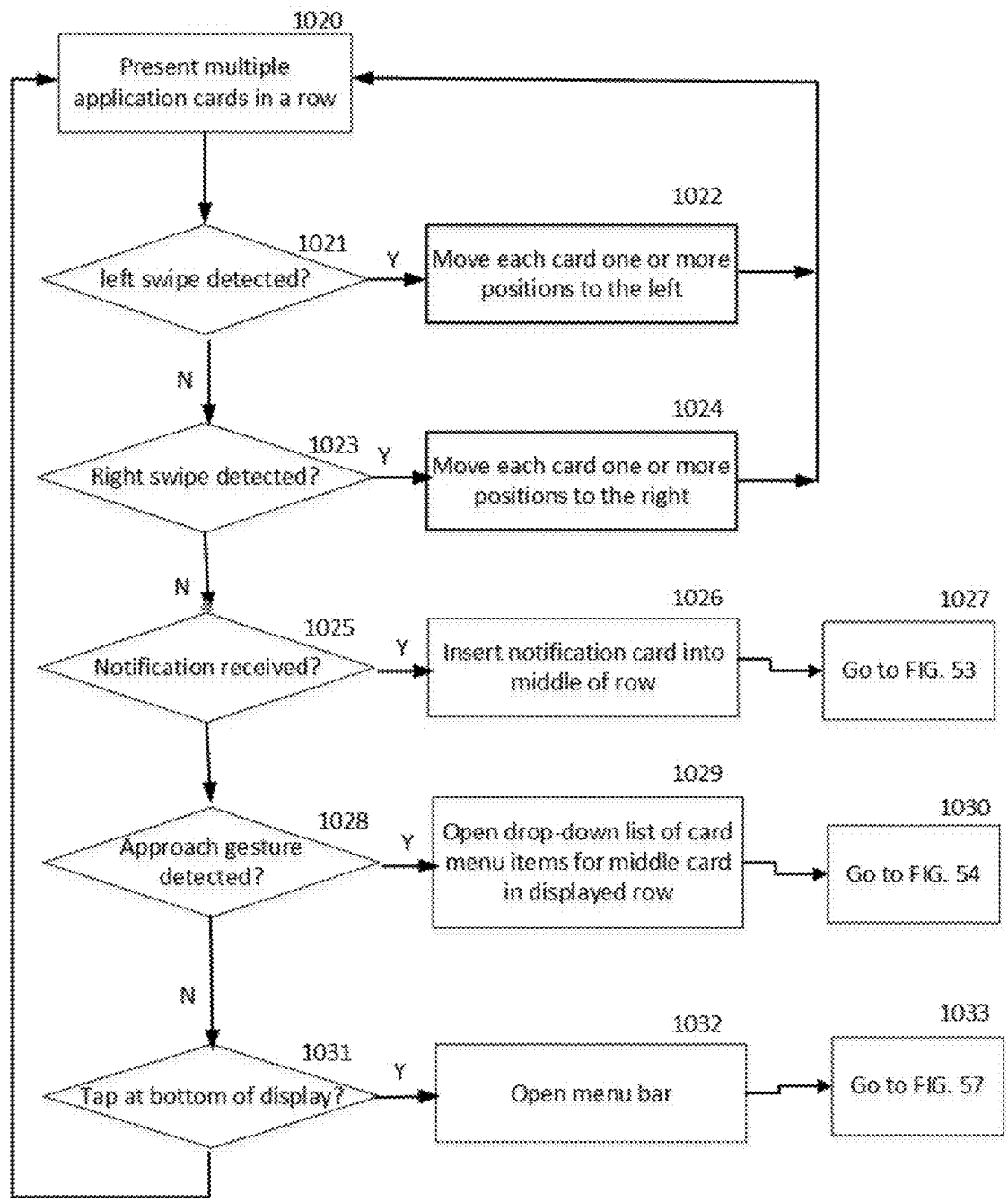
FIGS. 50, 53, 54 and 57 are flow charts for an in-vehicle infotainment system GUI, in accordance with an embodiment of the present invention.

Reference is made to FIG. 49, which is a simplified illustration of an optical proximity sensor situated along a short segment of a display edge for adjusting display parameters, in accordance with an embodiment of the present invention. The proximity sensor employed in this embodiment is any of the proximity sensors discussed hereinabove. FIG. 49 shows a monitor 831 having proximity sensor bar 520 situated along a short segment of the bottom edge of monitor 831. The light beams from proximity sensor bar 520 are directed parallel to the screen surface to provide detection area 973, whereas the remainder of screen 831 forms non-touch sensitive portion 974. Controls 981 and 982 for adjusting monitor parameters such as brightness and contrast, are provided on screen 831 within detection area 973. For example, main menu 981 enables the user to select a parameter to adjust from among brightness, contrast, color and volume. In FIG. 49 the user taps menu option 983 to select brightness. In response to this tap, main menu 981 is replaced with slider control 982 in detection area 973 enabling the user to drag scroll knob 984 along the slider bar-right to increase brightness, and left to decrease brightness.

Another user interface is a GUI for a display or HUD mounted in a vehicle, described by FIGS. 50-58. The GUI provides two different modes of navigating through the GUI options: (i) contextual navigation through application cards, and (ii) hierarchical navigation using nested levels of menus and lists.

Reference is made to FIGS. 50, 53, 54 and 57, which are flow charts for an in-vehicle infotainment system GUI, in accordance with an embodiment of the present invention. Reference is also made to FIGS. 51, 55, 56 and 58, which are screenshots of the in-vehicle infotainment system GUI of FIGS. 50, 53, 54 and 57, in accordance with an embodiment of the present invention. As show in FIG. 50, at step 1020 a plurality of application cards representing frequently used media, phone and navigation and other contextual events relevant to the user are arranged on the display. In some embodiments these cards are arranged in a row that extends beyond the display, and the user pans the row of cards to move cards into and out of the display, as indicated by steps 1021-1024. The user taps an application card to select it as the active application in the GUI.

Figure 51:
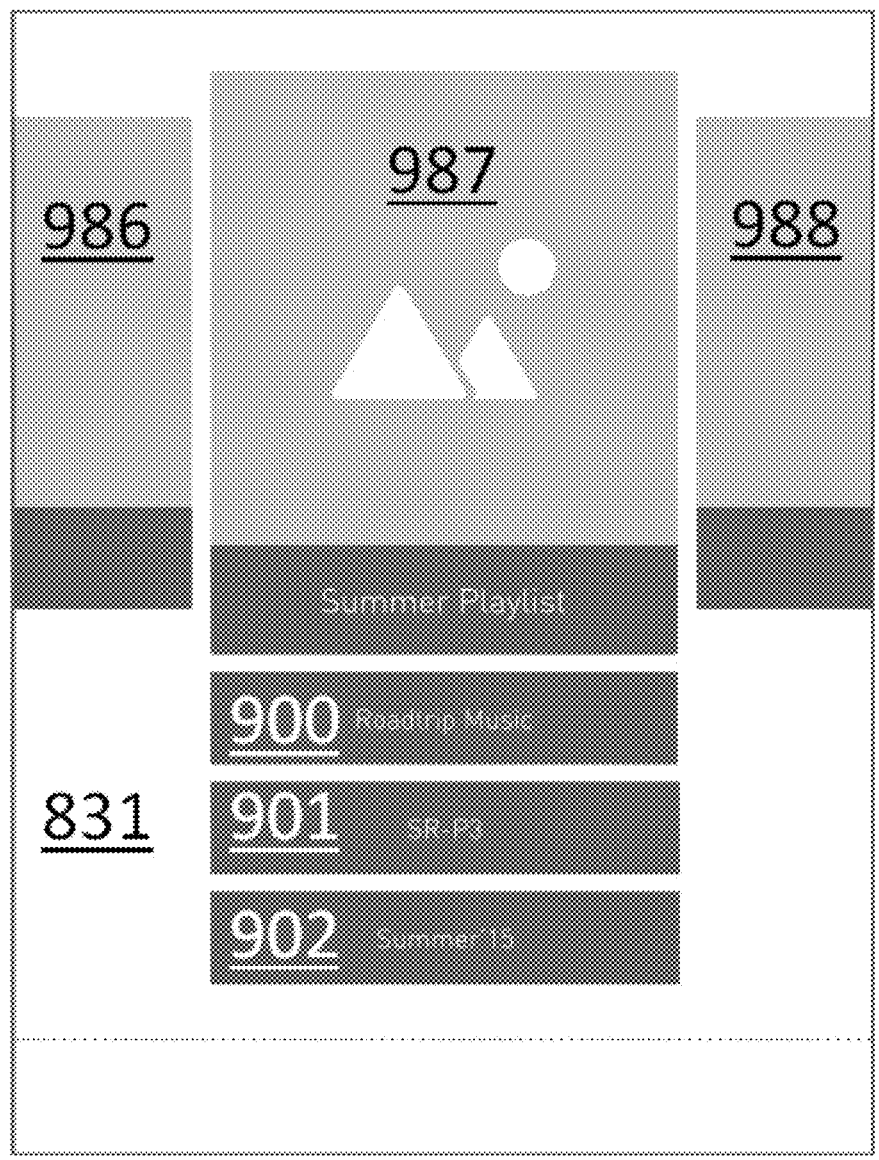
FIGS. 51, 55, 56 and 58 are screenshots of the in-vehicle infotainment system GUI of FIGS. 50, 53, 54 and 57, in accordance with an embodiment of the present invention.

FIG. 51 shows application cards 986-988 arranged in a horizontal row across display 831.

Figure 52:
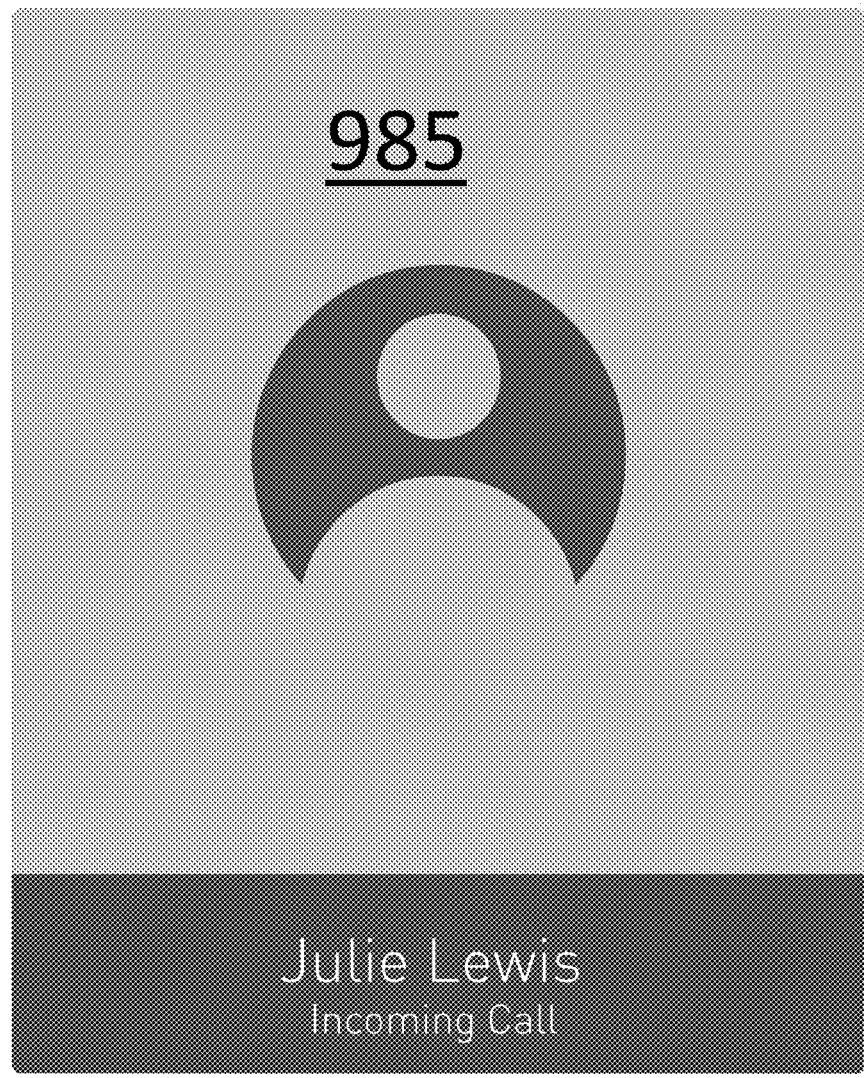
FIG. 52 is an illustration of a notification card used in the in-vehicle infotainment system GUI of FIGS. 50, 51 and 53-58, in accordance with an embodiment of the present invention.
Figure 53:
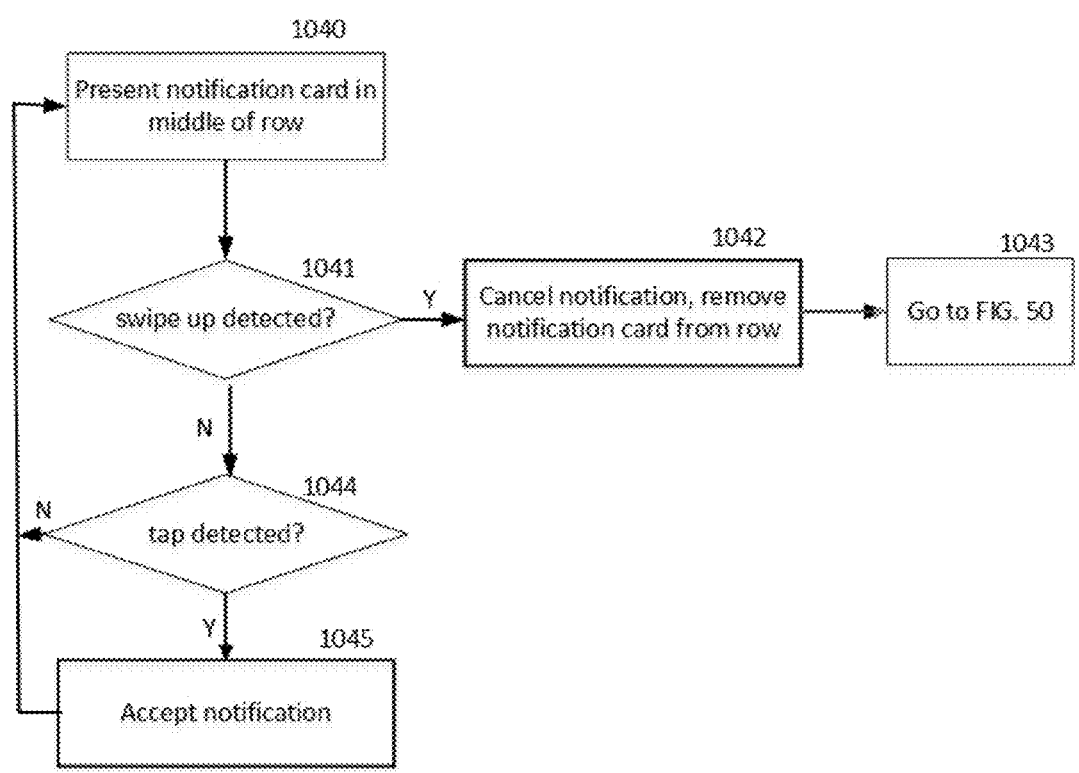

Returning back to FIG. 50, at steps 1025-1027 a notification is presented by the GUI as a card inserted in the middle of the display within the row of application cards, moving other cards in the row left or right. Reference is made to FIG. 52, which is an illustration of a notification card used in the in-vehicle infotainment system GUI of FIGS. 50, 51 and 53-58, in accordance with an embodiment of the present invention. FIG. 52 shows a notification card 985 for an incoming call. To dismiss the notification, e.g., to reject the incoming call, the user swipes upward on the display, as per steps 1041-1043 in FIG. 53. To accept the notification, e.g., to accept the incoming call, the user taps on the display as per steps 1044 and 1045 In FIG. 53.

Returning back to FIG. 50, at steps 1028-1030, a list of contextual options for the currently active application card is displayed in response to the user approaching the display, e.g., by extending a hand toward the display. List items 900-902 in FIG. 51 illustrate such a contextual list for current active application 987.

Figure 54:
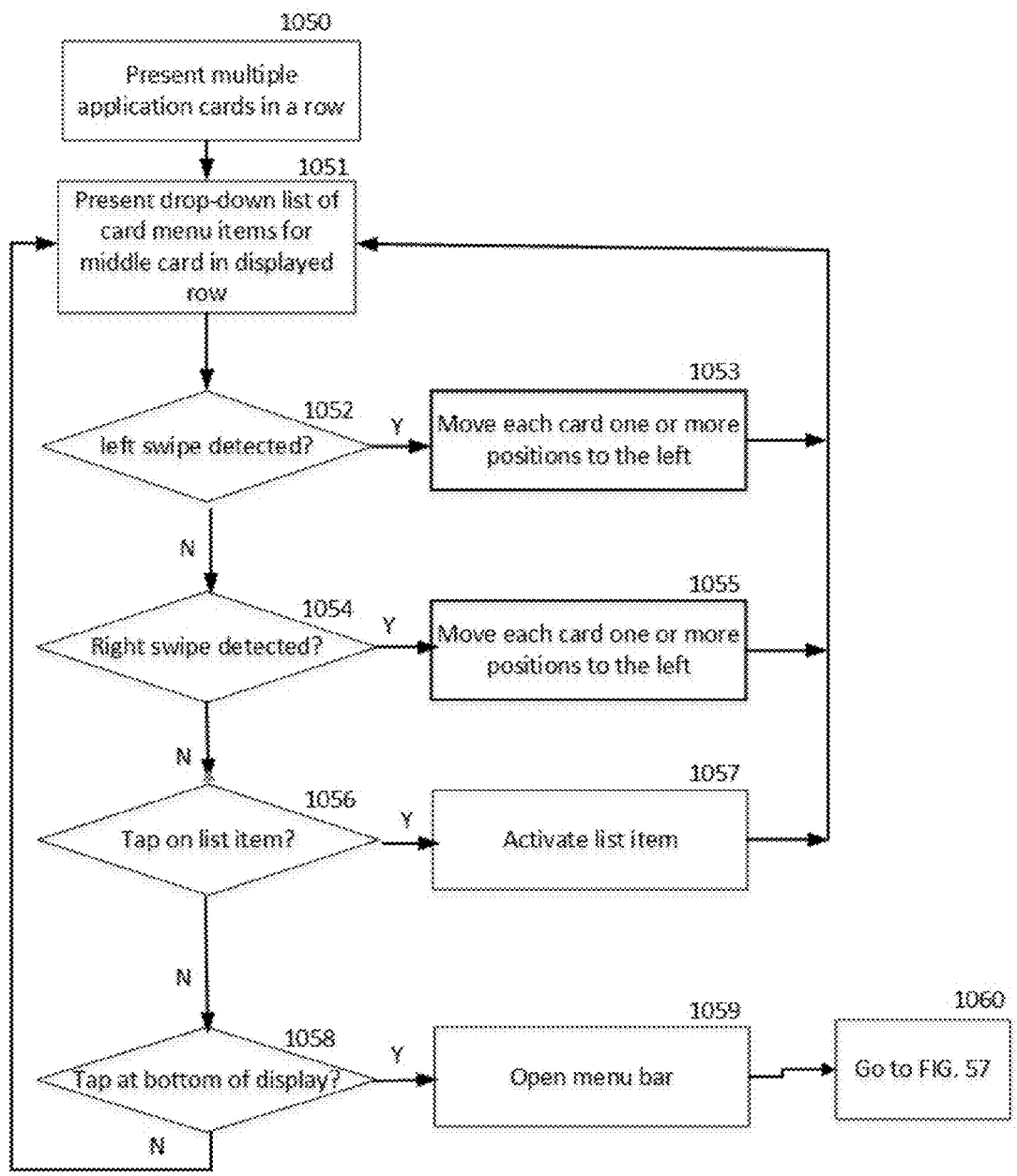

FIG. 54 shows the behavior once a contextual list is opened in the GUI. The user can still navigate through the row of contextual application cards by swiping left and right, as per steps 1052-1055. At step 1051, during such navigation, the list of contextual options changes according to which application card is at the center of the display. At steps 1056 and 1057, a tap on a list item activates that item.

Returning back to FIG. 50, at steps 1031-1033, the GUI provides hierarchical navigation using nested levels of menus and lists in response to a tap at the bottom of the display. When this occurs, both contextual navigation through application cards, and hierarchical navigation using nested levels of menus and lists, are provided at the same time. Thus, the user accesses and activates any of the applications through the application cards, and also activates those same applications though a set of hierarchical menus.

Figure 55:
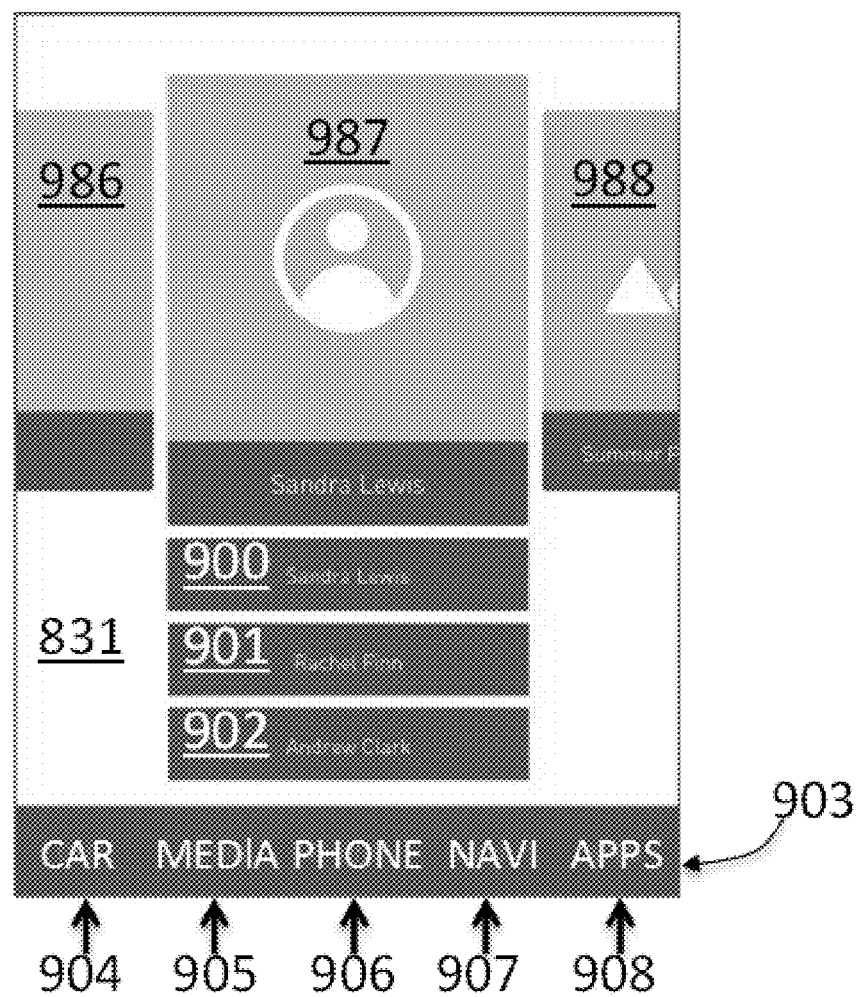

FIG. 55 shows primary menu bar 903, including category items 904-908, opened in response to a tap at the bottom of display 831. A tap on any category item 904-908 opens a secondary menu bar within display 831, presenting subcategories within the selected category, and dividing the display into an upper portion and a lower portion.

Figure 56:
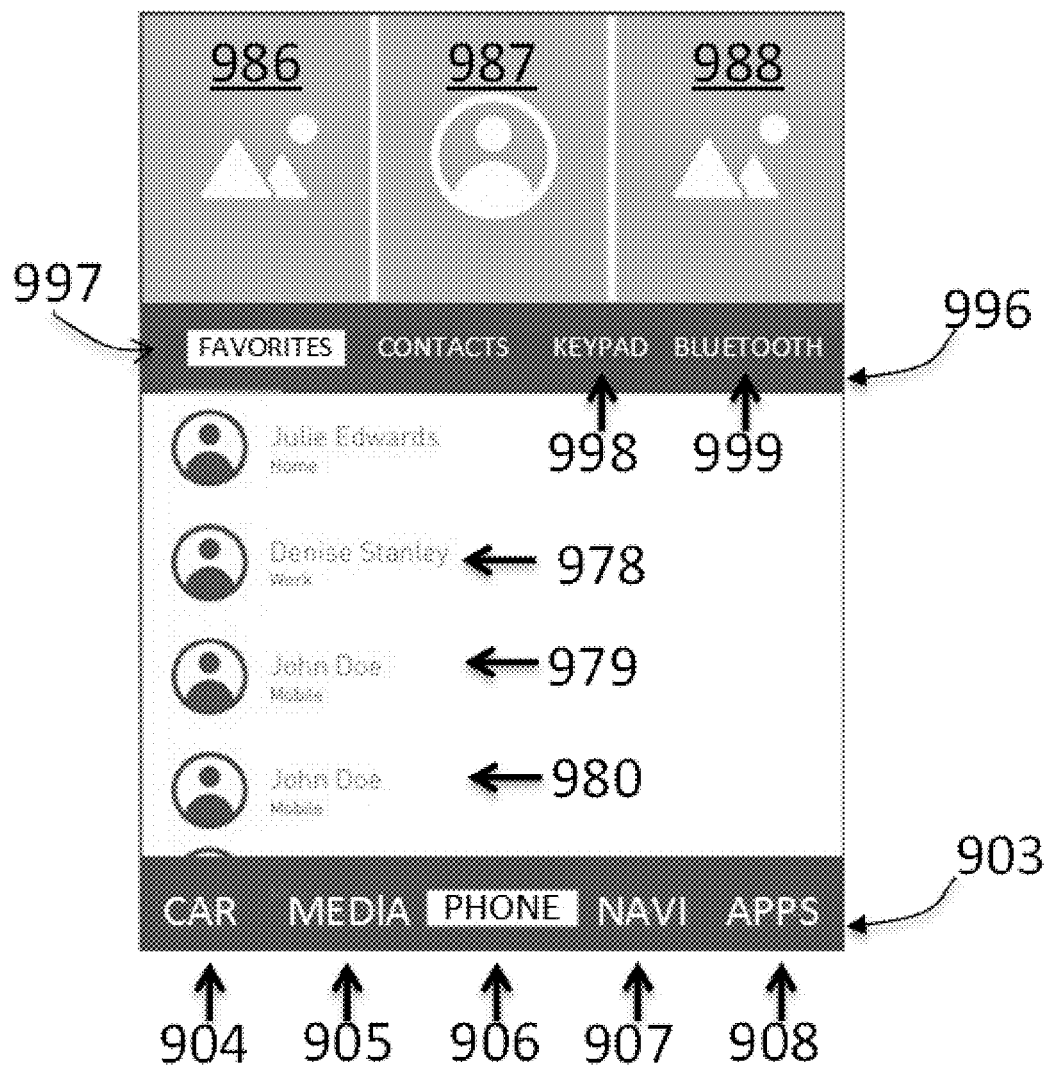
Figure 57:
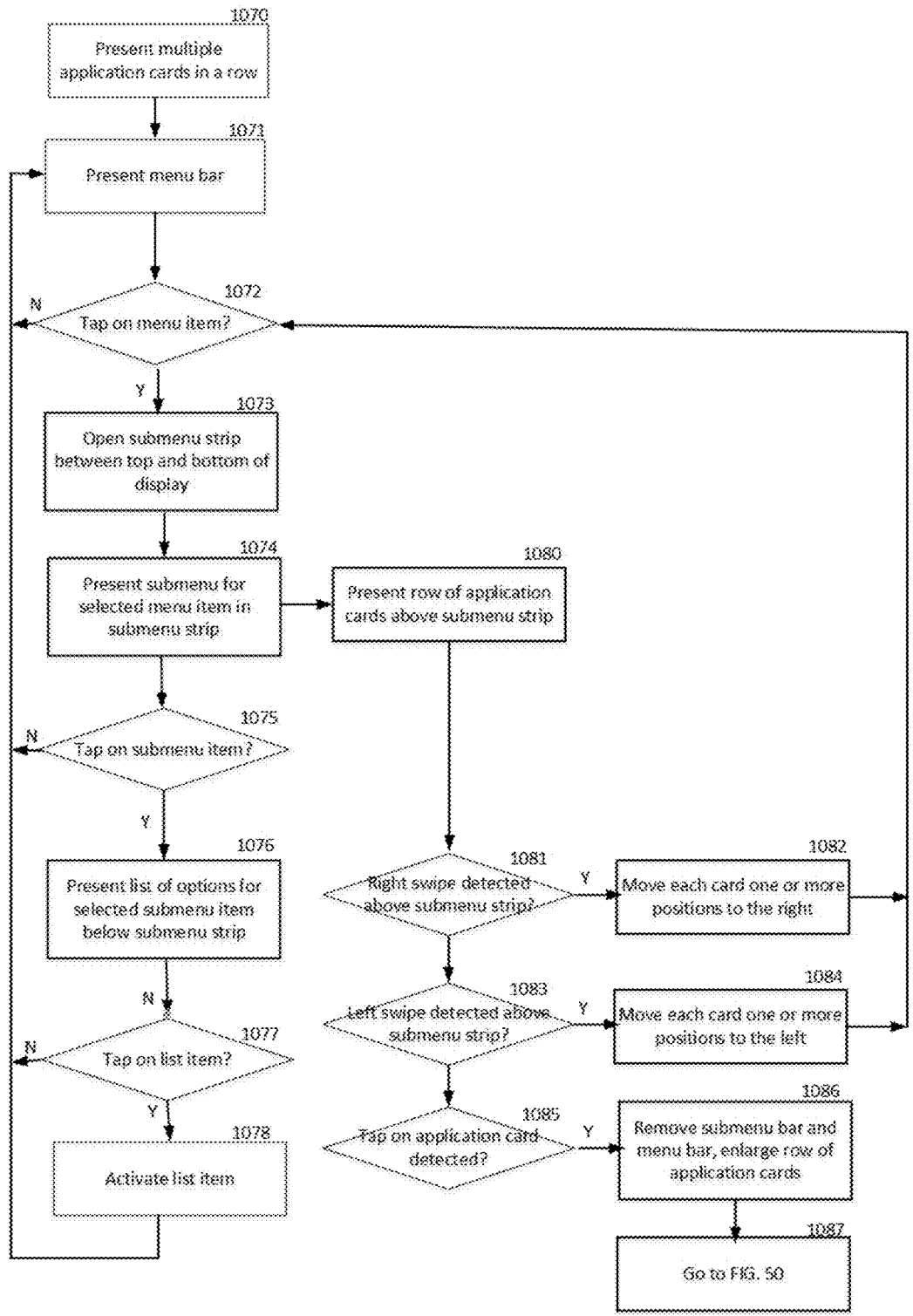

FIG. 56 shows primary menu bar 903, and secondary menu bar 996, including secondary categories 997-999, related to selected primary category 906. Contextual application cards 986-988 are reduced in size above secondary menu bar 996, and can still be navigated and selected as before. This is indicated at steps 1080-1087 in FIG. 57. A tap on any secondary category in secondary menu bar 996, opens list of relevant options, inter alia 978-980, below secondary menu bar 996, as shown in FIG. 56 and as indicated at steps 1075 and 1076 in FIG. 57. A tap on any list item activates that item, as described by steps 1077 and 1078 in FIG. 57.

Figure 58:
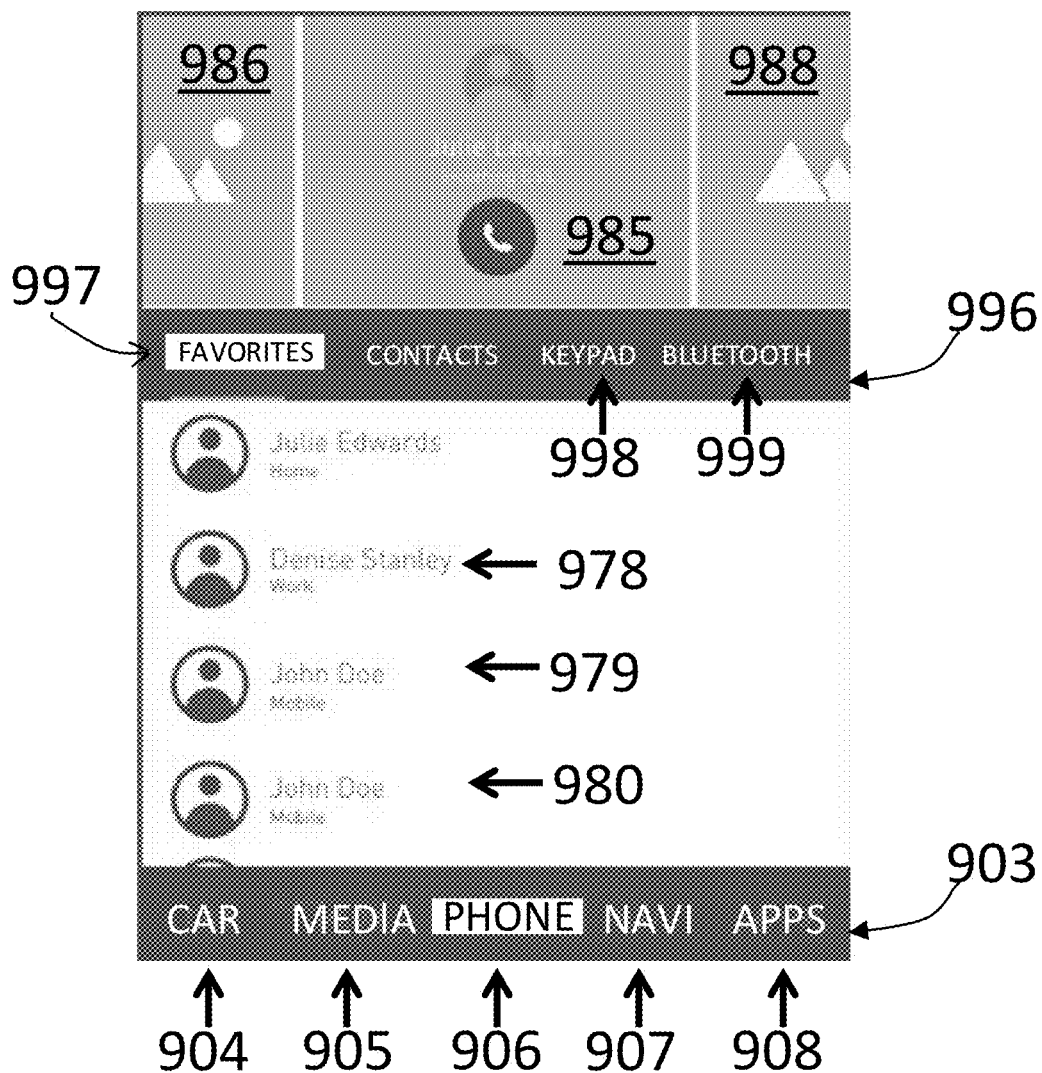

FIG. 58 shows an incoming notification when both the contextual navigation through application cards, and hierarchical navigation using nested levels of menus and lists, are provided at the same time. Notification card 985 is inserted within the application cards above secondary menu bar 996. To dismiss the notification, e.g., to reject the incoming call, the user swipes upward above secondary menu bar 996. To accept the notification, e.g., to accept the incoming call, the user taps on notification 985.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. A single straight bar comprising a linear array of interlaced light emitters and photodiode detectors mounted on a printed circuit board, wherein the bar is configured to be repeatedly attached to and detached from a display of a laptop computer comprising a processor, wherein the bar, when coupled communicatively with the laptop processor and positioned over one side of the laptop display, provides the processor with detection signals that enable the processor to recognize a plurality of different gestures performed by an object touching the display, the detection signals being generated by light emitted by said light emitters that is reflected by the object back to the bar and detected by said photodiode detectors.

2. The bar of claim 1, wherein the bar, when communicatively coupled with the processor and positioned over one side of the display, provides the processor with detection signals that enable the processor to identify two-dimensional coordinates of locations on the display being touched by one or more objects, the detection signals being generated by light emitted by said emitters that is reflected by the one or more objects back to the bar and detected by said photodiode detectors.

3. The bar of claim 2, wherein the display is a non-touch enabled display screen that is also communicatively coupled with the processor, and whereby the bar enables touch recognition on the display screen.

4. The bar of claim 1 wherein said light emitters comprise vertical-cavity surface-emitting lasers.

* * * * *